United States Patent
Orschel

(10) Patent No.: US 9,459,935 B2
(45) Date of Patent: Oct. 4, 2016

(54) METHODS AND SYSTEMS FOR DETERMINISTIC AND MULTITHREADED SCRIPT OBJECTS AND SCRIPT ENGINE

(71) Applicant: SunEdison, Inc., St. Peters, MO (US)

(72) Inventor: Benno Orschel, St. Louis, MO (US)

(73) Assignee: SunEdison Semiconductor Limited, Singapore (SG)

( * ) Notice: Subject to any disclaimer, the term of this patent is extended or adjusted under 35 U.S.C. 154(b) by 209 days.

(21) Appl. No.: 14/142,526

(22) Filed: Dec. 27, 2013

(65) Prior Publication Data
US 2014/0223440 A1 Aug. 7, 2014

Related U.S. Application Data

(60) Provisional application No. 61/747,033, filed on Dec. 28, 2012, provisional application No. 61/747,038, filed on Dec. 28, 2012, provisional application No. 61/747,041, filed on Dec. 28, 2012, provisional application No. 61/747,047, filed on Dec. 28, 2012.

(51) Int. Cl.
| | |
|---|---|
| *G06F 9/44* | (2006.01) |
| *G06F 9/52* | (2006.01) |
| *G06F 9/48* | (2006.01) |
| *G05B 19/418* | (2006.01) |

(52) U.S. Cl.
CPC ............. *G06F 9/526* (2013.01); *G06F 9/4843* (2013.01); *G05B 19/418* (2013.01); *Y02P 90/02* (2015.11)

(58) Field of Classification Search
CPC ........ G06F 9/4428; G06F 8/24; G06F 8/434; G06F 9/44563
See application file for complete search history.

(56) References Cited

U.S. PATENT DOCUMENTS

| | | | | |
|---|---|---|---|---|
| 7,707,240 | B2 * | 4/2010 | Marascio | H04L 65/1053 370/432 |
| 7,774,787 | B2 * | 8/2010 | Leino | G06F 9/526 717/116 |
| 8,065,659 | B1 * | 11/2011 | Prince | G06F 9/445 717/115 |
| 8,510,722 | B2 * | 8/2013 | Yang | G06F 11/3608 717/131 |
| 8,694,961 | B2 * | 4/2014 | Batres et al. | 717/115 |
| 9,146,758 | B2 * | 9/2015 | Rugina | G06F 9/455 |
| 2006/0262915 | A1 * | 11/2006 | Marascio | H04L 65/1053 379/201.01 |
| 2009/0328041 | A1 * | 12/2009 | Sudzilouski | G06F 9/526 718/100 |

(Continued)

OTHER PUBLICATIONS

John E Buford et al.; Integrating Object-Oriented Scripting Languages with HyTime; 1994 IEEE; pp. 425-434; <http://ieeexplore.ieee.org/stamp/stamp.jsp?tp=&arnumber=292464>.*

Michiaki Tatsubori et al.; HTML Templates that Fly; 2009 ACM; pp. 951-960; <http://dl.acm.org/citation.cfm?id=1526837>.*

R. D. Van Der Mei et al.; Web Server Performance Modeling; 2001 Kluwer Academic Publishers; pp. 361-378; <http://link.springer.com/article/10.1023/A:1016667027983>.*

(Continued)

*Primary Examiner* — Thuy Dao
*Assistant Examiner* — Cuong V Luu
(74) *Attorney, Agent, or Firm* — Armstrong Teasdale LLP

(57) ABSTRACT

A computing device is configured to execute a first instance of a single-threaded script engine in a first thread associated with a first execution context, wherein the first instance of the single-threaded script engine accesses at least one shared script object through a first reference counted script base value object. The computing device is also configured to concurrently execute a second instance of the single-threaded script engine in a second thread_associated with a second execution context, wherein the second instance of the single-threaded script engine accesses the at least one shared script object through a second reference counted script base value object. The script engine does not switch between the execution contexts.

20 Claims, 79 Drawing Sheets

(56) References Cited

U.S. PATENT DOCUMENTS

| | | | | |
|---|---|---|---|---|
| 2011/0126174 A1* | 5/2011 | Krauss | ............... | G06F 11/3466 717/127 |
| 2012/0151462 A1* | 6/2012 | Joisha | ...................... | G06F 8/45 717/157 |
| 2012/0192194 A1* | 7/2012 | Richardson | ................... | 718/103 |
| 2013/0042225 A1* | 2/2013 | Wu | ..................... | G06F 9/44521 717/165 |
| 2013/0263087 A1* | 10/2013 | Batres | ................. | G06F 9/4428 717/115 |
| 2014/0007090 A1* | 1/2014 | Rugina | .................. | G06F 9/455 718/1 |

OTHER PUBLICATIONS

Martin R. Frank et al.; A Pure Reasoning Engine for Programming by Demonstration ; 1994 UIST; pp. 95-101; <http://dl.acm.org/citation.cfm?id=192466>.*

Erik Meijer et al.; Client-Side Web Scripting with HaskellScript; 1998 springer; pp. 196-210; <http://download.springer.com/static/pdf/344/>.*

Myeong-Jo Son et al.; Modeling and simulation of target motion analysis for a submarine using a script-based tactics manager; 2008 ScienceDirect; pp. 506-516; <http://www.sciencedirect.com/science/article/pii/S096599780900221X>.*

* cited by examiner

WRTLock

Attributes:
- 2402 — mutex: pthread_mutex_t
- 2404 — readerWait: pthread_cond_t
- 2406 — writerWait: pthread_cond_t
- 2408 — accessCount: int
- 2410 — readContenders: int
- 2412 — writeContenders: int
- 2414 — w2fFlag: bool

Operations:
- 2416 — init (): void
- 2418 — unlock (): void
- 2420 — readLock (): void
- 2422 — writeLock (): void
- 2424 — w2rTransition (): void

METHODS AND SYSTEMS FOR DETERMINISTIC AND MULTITHREADED SCRIPT OBJECTS AND SCRIPT ENGINE

CROSS-REFERENCE TO RELATED APPLICATIONS

This application claims priority to U.S. Provisional Patent Application Nos. 61/747,033, 61/747,038, 61/747,041, and 61/747,047 filed Dec. 28, 2012, the entire disclosures of which are incorporated herein by reference.

BACKGROUND

The field relates generally to computerized control of machines, and more particularly to computerized management of operations performed by components of machines, using multiple threads.

Complex machines, such as those found in a silicon wafer manufacturing plant or other industrial plant, often include multiple components whose operations must be precisely orchestrated to produce a product properly. Often, not only must the multiple components of a given machine work in concert, interactions between different machines must be coordinated as well. The components can include valves, motors, heaters, fans, and sensors, to name a few. To properly make a product pursuant to certain specifications set by an engineer, raw materials might undergo a multitude of processes as they transition into an intermediate product and finally a finished product. The processes might involve, for example, heating silicon in a crucible, extracting the silicon from the crucible at a specific rate and temperature to form a crystal, and partitioning the crystal into wafers. Other processes might include vapor deposition and etching of a wafer of silicon. In other industrial plants, similarly complex processes are carried out.

Rather than relying on human operators to individually control each machine used in processes like those described above, a computerized control server which is communicatively coupled to the components of the various machines monitors the status of each machine and issues instructions to the machine components to generate a product from the raw materials. Often multiple operations on a single machine are being performed concurrently.

Control software for specifying operations can benefit from high-level script engines, which allow instructions to be specified in a manner that does not require an author of a script to address low-level memory and task-switching (e.g., multi-threading) issues. Rather, such issues are typically handled by the script engine automatically. However, script engines typically provide only limited multi-threading capabilities. That is, in typical script engines, multi-threading is implemented at script execution level, where the script engine is explicitly involved in managing script context switches. Moreover, script engines typically suffer from globally-locking garbage collection mechanisms for memory management, thereby blocking further operations until the garbage collection mechanism finishes managing memory. Due to the above-discussed limitations, script engines may not provide sufficient parallelism and deterministic behavior for applications in which predictable timing and parallel execution of instructions is required.

BRIEF DESCRIPTION

In one aspect, a computing device is provided. The computing device is configured to execute a first instance of a single-threaded script engine in a first thread associated with a first execution context, wherein the first instance of the single-threaded script engine accesses at least one shared script object through a first reference counted script base value object. The computing device is also configured to concurrently execute a second instance of the single-threaded script engine in a second thread associated with a second execution context, wherein the second instance of the single-threaded script engine accesses the at least one shared script object through a second reference counted script base value object. The script engine does not switch between the execution contexts.

In another aspect, a method for enabling multiple instances of a single-threaded script engine to operate concurrently is provided. The method includes executing, by a computing device, a first instance of a single-threaded script engine in a first thread associated with a first execution context, wherein the first instance of the single-threaded script engine accesses at least one shared script object through a first reference counted script base value object. The method also includes concurrently executing, by the computing device, a second instance of the single-threaded script engine in a second thread associated with a second execution context, wherein the second instance of the single-threaded script engine accesses the at least one shared script object through a second reference counted script base value object, wherein the script engine does not switch between the execution contexts.

In another aspect, a computer-readable storage device having processor-executable instructions embodied thereon is provided. When executed by a computing device having a processor, the computer-executable instructions cause the computing device to execute a first instance of a single-threaded script engine in a first thread associated with a first execution context, wherein the first instance of the single-threaded script engine accesses at least one shared script object through a first reference counted script base value object. The instructions additionally cause the computing device to concurrently execute a second instance of the single-threaded script engine in a second thread associated with a second execution context, wherein the second instance of the single-threaded script engine accesses the at least one shared script object through a second reference counted script base value object, wherein the script engine does not switch between the execution contexts.

BRIEF DESCRIPTION OF THE DRAWINGS

FIG. 24 is a block diagram of an embodiment of a write-read transition lock object ("WRTLock object").

DETAILED DESCRIPTION

Figure 1:
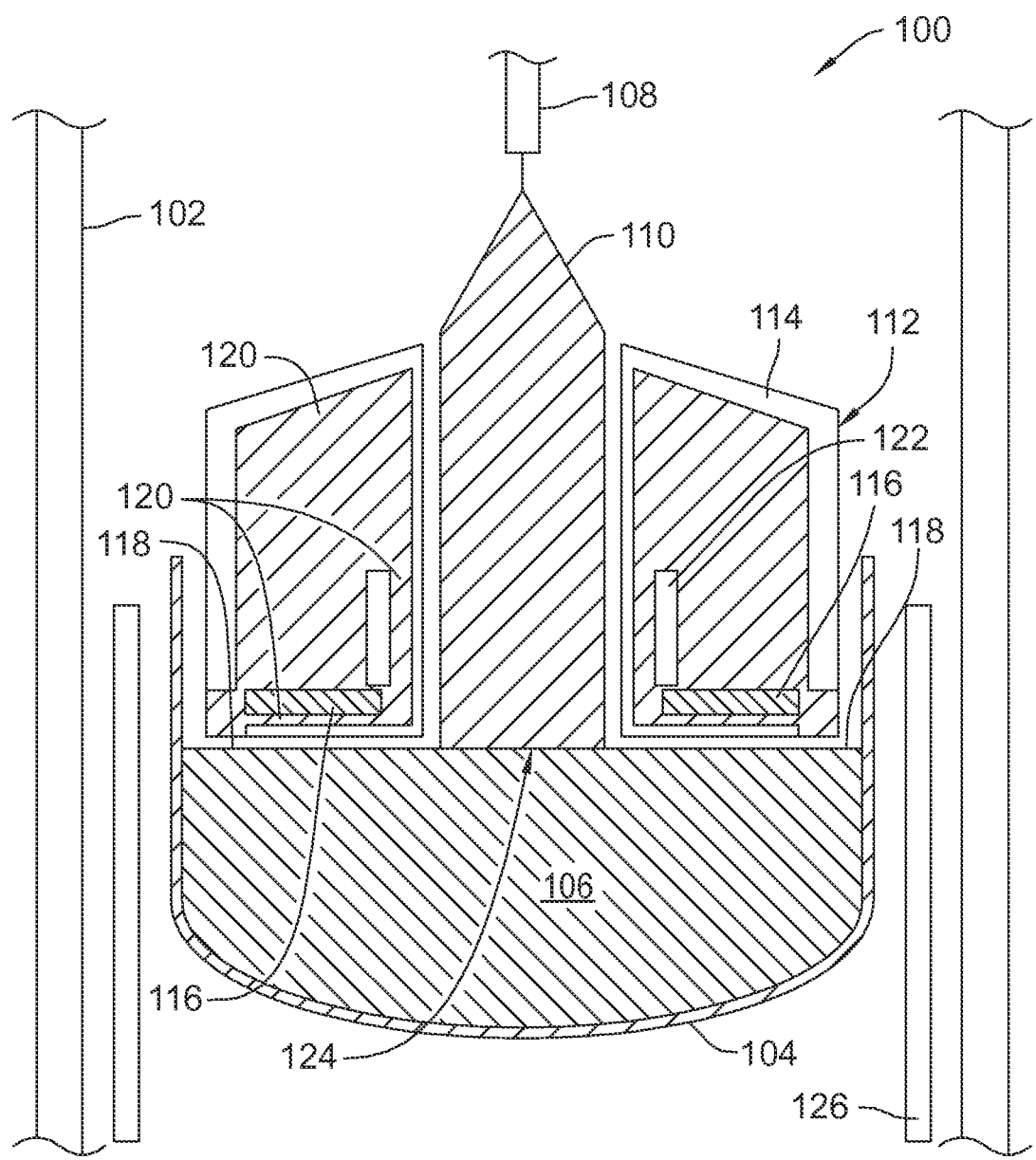
FIG. 1 is a diagram of a crystal puller, which may be controlled by a control server in accordance with an embodiment.

FIG. 1 is a diagram of a crystal puller 100, which may be controlled by a control server. Crystal puller 100 is used to grow monocrystalline ingots according to the Czochralski method. The Czochralski method is known to those skilled in the art of forming monocrystalline ingots. Crystal puller 100 includes a housing 102, and a quartz crucible 104 in the housing 102 for containing a semiconductor melt 106. The melt contains, for example, silicon. A pulling mechanism 108, such as a shaft or pull wire, secured in housing 102 and adapted to extend toward crucible 104, is adapted to continuously pull a solid monocrystalline ingot or crystal 110 from melt 106. A tubular graphite reflector 112 secured in a growth chamber of housing 102 includes a cover 114 preferably made of graphite and having a central opening sized and shaped for surrounding the growing crystal 110. An annular melt heat exchanger 116 is mounted within cover 114 to face the exposed melt surface 118.

Melt heat exchanger 116 includes a heat source such as an electrically-powered heater. Melt heat exchanger 116 may also include a heat absorption structure. Insulation 120 is disposed between melt heat exchanger 116 and melt surface 118 to inhibit heat transfer between melt surface 118 and melt heat exchanger 116. A crystal heat exchanger 122 is also mounted within cover 114 to surround and to face the growing crystal 110. Crystal heat exchanger 122 is disposed above melt heat exchanger 116 as close to the melt/crystal interface 124 as practical, such that crystal heat exchanger 122 cools a segment of crystal 110 proximate the interface 124. Crystal heat exchanger 122 is cooled by conventional cooling fluid, for example, water. Crystal heat exchanger 122 also includes a heater for controlling the temperature of the cooling fluid. Additionally, a side heater 126 is located adjacent crucible 104 for heating crucible 104. A control server in accordance with embodiments of the present disclosure may be used to set temperatures of melt heat exchanger 116, crystal heat exchanger 122, and side heater 126. Further, a control server in accordance with embodiments of the present disclosure may control the rate at which pull mechanism 108 pulls crystal 110 from melt 106.

Figure 2:
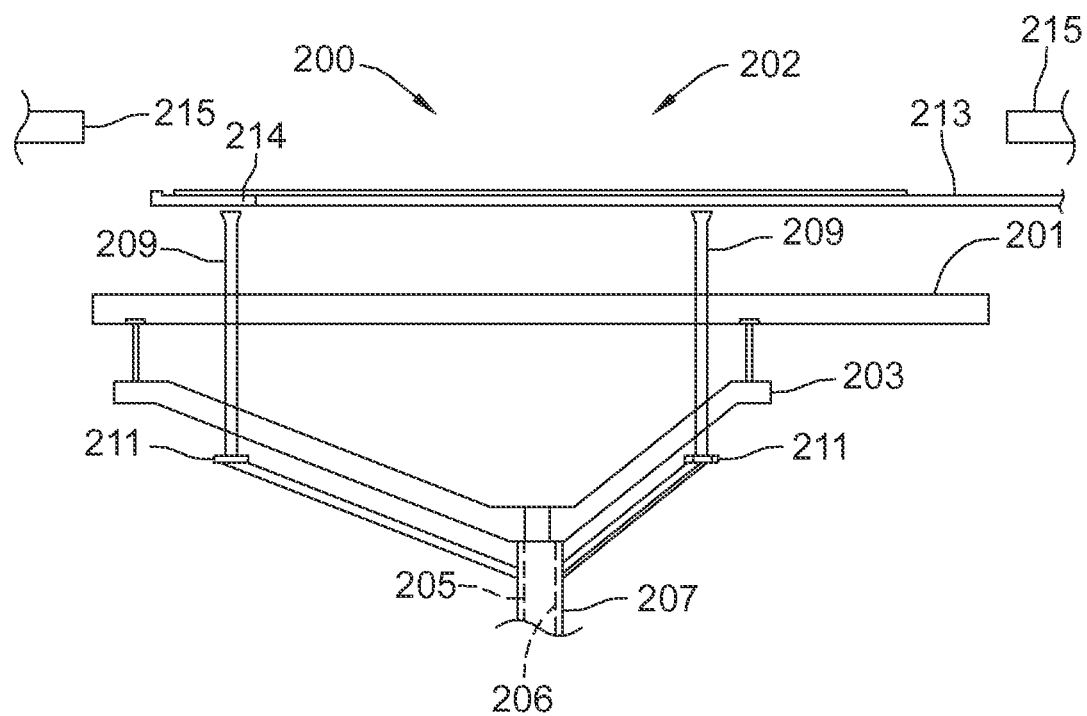
FIG. 2 is a diagram of components included in an epitaxial reactor, which may be controlled by a control server in accordance with an embodiment.

FIG. 2 is a diagram of components included in an epitaxial reactor 200, which may be controlled by a control server in accordance with an embodiment of the present disclosure. A positioning mechanism 202 within the epitaxial reactor 200 operates to position a silicon wafer during various phases of a chemical vapor deposition processes within a chamber of the epitaxial reactor 200. The wafer may be supported by a susceptor 201. Susceptor 201 is mounted on arms 203, which, in turn, are mounted to a susceptor support shaft 205. Susceptor support shaft 205 is slidingly mounted within a bore 206 of a wafer lift shaft 207. A pneumatic mechanism (not shown) is operable to raise and lower susceptor support shaft 205 and wafer lift shaft 207 to various positions. The pneumatic mechanism (not shown) may also rotate susceptor 201. Rigid pins 209 are slidingly mounted to susceptor 201 and, when not elevated by susceptor 201, are supported by stops 211 of wafer lift shaft 207. Rigid pins 209 may support the wafer when brought into contact with the wafer.

During an exchange phase, a blade 213 carries the wafer into position above pins 209. Subsequently, wafer lift shaft 207 elevates, causing pins 209 to translate upwards and support the wafer. Blade 213 includes a notch 214 to allow room for one of pins 209 that would otherwise collide with blade 213. Once the wafer is supported by pins 209, blade 213 is withdrawn from the reactor 200. Next, susceptor support shaft 205 elevates, causing susceptor 201 to move upwards and come into contact with the wafer. Thereafter, the wafer is supported by susceptor 201. Susceptor support shaft 205 continues to elevate until susceptor 201 and the wafer are level with ring 215. At this point, the wafer and susceptor 201 are in the "process" position. When in the process position, susceptor 201 rotates as heat lamps (not shown) within epitaxial reactor 200 heat the wafer. Additionally, valves (not shown) are opened and closed to release various gases at precise temperatures, pressures, and times. For example, the wafer may undergo a pretreatment process during which a silicon oxide layer is removed from the surface of the wafer.

During the pretreatment process, the epitaxial reactor 200 heats the wafer, using heat lamps (not shown) to 1150 to 1220° C. The heat lamps are controlled to raise the temperature at 3 to about 18° C. per second. Then the chamber of the epitaxial reactor 200 is filled with $H_2$ and the wafer is annealed for 10 to 15 seconds. Next, an epitaxial layer is deposited on the wafer. The chamber of the epitaxial reactor 200 is filled a carrier gas, such as $H_2$, and a silicon-containing gas, for example, $SiHCL_3$, at atmospheric pressure. The wafer surface is maintained at a temperature of at least 900° C. during this process. After a predetermined time, the silicon-containing gas is purged with, for example, $H_2$. The wafer is then heated further, for a predetermined duration, for example 10 seconds. Next the wafer is cooled at a rate of 50° C. per second until it reaches 800° C. During this cooling process, susceptor 201 is lowered such that the wafer is supported only by pins 209. As is apparent, the above-described processes require a plurality of components of epitaxial reactor 200 to be precisely coordinated in order for the process to be carried out correctly.

Figure 3:
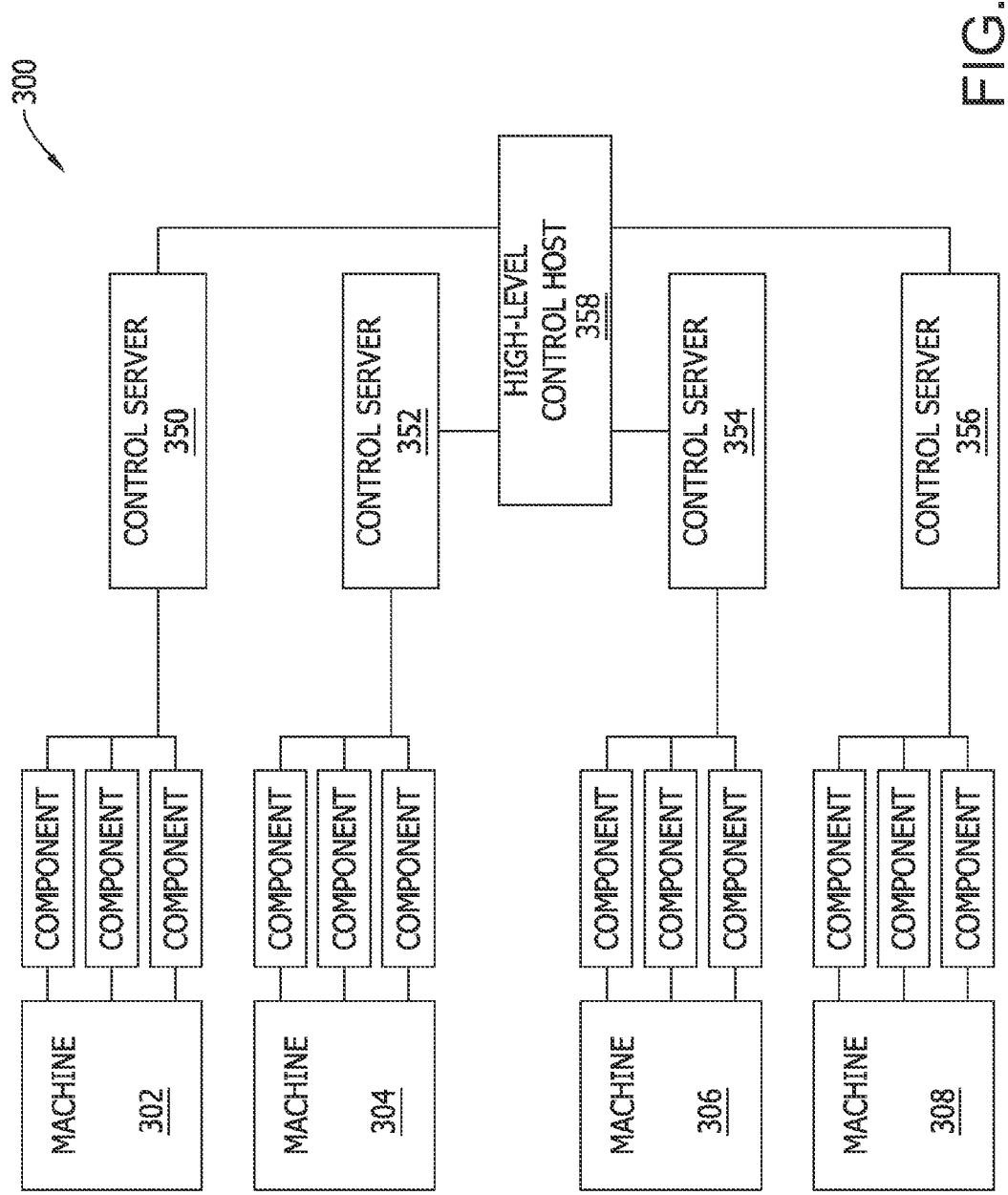
FIG. 3 is a block diagram of a plurality of machines having a plurality of components communicatively coupled to a plurality of control servers in accordance with another embodiment.

FIG. 3 is a block diagram 300 of a plurality of machines 302, 304, 306, and 308 having a plurality of components 310, 312, 314, 316, 318, 320, 322, 324, 326, 328, 330, and 332 communicatively coupled to a plurality of control servers 350, 352, 354, and 356 in accordance with an exemplary embodiment of the present disclosure. Machine 302, is for example, a crystal puller and machines 304, 306, and 308 are, for example, epitaxial reactors. In the exemplary embodiment, machines 302, 304, 306, and 308 are used in the generation of silicon wafers in a silicon wafer manufacturing plant. However, those skilled in the art will appreciate that the methods and systems disclosed herein are equally applicable to other processes and other environments, and that the number of machines may vary.

Communicatively coupled to machine 302, which is a crystal puller, are components 314, 316, and 318. Component 314 is a pulling mechanism similar to pulling mechanism 108 (FIG. 1), component 316 is a melt heat exchanger, similar to melt heat exchanger 116 (FIG. 1), and component 318 is a crystal heat exchanger, similar to crystal heat exchanger 122 (FIG. 1). Machines 304, 306, and 308 are epitaxial reactors, similar to epitaxial reactor 200 (FIG. 2). Components 316, 322, and 328 are susceptor support shafts, similar to susceptor support shaft 205 (FIG. 2). Components 318, 324, and 330 are wafer lift shafts, similar to wafer lift shaft 207 (FIG. 2). Components 320, 326, and 332 are gas valves, similar to those discussed with reference to epitaxial reactor 200 (FIG. 2). FIG. 3 is a simplified representation of machines and associated components, and, as is evident from the discussion of crystal puller 100 and epitaxial reactor 200, additional components, including pneumatic mechanisms, heaters, temperature sensors, and pressure sensors are also included as components of one or more of the machines.

A first control server 350 is communicatively coupled to components 310, 312, and 314 of machine 302. A second control server 352 is communicatively coupled to components 316, 318, and 320 of machine 304. A third control server 354 is communicatively coupled to components 322, 324, and 326 of machine 306. A fourth control server 356 is communicatively coupled to components 328, 330, and 332 of machine 308. A high level control host 358 which monitors and issues high-level instructions to each of control servers 350, 352, 354, and 356. Control server 350 issues instructions to and receives information from components 310, 312, and 314. For example, control server 350 may instruct component 312, which is a melt heat exchanger, to reach a target temperature. Another component, which is a temperature sensor, provides temperature information to control server 350. Control server 350 also instructs crystal heat exchanger, which is component 314, to reach a target temperature. Another component, which is a temperature sensor for the crystal heat exchanger, provides temperature information to control server 350. Once the target temperature of the melt heat exchanger (component 312) and crystal heat exchanger (component 314) reach their target temperatures, control server 350 instructs puller mechanism to lower a crystal into the melt and begin pulling the crystal out of the melt at a particular rate. Control servers 352, 354, and 356 may simultaneously be issuing instructions and receiving sensor information from epitaxial reactors (machines 304, 306, and 308) to carry out loading of silicon wafers, removal of silicon oxide from the silicon wafers, epitaxial deposition onto the silicon wafers, heating and cooling of the silicon wafers, and/or unloading of the silicon wafers. High level control host 358 may monitor the status of each of control servers 350, 352, 354, and 356, issue high-level commands such as shutting down or starting up any of control servers 350, 352, 354, and 356 and logging any errors.

Figure 4:
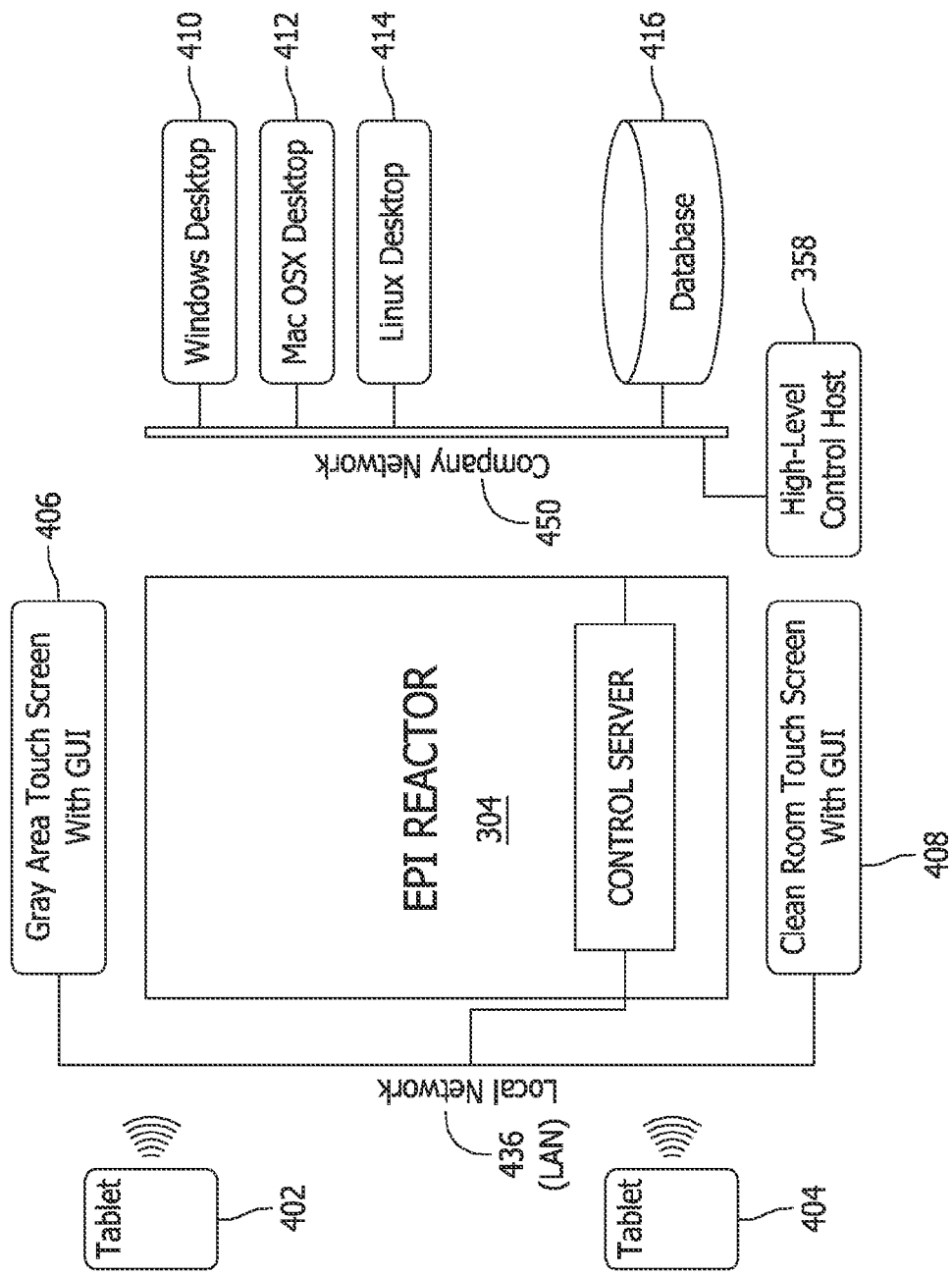
FIG. 4 is a block diagram of a system for controlling components of a machine, in accordance with an embodiment.

FIG. 4 is a block diagram of a system 400 for controlling components of a machine, in accordance with an embodiment of the present disclosure. Components in system 400, identical to components of system 300 (shown in FIG. 3), are identified in FIG. 4 using the same reference numerals used in FIG. 4. System 400 includes control server 352 and machine 304, which is an epitaxial reactor. A disk storage unit containing database 416 company network 450, which may be, for example, a wide area network (WAN). In some embodiments, company network 450 may be accessible through an Internet connection. System also includes a local area network (LAN) 436. Client devices 402 and 404, which are both tablet computing devices, are communicatively coupled to LAN 436 through wireless network connections. Client devices 406 and 408 are physically coupled to LAN 436 through wired connections. Also coupled to LAN 436 is control server 352. Control 352 is communicatively coupled to machine 304, which is an epitaxial reactor, as explained above. Each of client devices 402, 404, 406, and 408 is configured to interact with control server 352 using a user interface, such as a graphical user interface (GUI). Client devices 410, 412, and 414 are also communicatively coupled to control server 352 through company network 450. Client device 410 may be executing a Windows operating system. Client device 412 may be operating, for example, an OS X operating system. Moreover, client device 414 may be operating, for example, a Linux operating system. That is, each of client devices 410, 412, and 414 are able to communicate with control server 352 regardless of the operating system running on the client device. Client devices 402, 404, 406, 408, 410, 412, and 414 may issue instructions to control server 352, such as information regarding processes and steps in the processes ("recipes") for producing products using machine 304 and for receiving status information regarding machine 304 and the components thereof. Database 416 is coupled to company network 450 and may store settings, logs, and other data to enable system 400 to operate as described herein.

In some embodiments, rather than communicating directly with control server 352, one or more of client devices 402, 404, 406, 408, 410, 412, and 416 may communicate with high-level control host 358 (FIG. 3). By communicating with high-level control host 358, rather than directly communicating with control server 352, instructions may be submitted to another control server, for example 350, 354, or 356, depending on the current capacity of each of control servers 350, 352, 354, and 356, as determined by high-level control host 358.

Figure 5:
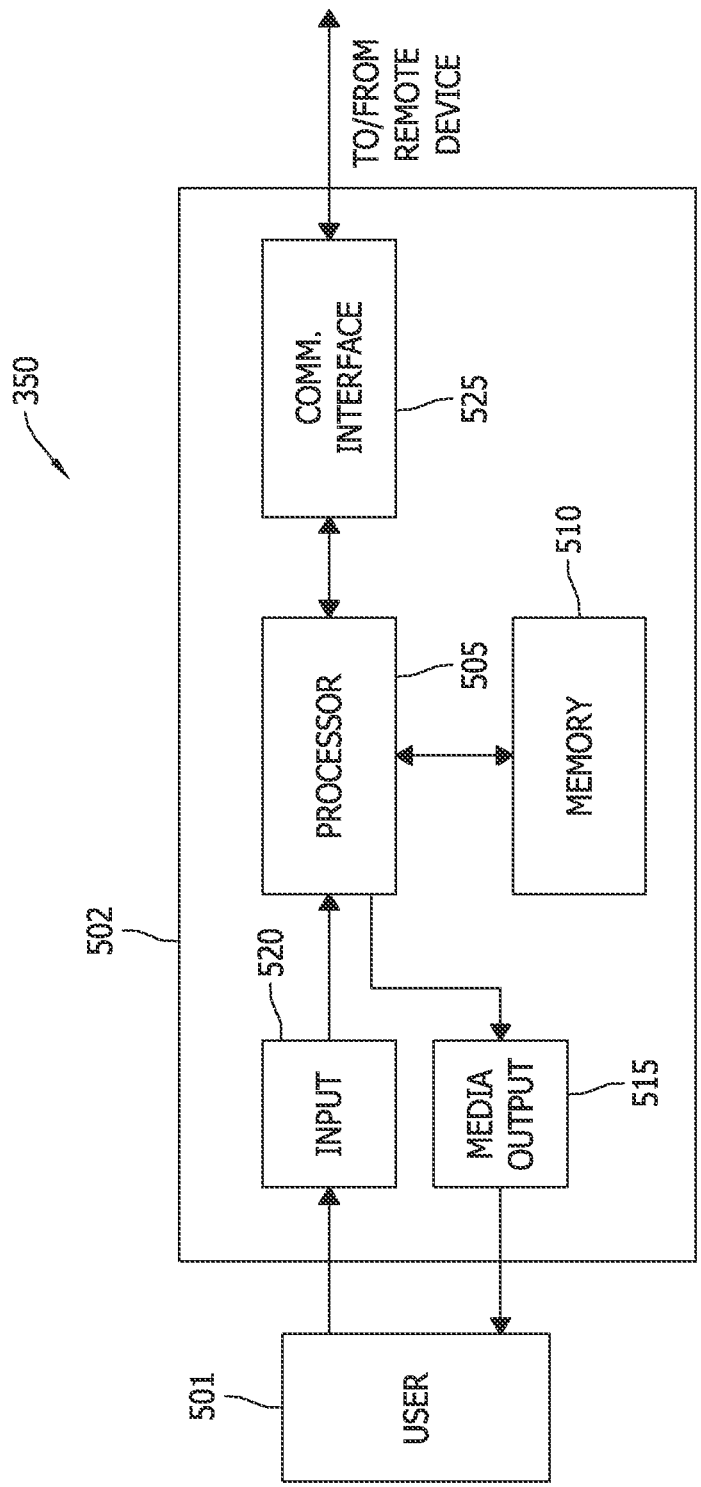
FIG. 5 illustrates a configuration of a computing device in accordance with an exemplary embodiment.

FIG. 5 illustrates a configuration of a computing device 502 in accordance with an exemplary embodiment of the present disclosure. For example, computing device 502 is representative of any of control servers 350, 352, 354, 356, high-level control host 358, and of any of client devices 402, 404, 406, 408, 410, 412, and 414. Computing device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or data to be stored and retrieved. Memory area 510 may include one or more computer readable storage device or other computer readable media, including transitory and non-transitory computer readable media.

Computing device 502 also includes at least one media output component 515 for presenting information to user 501. Media output component 515 is any component capable of conveying information to user 501. In some embodiments, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 515.

In some embodiments, computing device 502 includes an input device 520 for receiving input from user 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Computing device 502 may also include a communication interface 525, which is communicatively couplable to a remote computing device such as any of control servers 350, 352, 354, 356, high-level control host 358, and client devices 402, 404, 406, 408, 410, 412, and 414. Communication interface 525 of control servers 350, 352, 354, and 356 are additionally coupled to components of machines 302, 304, 306, and 308 as described above. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, processor-executable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from a server system. A client application allows a user, such as user 501, to display and interact with a server system, such as control server 352, in a manner that does not necessarily involve a web page or website and which may offload more storage and/or processing functions to the client application from the server system.

Memory area 510 may include, but is not limited to, any computer-operated hardware suitable for storing and/or retrieving processor-executable instructions and/or data. Memory area 510 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 510 may include multiple storage units such as hard disks or solid state disks in a redundant array of inexpensive disks (RAID) configuration. Memory area 510 may include a storage area network (SAN) and/or a network attached storage (NAS) system. In some embodiments, memory area 510 includes memory that is integrated in computing device 502. For example, computing device 502 may include one or more hard disk drives as memory 510. Memory area 510 may also include memory that is external to computing device 502 and may be accessed by a plurality of computing devices 502. The above memory types are exemplary only, and are thus not limiting as to the types of memory usable for storage of processor-executable instructions and/or data.

Control server 350 contains, within memory area 510, processor-executable instructions for executing multiple threads for controlling components of machine 302. Each thread may cause control server 350 to issue instructions to machine 302 for a series of steps (again, a "recipe") for generating a product. The threads executing in control server 350 interact with the components of machine 302 through control objects, embodied in processor-executable instructions in the memory area 510 of control server 350. The control objects are configured and managed in a particular manner that prevents multiple threads from simultaneously accessing and issuing conflicting instructions to a component of a machine 302 and/or causing race conditions or deadlocks, as known in the art of multithreaded processing. The same is true of control servers 352, 354, and 356 and respective machines 304, 306, and 308.

In this description, "lock" or "locking" means setting an exclusive access indicator to indicate that exclusive access is being provided to a single thread, and "unlock" or "unlocking" means setting the exclusive access indicator to indicate that exclusive access in not being provided to a thread. Different access indicators with different purposes are described herein. For example, certain access indicators protect reference count status variables of groups of objects whereas other access indicators protect an object's variables that reference other objects. Further, references to locking or unlocking means executing a member function which causes the above locking or unlocking.

Further, it should be understood that, in exemplary embodiments of the present disclosure, multiple copies or instances of group representative objects, control objects, and groups of control objects represented by group representative objects will typically exist in memory area 510 of control server 350 at any given time. Further, and as will be appreciated by those skilled in the art of computer programming, the functions, also known as "member functions", of a group representative object are executed from the perspective the group representative object. Likewise, functions or "member functions" of a control object are executed from the perspective of the control object. It will also be appreciated by those skilled in the art that, while an object-oriented model is used to describe the processor-executable instructions carried out by control server 350, the processor-executable instructions could be organized in any other form, for example a functional-oriented model, to obtain similar results. Further, references to a function being "called" mean that a thread has caused the function to be executed by control server 350. Further, references to a control object or group representative object executing, performing, or carrying out a function mean that a thread has called the function of that particular control object or group representative object.

The following description contains four main sections. The first section pertains to locking and unlocking groups of control objects using a group representative object. The second section pertains to providing a thread with an exclusive write lock to a shared resource, such as a critical section containing, for example, instructions and/or data, and transitioning the exclusive write lock to a read lock that is non-exclusive. During the transition, the lock is never released, thereby preventing other threads from obtaining an exclusive write lock on the critical section before the original thread obtains a read lock to the critical section. The third section pertains to scalable and deterministic counting of arbitrarily interlinked objects. The fourth section describes methods and systems for deterministic and multithreaded management of script objects. That is, the fourth section describes methods and systems that facilitate executing scripts in separate instances of a single-threaded script engine in a multithreaded operating system, to control one or more machines.

Locking Groups of Control Objects

Figure 6:
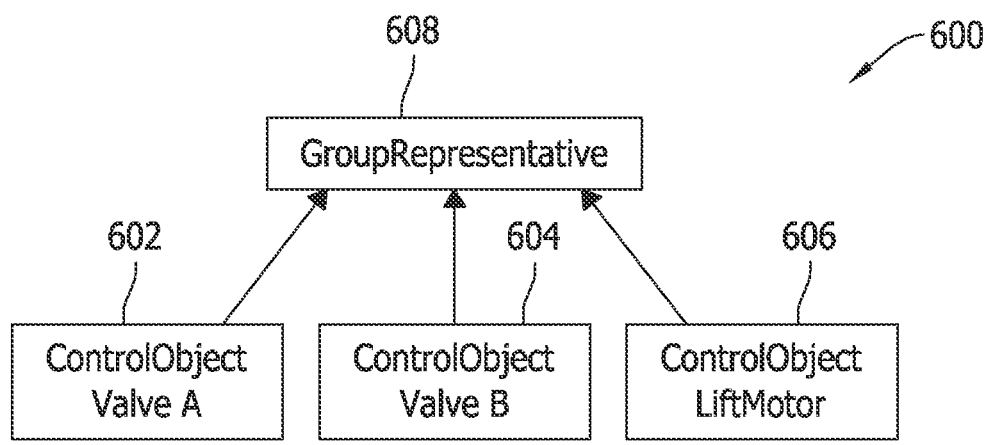
FIG. 6 is a block diagram showing three control objects associated in a group that is locked and unlocked by a group representative object.

FIG. 6 is a block diagram 600 showing three control objects 602, 604, and 606 associated in a group that is locked and unlocked by a group representative object 608. Control object 602 provides access to a first gas valve for a first gas, for example HCl in an epitaxial reactor, for example machine 304 (FIG. 3). Control object 604 provides access to a second gas valve for a second gas, for example SiHCL$_3$ in the epitaxial reactor. Control object 606 provides access to a pneumatic lift mechanism operable to raise and lower a susceptor support shaft 205 (FIG. 2) and wafer lift shaft 207 (FIG. 2) in the epitaxial reactor. Both valves may not be operated independently and the pneumatic lift mechanism must be in a specific position for the valves to operate. Violation of these conditions may cause damage to the epitaxial reactor or a silicon wafer within the epitaxial reactor.

Each of the control objects could be locked and unlocked individually to prevent multiple threads from simultaneously accessing them. This would be accomplished with a mutex assigned to each of them. However, locking all of the control objects would require locking them one at a time, and may cause deadlocks between multiple threads attempting to lock the control objects if the control objects are not locked in the same order all the time. Another approach, wherein a global lock object exists to protect critical operations that could be performed by the machine components controlled by control objects 602, 604, and 606 would result in reduced parallelism of instructions being processed by processor 505. Another solution which supports parallelism while preventing deadlocks is ordered locking. All objects of a group would be locked sequentially in a certain order (e.g., by their memory address). Unfortunately, this method has one major drawback. It creates substantial processing overhead with increasing numbers of objects belonging to a group, due to increasing sorting overhead as well as the increasing number of individual locks that need to be acquired to lock an entire group.

In the configuration shown in FIG. 6, group representative object 608 synchronizes both internal per-object operations as well as access to operations on other control objects in the group. Given that the control objects 602, 604, and 606 are grouped, race conditions and deadlocks cannot occur. Operating all of the control objects 602, 604, and 606 in the group atomically, without interference from other threads, requires only locking and unlocking the group representative object 608. By grouping control objects such that a group representative object 608 locks and unlocks access to all control objects in the group, control server 350 is able to manage access to machine components in an efficient and thread-safe manner. Moreover, within this framework, which is described in more detail below, control objects can be moved from one group to another while all machines 302, 304, 306, and 308 are operating and without stopping any processes or threads executing on control server 350.

Figure 7:
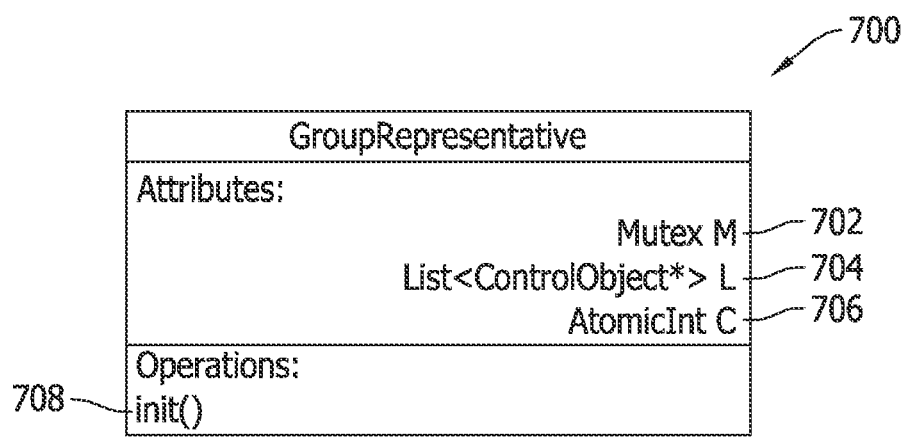
FIG. 7 is a block diagram of an embodiment of a group representative object.

FIG. 7 is a block diagram of an exemplary embodiment of a group representative object 700 in accordance with the present disclosure. The group representative object 700 is embodied in processor-executable instructions, which may be executed, for example, by processor 505 (FIG. 5) of control server 350 (FIGS. 3 and 4). Group representative object 700 includes a mutex or "exclusive access indicator" 702 which may be locked to provide a single thread with exclusive access to control objects associated with the group represented by the group representative object, and unlocked to no longer to provide the thread with exclusive access to the control objects in the group. Group representative object 700 also includes a group list 704, which contains references to the control objects in the group represented by the group representative object 700. For example, the list of references may be a list of pointers or addresses in memory area 510 of each control object in the group. Group representative object 700 further includes a reference count 706, which is a numeric value, and in the exemplary embodiment is an atomic integer, that represents the number of objects, such as control objects, referencing group representative object 700. Group representative object 700 also includes an initialization function 708.

Figure 8:
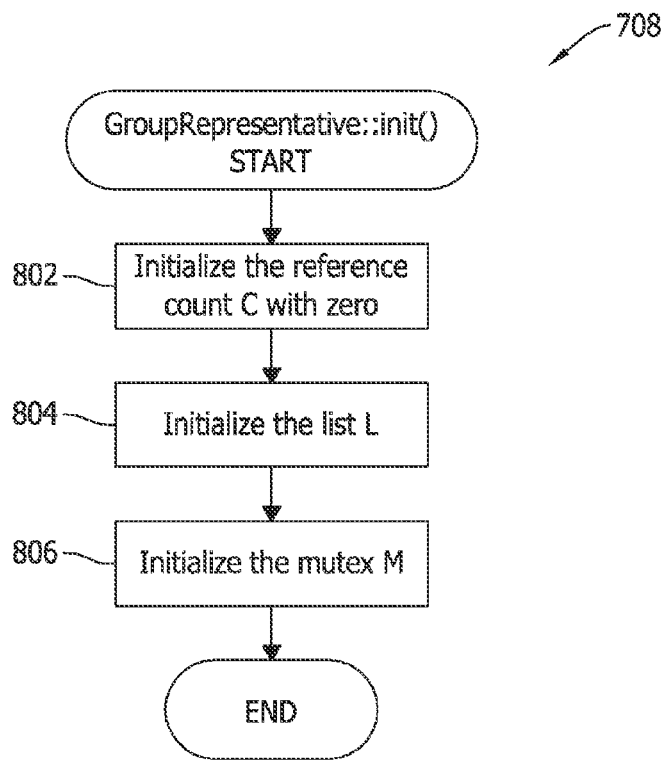
FIG. 8 is a flow chart of the steps involved in the initialization function of the group representative object.

FIG. 8 is a flow chart of the steps involved in the initialization function 708 of the group representative object 700. At step 802, reference count 706 is initialized to zero. At step 804, group list 704 is initialized to be empty. At step 806, the exclusive access indicator 702 is set to indicate that exclusive access is not being provided to a thread.

Figure 9:
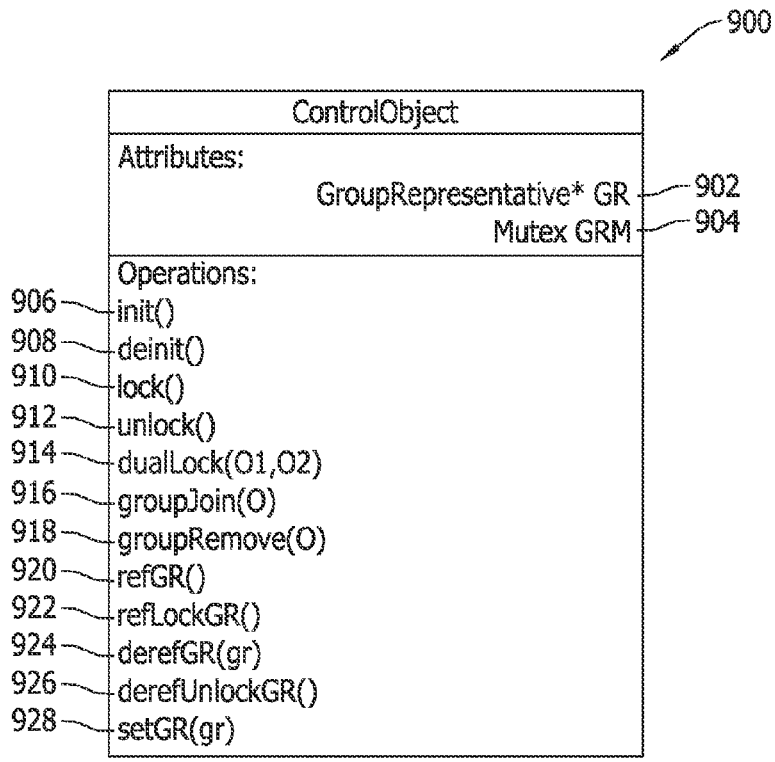
FIG. 9 is a block diagram of an exemplary embodiment of a control object.

FIG. 9 is a block diagram of an exemplary embodiment of a control object 900 in accordance with the present disclosure. The control object 900 is embodied in processor-executable instructions, which may be executed, for example, by processor 505 (FIG. 5) of control server 350 (FIGS. 3 and 4). Control object 900 includes a reference 902 to a group representative object 700. Reference 902 may be, for example, an address in memory 510 of the group representative object 700. Additionally, control object 900 includes a mutex or "exclusive access indicator" 904 which may be locked to provide a single thread with exclusive access to the reference 902 to the group representative object, and unlocked to no longer to provide the thread with exclusive access to the reference 902. Control object 900 also includes an initialization function 906, a de-initialization function 908, a lock function 910, an unlock function 912, a "dual lock" function 914, a "group join" 916 function, a "group remove" function 918, a "reference group representative" function 920, a "reference and lock group representative" function 922, a "dereference group representative" function 924, a "dereference and unlock group representative" function 926, and a "set group representative" function 928. These functions are described in detail below.

Figure 10:
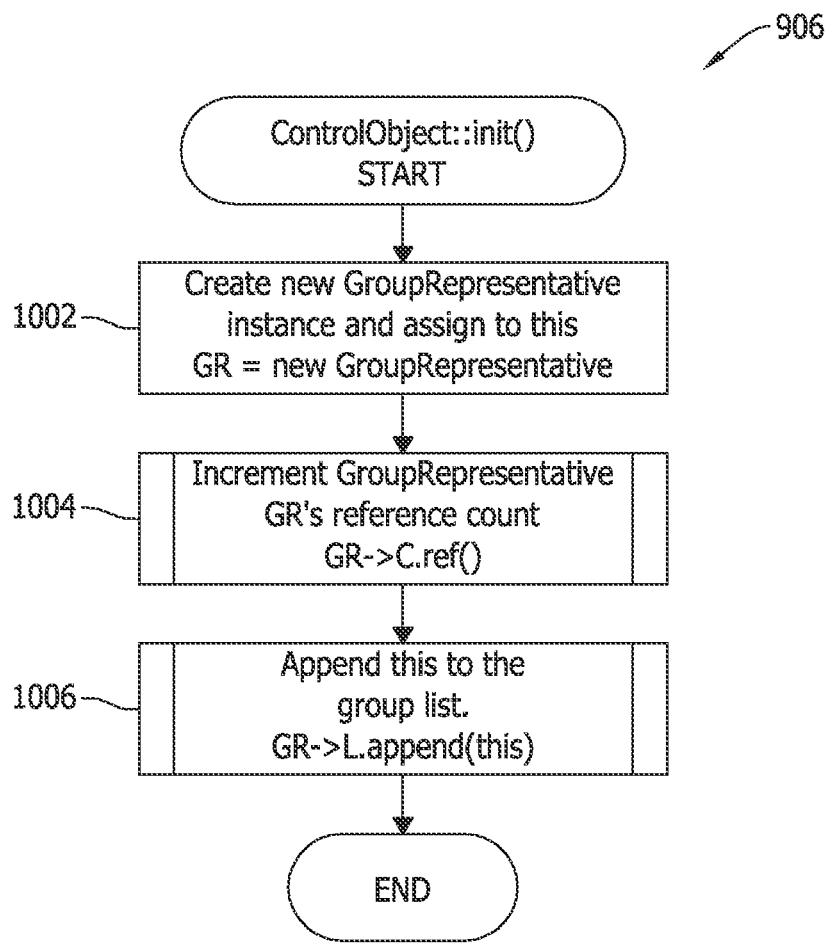
FIG. 10 is a flow chart of the steps involved in the initialization function of the control object.

FIG. 10 is a flow chart of the steps involved in the initialization function 906 of control object 900. At step 1002, a new group representative object 700 is created in memory area 510 and reference 902 is set to refer to the newly-created group representative object 700. When the group representative object 700 is created, the initialization function 708 of the group representative object 700 is performed. At step 1004, the reference count 706 of the newly-created group representative object 700 is incremented by one. At step 1006, the group list 704 of the newly-created group representative object 700 is updated to include a reference to the control object 900 whose initialization function 906 is being performed. Accordingly, the newly-created control object is in a group represented by group representative object 900.

Figure 11:
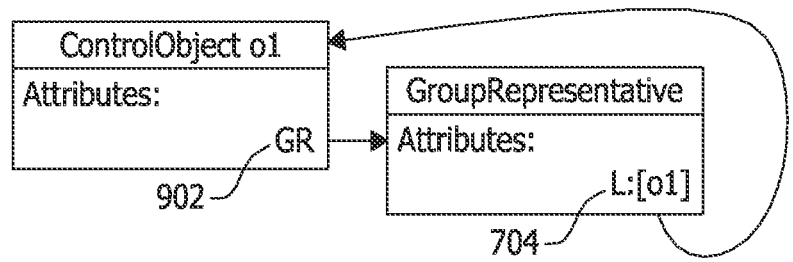
FIG. 11 is a block diagram showing results of the initialization function.

FIG. 11 is a block diagram showing the results of initialization function 906 being performed. As shown, reference 902 now refers to the newly created group representative object 700. Further, group list 704 of the newly-created group representative object 700 includes a reference to the control object 900 whose initialization function 906 was performed.

Figure 12:
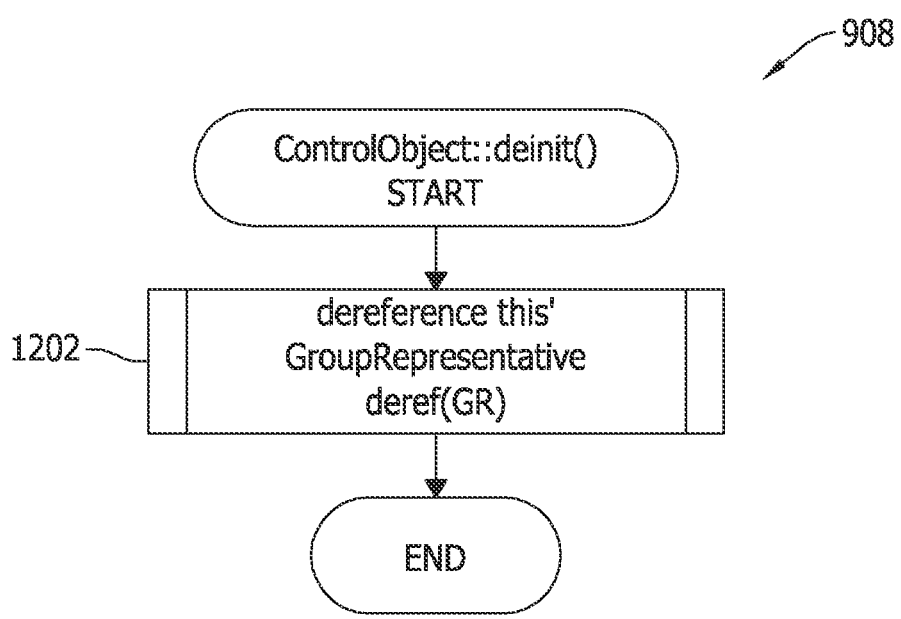
FIG. 12 is a flow chart of the de-initialization function of a control object.

FIG. 12 is a flow chart of the de-initialization function 908 of control object 900. At step 1202, the "dereference group representative" function 924 is called, and the reference 902 to the group representative object 700 is passed as a parameter to the function 924.

Figure 13:
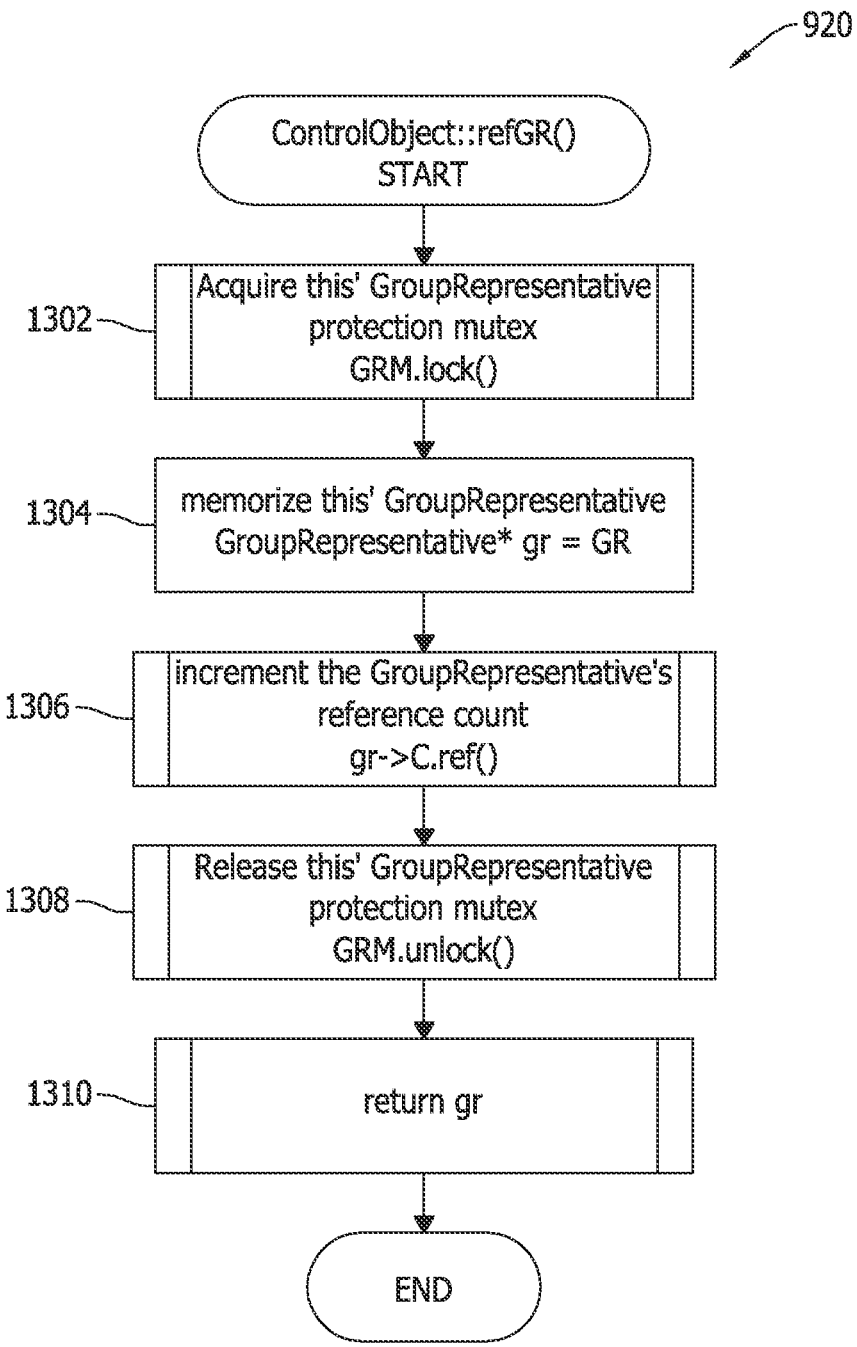
FIG. 13 is a flow chart of the steps involved in the "reference group representative" function of a control object.

FIG. 13 is a flow chart of the steps involved in the "reference group representative" function 920 of control object 900. In summary, function 920 atomically increments the reference count 706 of, and returns a reference to, a group representative object 700 associated with the control object 900 executing the function 920. The following in a more detailed description of function 920. At step 1302, exclusive access indicator 904 for the group representative reference 902 is locked. Accordingly, exclusive access to the group representative reference 902 is provided to a single thread executing the "reference group representative" function 920. At step 1304, a copy of the group representative reference 902 is made. At step 1306, the reference count 706 of the group representative 900 is incremented by one. At step 1308, the exclusive access indicator 904 for the group representative reference 902 is unlocked. At step 1310, the reference group representative function 920 returns the copy made in step 1304.

Figure 14:
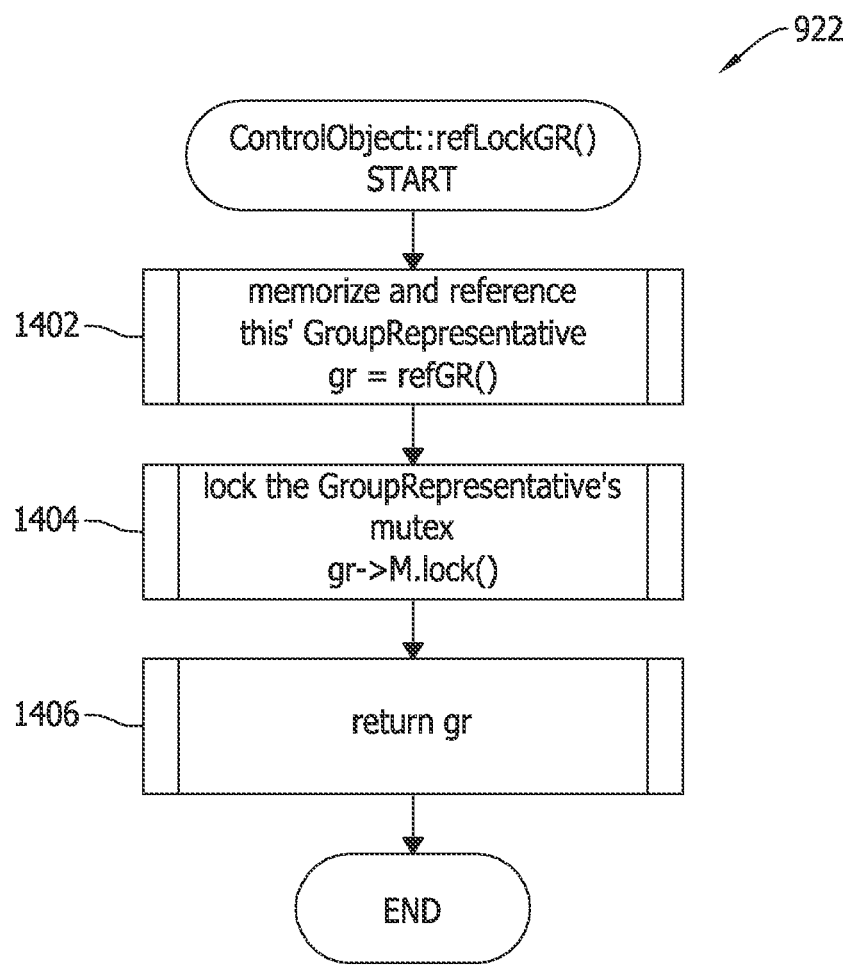
FIG. 14 is a flow chart of steps involved in the "reference and lock the group representative" function of a control object.

FIG. 14 is a flow chart of steps involved in the "reference and lock the group representative" function 922. In summary, function 922 locks the group representative object 700 associated with a control object 900 and returns a reference to the group representative object 700. At step 1402, the "reference group representative" function 920 is called and the returned reference to the group representative object 700 is stored in a temporary variable in memory area 510. At step 1404, the exclusive access indicator 702 of the referenced group representative object 700 is locked, thereby providing exclusive access to the referenced group representative object 700 to a thread executing this function 922. At step 1406, the "reference and lock the group representative" function 922 returns the reference stored at step 1402.

Figure 15:
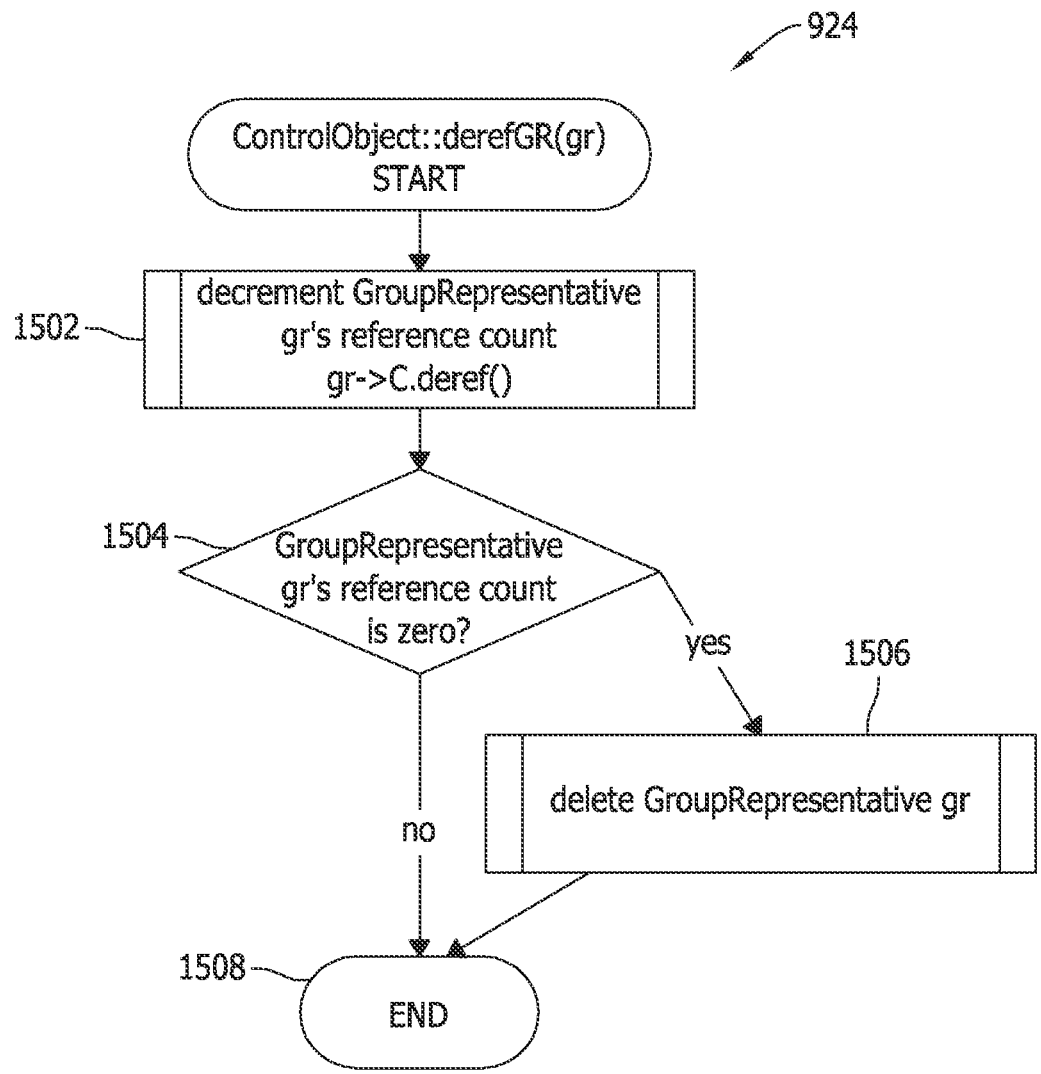
FIG. 15 is a flow chart of steps involved in the "dereference group representative" function of a control object.

FIG. 15 is a flow chart of steps involved in the "dereference group representative" function 924. In summary, function 924 decrements the reference count 706 of, and potentially discards from memory, a group representative object 700. The function 924 receives, as a parameter, a reference to the group representative object 700. At step 1502, the reference count 706 of the referenced group representative object 700 is decremented by one. At step 1504, it is determined whether the reference count 706 decremented at step 1502 is equal to zero. If the reference count 706 is zero, then at step 1506, the referenced group representative object 700 is deleted from memory area 510 and the function ends at step 1508. That is, given that the reference count 706 indicates that no control objects are referencing the group representative object 700, then no control objects 900 are in a group represented by the group representative object 700 and the group representative is therefore no longer needed in memory area 510. On the other hand, if the reference count 706 is not zero, then at least one control object 900 is in a group represented by the referenced group representative object 700. Accordingly, the group representative object 700 is not deleted from memory area 510 and the function 924 ends at step 1508.

Figure 16:
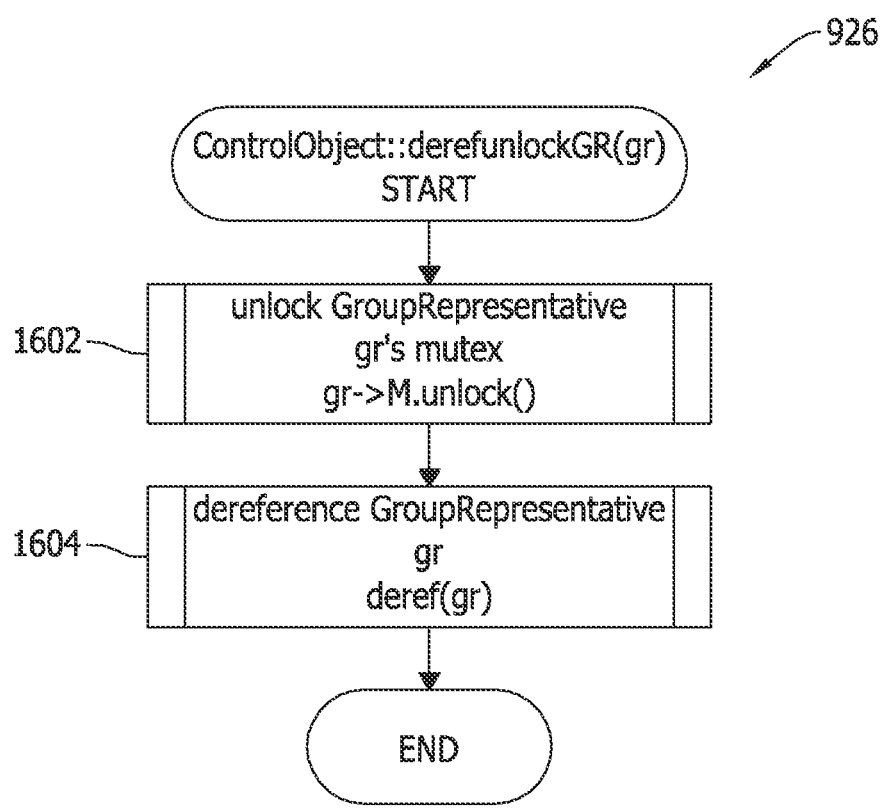
FIG. 16 is a flow chart of steps involved in the "dereference and unlock group representative" function of a control object.

FIG. 16 is a flow chart of steps involved in the "dereference and unlock group representative" function 926. In summary, function 926 unlocks and dereferences a group representative object 700. The function 926 receives, as a parameter, a reference to the group representative object 700. At step 1602, the exclusive access indicator 702 of the referenced group representative object 700 is unlocked. Accordingly, a thread that previously had exclusive access to the group of control objects represented by the referenced group representative object 700 no longer has exclusive access, and the control objects 900 represented by the referenced group representative object 700 become available for another thread to obtain exclusive access of them. At step 1604, the "dereference group representative" function 924 is called, and a reference to the group representative object 700 is passed as a parameter to the "dereference group representative" function 924.

Figure 17:
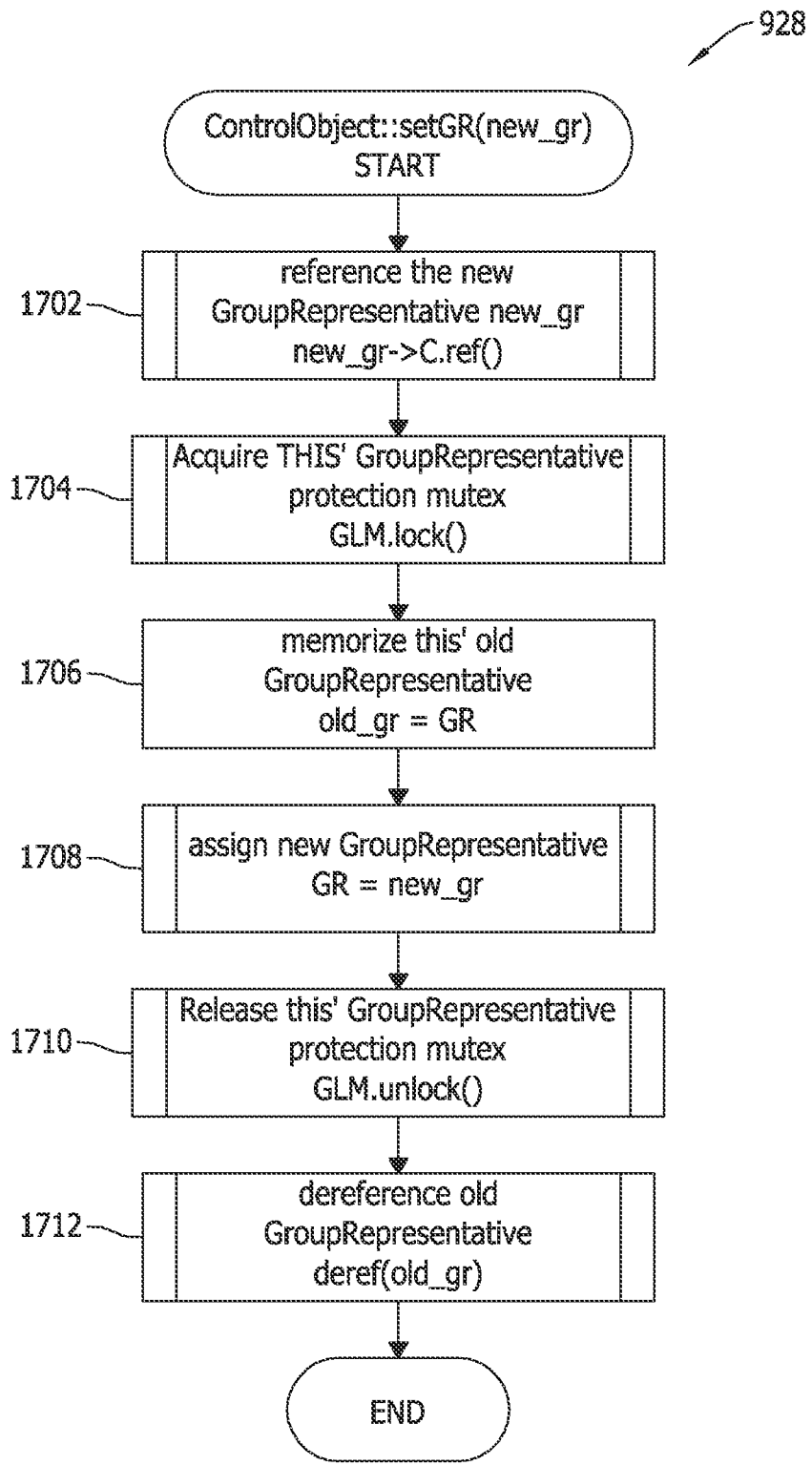
FIG. 17 is a flow chart of steps involved in the "set group representative" function of a control object.

FIG. 17 is a flow chart of steps involved in the "set group representative" function 928. In summary, function 928 associates the control object 900 executing function 928 with a group representative object 700. The function 928 receives, as a parameter, a reference to the group representative object 700. At step 1702, the reference count 706 of the referenced group representative object 700 is incremented by one. At step 1704, the exclusive access indicator 904 for group representative reference 902 is locked, thereby providing exclusive access to the group representative reference 902 to a thread executing function 928. At step 1706, a temporary copy of group representative reference 902 is created in memory area 510. At step 1708, group representative reference 902 is updated to refer to the group representative object 700 referred to by the reference passed in as a parameter to function 928. At step 1710, the exclusive access indicator 904 for group representative reference 902 is unlocked, thereby releasing the exclusive access to reference 902 and making reference 902 available to other threads. At step 1712, the "dereference group representative" function 924 is called, passing in the temporary copy of group representative reference 902, created at step 1706, as a parameter to the "dereference group representative" function 924.

Figure 18:
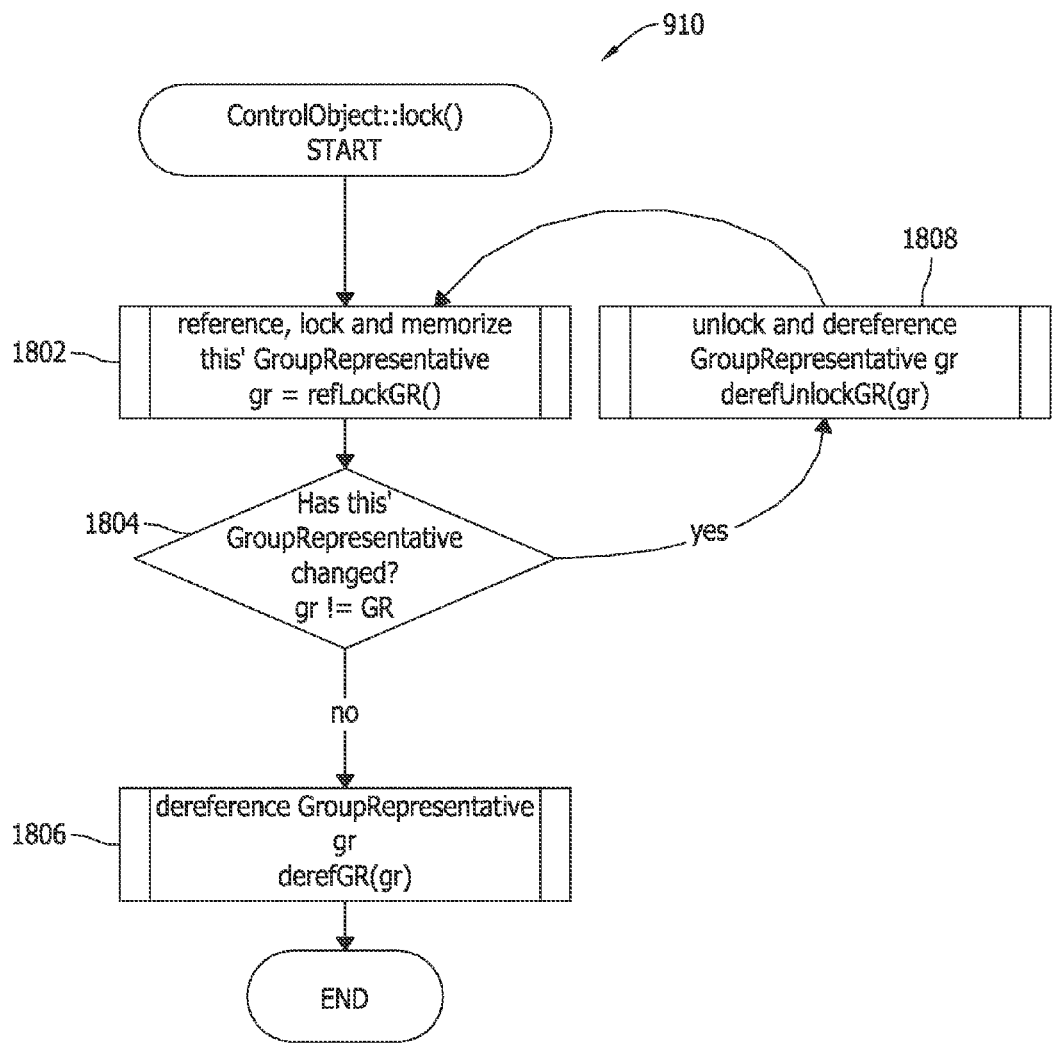
FIG. 18 is a flow chart of steps involved in the lock function of a control object.

FIG. 18 is a flow chart of steps involved in the lock function 910. In summary, function 910 locks the group associated with the control object 900 executing function 910. At step 1802, the "reference and lock group representative" function 922 is called. Function 922 locks the exclusive access indicator 702 of, and returns a reference to, the group representative object 700 referred to by group representative reference 902 of the control object 900 executing function 922. The returned reference is stored in a temporary reference variable in memory area 510. At step 1804, the temporary reference variable is compared to group representative reference 902 of the control object 900 executing function 910. That is, given that other threads are able to access and potentially change reference 902 after step 1802 is performed but before step 1804 is performed, step 1804 determines whether the temporary reference variable stored at step 1802 refers to the same group representative object referenced by group representative reference 902.

If the temporary reference variable and representative reference 902 refer to the same group representative object, then function 910 proceeds to step 1806 where the "dereference group representative" function 924 is called, passing in the temporary reference variable as a parameter. However, if at step 1804 the temporary reference variable and group representative reference 902 refer to different group representative objects, then another thread must have changed the group representative reference 902 between steps 1802 and 1804. Accordingly, function 910 proceeds to step 1808, where the "dereference and unlock group representative" function 926 is called, passing in the temporary reference variable as a parameter. Function 910 then proceeds back to step 1802. Steps 1802, 1804, and 1808 will loop continuously until the temporary reference variable stored at step 1802 references the same group representative object as does group representative reference 902, at step 1804.

Figure 19:
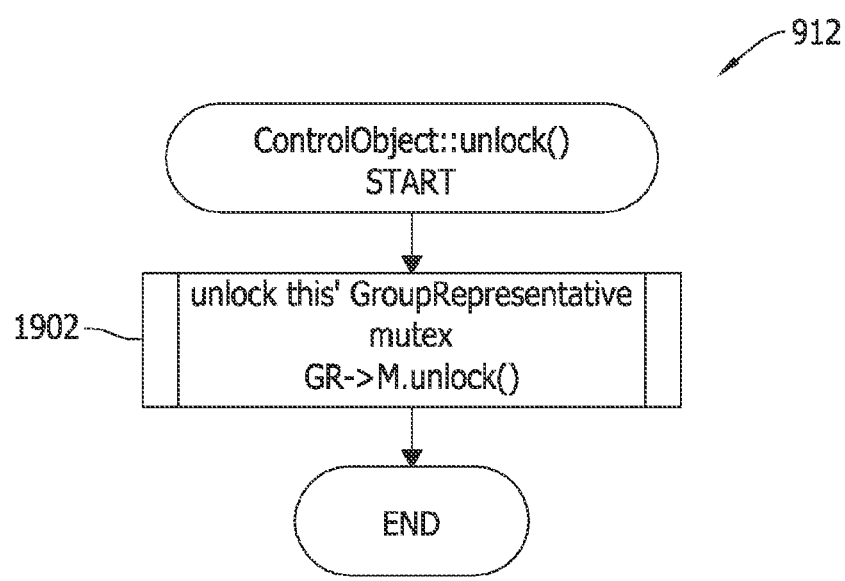
FIG. 19 is a flow chart of the unlock function of a control object.

FIG. 19 is a flow chart of the unlock function 912. In summary, function 912 unlocks the group associated with the control object 900 executing function 912. At step 1902, the exclusive access indicator 702 of the group representative object 700 associated with the control object 900 executing function 912 is unlocked. Accordingly, no single thread has exclusive access to the control objects 900 in the group associated with the control object 900 executing function 912.

Figure 20:
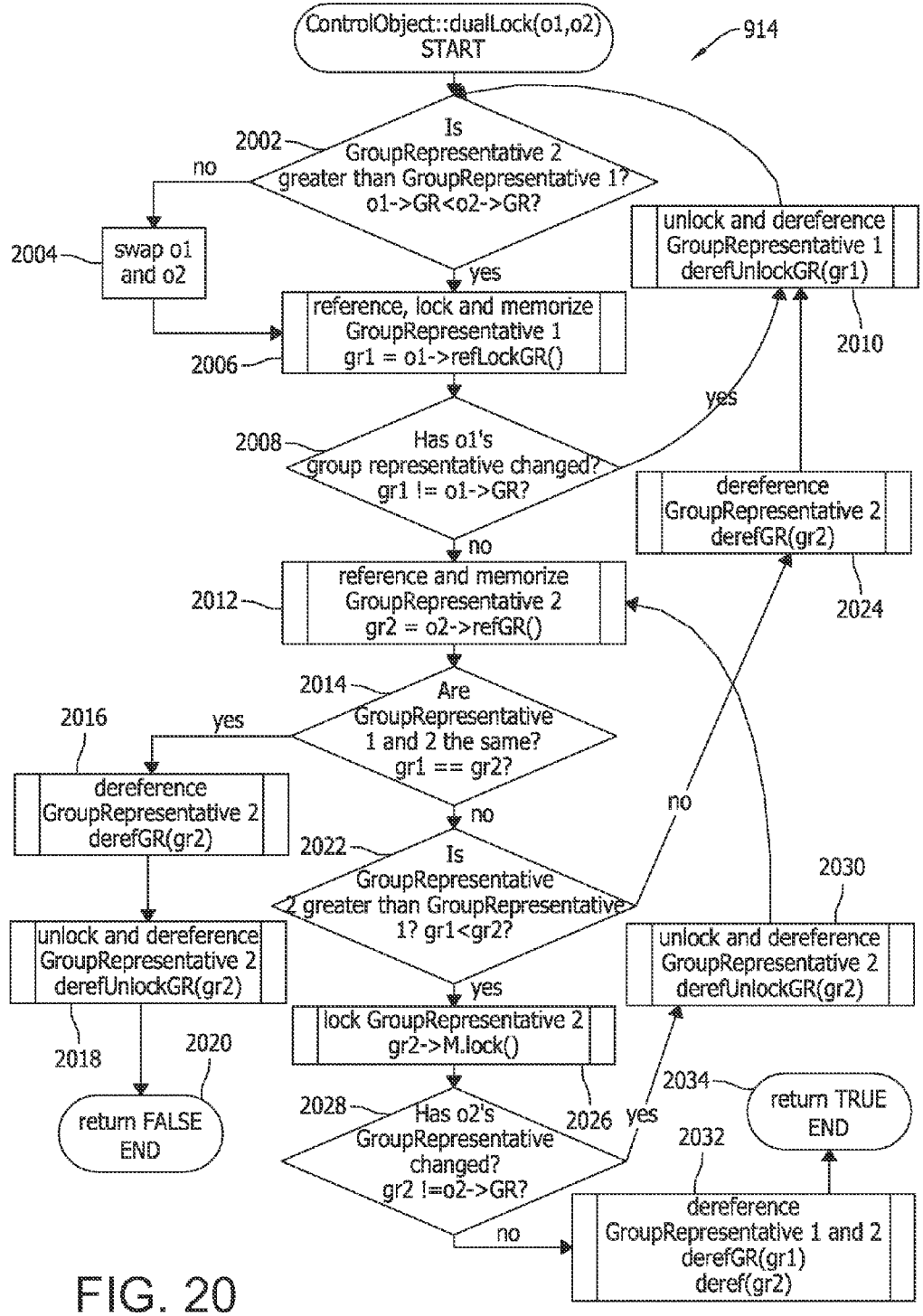
FIG. 20 is a flow chart of steps involved in the "dual lock" function of a control object.

FIG. 20 is a flow chart of steps involved in the "dual lock" function 914. In summary, the "dual lock" function 914 locks two groups, giving a thread executing the function 914 exclusive access to the control objects in the two groups. The function 914 receives, as parameters, a first reference to a first control object and a second reference to a second control object. At step 2002, the function 914 determines whether the group representative reference 902 of the first control object is less than the group representative reference 902 of the second control object. That is, given that references are numeric addresses in memory area 510, one reference can be numerically compared against another reference to see which one has the greater value and which one has the lesser value. If the group representative reference 902 of the first control object not is less than the group representative reference 902 of the second control object, then at step 2004, the first reference to the first control object is changed to reference the second control object and the second reference to the second control object is changed to reference the first control object.

The reason for performing step 2004 is that, in subsequent steps, the groups associated with the two control objects are locked and unlocked. If multiple threads are concurrently performing locking and unlocking operations on groups of control objects, it is possible for a deadlock to occur if the groups are not locked and unlocked in the same order every time. To ensure that the same order is used by every thread, the order in which groups are locked and unlocked is determined based on the memory addresses of their respective group representative objects 700. In the exemplary embodiment, the order of locking is smallest memory address to largest memory address. In other embodiments, the order may be reversed, or based on a property other than an address in memory area 510. For simplicity, the "first control object" shall mean to the control object whose associated group representative object (i.e., the group representative object 700 referenced by group representative reference 902) has the smaller memory address and the "second control object" shall mean the control object whose group representative object has the larger memory address.

At step 2006, the "reference and lock group representative" function 922 of the first control object reference is called. Function 922 locks and returns a copy of the first control object's group representative reference. The copy is stored in a first temporary group representative reference variable, "gr1". At step 2008, gr1 is compared to the first control object's group representative reference to determine if they are equal. If they are not equal, then at step 2010, the "dereference and unlock group representative" function 926 is called, passing gr1 as a parameter to the function 926, and the function 922 proceeds to step 2002. This process is similar to steps 1802, 1804, and 1808 of FIG. 18. If, however, gr1 and the first control object's group representative reference 902 are equal, then function 914 proceeds to step 2012.

At step 2012, the "reference group representative" function 920 of the second control object is called. Function 920 returns a copy of the second control object's group representative reference 902. The copy is stored in a second temporary group representative reference variable, "gr2". At step 2014, gr1 is compared to gr2 to determine whether they are equal. If they are equal, then the first control object and the second control object belong to the same group, because they share the same group representative object. Accordingly, steps 2016, 2018, and 2020 are performed.

At step 2016, the "dereference group representative" function 924 is called and gr2 is passed in as a parameter. At step 2018, the "dereference and unlock group representative" function 926 is called and gr1 is passed in as a parameter. At step 2020, function 914 returns false. In step 2014, if gr1 and gr2 are determined to be not equal, this means that the first control object and the second control object are not in the same group. Accordingly, function 914 proceeds to step 2022 where it is determined whether gr1 is less than gr2. That is, it is determined whether the group representative object referred to by gr1 is at a smaller memory address than the group representative object referred to by gr2. If not, this means that another thread changed the second control object's group representative (i.e., another thread moved the second control object to another group. The first control object's group representative can no longer be changed as it is already locked.) Accordingly, function 914 proceeds to steps 2024, 2010 (discussed above), and 2002 (discussed above). At step 2024, the "dereference group representative" function 924 is called, passing gr2 in as a parameter.

At step 2026, the exclusive access indicator 702 of the group representative object 700 referred to by gr2 is locked, thereby locking the group associated with the group representative object 700. At step 2028, function 914 determines whether gr2 is not equal to the group representative reference 902 of the second control object. If they are different, this means another thread moved the second control object to a different group while a first thread was executing function 914. Accordingly, function 914 proceeds to step 2030 where the "dereference and unlock group reference" function 926 is called, passing gr2 in as a parameter. Subsequently, function 914 loops back to step 2012 (discussed above) to assign gr2 to the group representative object now associated with the second control object.

If, at step 2028, gr2 is equal to the group representative reference 902 of the second control object, then function 914 proceeds to step 2032. At step 2032, the function "dereference group representative" is called passing gr1 in as a parameter and called again, passing gr2 in as a parameter. Accordingly, step 2032 causes gr1 and gr2 to no longer reference group representative objects and decrements the reference counts 706 of the group representative objects previously referenced by gr1 and gr2. At step 2034, function 914 returns true, indicating that the two groups (i.e., the group associated with the first control object and the group associated with the second control object) have been successfully locked.

Figure 21:
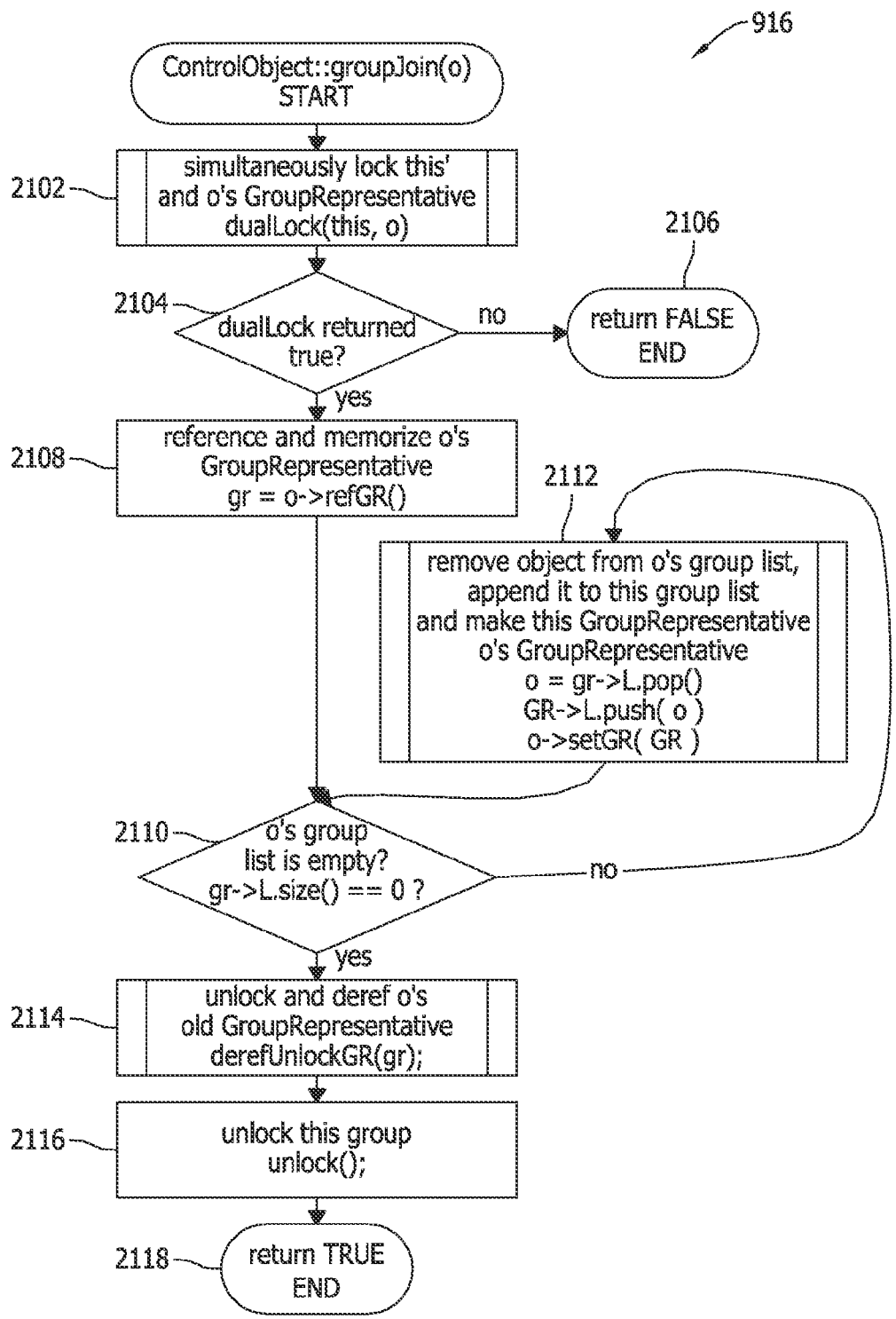
FIG. 21 is a flow chart of steps involved in the "group join" function of a control object.

FIG. 21 is a flow chart of steps involved in the "group join" function 916. This function receives, as a parameter, a reference to a control object 900 (hereinafter "co1"). The control object 900 executing "group join" function 916 belongs to a first group, and co1 belongs to a second group. At step 2102, the "dual lock" function 914 is called and a reference to the control object executing function 916, along with the reference to co1 are passed in as parameters to the "dual lock" function 914. As discussed with reference to FIG. 20, the "dual lock" function 914 returns true or false to represent whether it successfully locked two different groups. More specifically, if two control objects whose groups are to be locked actually belong to the same group, then the "dual lock" function 914 returns false. In the "group join" function 916, which moves control objects from one group to another group, nothing is to be done if all of the control objects are already in the same group. Accordingly, if the "dual lock" function 914 returns false, this means that the first group and the second group are in fact the same group. In this case, function 916 proceeds to step 2106 where it returns false and ends. If, instead, the "dual lock" function 914 returns true, then the first group and the second group are indeed different groups, and function 916 proceeds to step 2108.

At step 2108, the "reference group representative" function 920 of co1 is called. The "reference group representative" function 920 returns the group representative reference 902 of co1. A copy of the group representative reference 902 is stored in a temporary reference variable. At step 2110, function 916 determines whether the group list 704 of the group representative object 700 referenced by the temporary reference variable is empty. If the group list 704 is not empty, then function 916 proceeds to step 2112. In other words, if the second group is not empty, then function proceeds to step 2112. At step 2112, a control object is removed from the second group and added to the first group. Additionally, the moved control object is updated such that its group representative reference 902 is changed to point to the group representative object associated with the first group. Function 916 loops back to step 2110 to determine whether the second group is now empty. If not, then function 916 loops back to step 2110, moves another control object from the second group to the first group, and so on.

If and when function 916 determines, at step 2110, that the second group is empty, then function 916 proceeds to step 2114. At step 2114, function 916 calls the "dereference and unlock group representative" function 926, passing in the reference to the group representative object for the second group. As a result of the second group not having any control objects in it and the reference count 706 for the group representative object for the second group being zero, the group representative object for the second group is removed from memory are 510. The steps of the "dereference and unlock group representative" function 926 are described in more detail above, in association with FIG. 16. At step 2116, the first group is unlocked and at step 2118, function 916 returns true.

Figure 22:
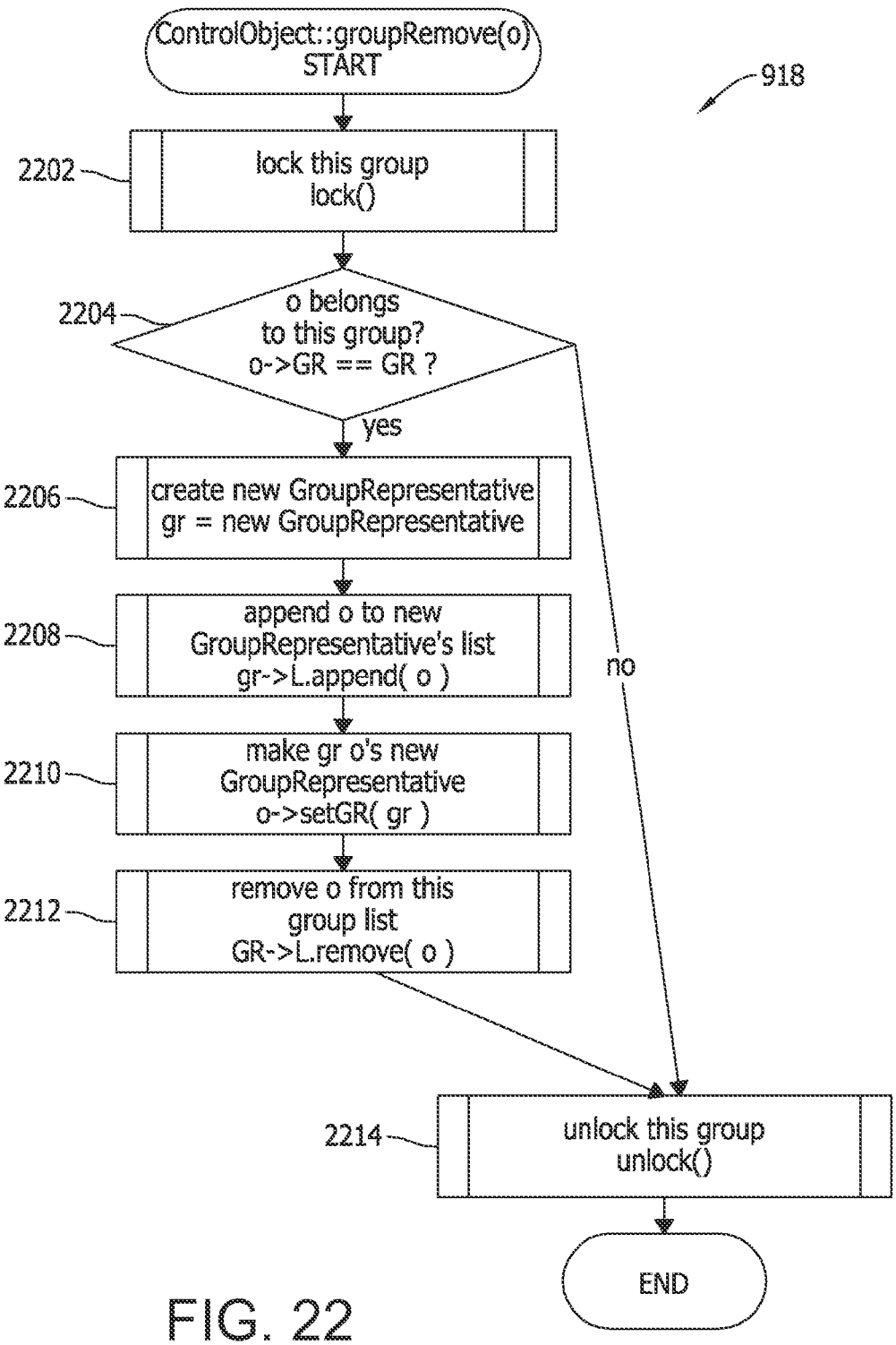
FIG. 22 is a flow chart of steps involved in the "group remove" function, which removes a control object from a group.

FIG. 22 is a flow chart of steps involved in the "group remove" function 918, which removes a control object from a group. A reference to the control object (hereinafter "o1") to be removed is received as a parameter to function 918. At step 2202, the lock function 910 of the control object executing function 918 is called. Accordingly, the group associated with the control object executing function 918 is locked. At step 2204, function 918 determines whether control object o1 and the control object executing function 918 are associated with the same group representative object 700. That is, control object o1's group representative reference 902 is compared to the group representative reference of the control object executing function 918. If the two group representative references point to the same group representative object, then control object o1 and the control object executing function 918 are in the same group. If control object of and the control object executing function 918 are in the same group, the function 918 proceeds to step 2206. At step 2206, a new group representative object is created. At step 2208, the group list 704 of the newly-created group representative object is updated to include a reference to control object o1.

At step 2210, control object o1 is updated such that its group representative reference 902 points to the newly-created group representative object. As a result of steps 2206, 2208, and 2210, a new group is created and control object o1 becomes a part of the newly-created group. At step 2212, control object of is removed from its original group (i.e., the group that the control object executing function 918 belongs to). At step 2214, the group associated with the control object executing function 918 is unlocked, allowing other threads to access it. If, at step 2204, it is determined that control object o1 and the control object executing function 918 are not in the same group, function 918 proceeds to step 2214, discussed immediately above.

Figure 23:
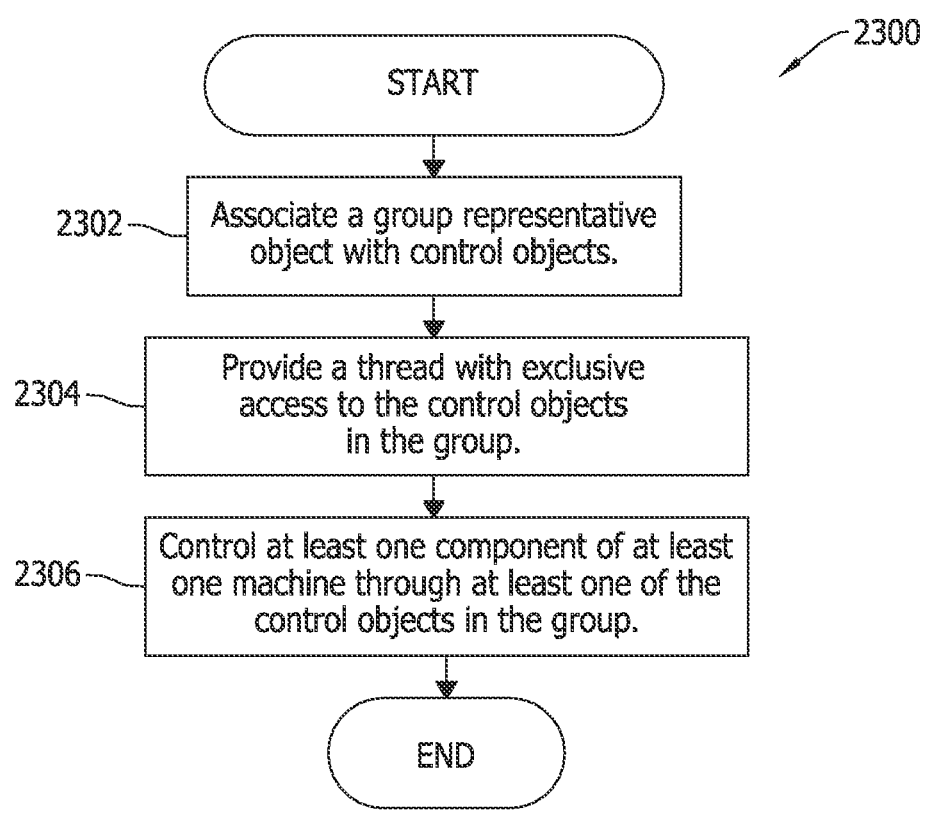
FIG. 23 is a flow chart of steps of a method performed in accordance with an embodiment.

FIG. 23 is a flow chart of steps of a method 2300 performed in accordance with an exemplary embodiment of the present disclosure. The method begins with a general startup phase. At step 2302, multiple control objects 900 are each associated with a group representative object 700, thereby forming a group. That is, for each control object 900, the "set group representative" function is called, passing in a reference to the group representative object 700. Alternatively, after executing the "set group representative" function 928 for one of the control objects 900, the "group join" function 916 of that control object 900 may be called to add the other control objects to the group. In adding the control objects 900 to the group, the group representative reference 902 of each control object 900 is set to refer to the group representative object 700. Additionally, a reference to each control object 900 is added to group list 704 of group representative object 700, and reference count 706 of group representative object 700 is incremented for each control object 900 that joins the group.

After the general startup phase, described above, an active run phase occurs. During the active run phase, multiple threads are executing in parallel, whereby each thread has a different task, but accesses the same control objects or groups of control objects. During thread execution, locking, performing exclusive operations, and unlocking is a recurring pattern. At step 2304, one of multiple threads running concurrently on control server 350 requests and is given exclusive access to the group of control objects. Exclusive access to the group is provided when the lock function 910 of any of the control objects 900 in the group is called. That is, by locking one control object 900 in the group, the entire group is locked. The lock function 910 is described in detail with reference to FIG. 18. The lock function 910 causes the exclusive access indicator 702 of the group representative object 700 to indicate that exclusive access to the control objects in the group are being provided to a thread.

Once the control objects 900 in the group are locked, the thread with the exclusive access may call one or more functions of one or more of the control objects 900 in the group to control 2306 a component of a machine. That is, the control objects 900 may include one or more functions for causing control server 352 to issue instructions through communication interface 525 to one or more components of a machine, such as machine 304 (an epitaxial reactor) to perform an operation, as described with reference to FIG. 6. When the above-discussed thread no longer needs exclusive access to the control objects 900, the control objects 900 are unlocked using the unlock function 912 explained above.

Write-Read Transition Lock

FIG. 24 is a block diagram of an exemplary embodiment of a write-read transition lock object 2400 (hereinafter "WRTLock object") in accordance with the present disclosure. WRTLock object 2400 is embodied in processor-executable instructions, which may be executed, for example, by processor 505 (FIG. 5) of control server 350 (FIGS. 3 and 4). WRTLock object 2400 includes a number of attributes discussed below. WRTLock object 2400 manages access among one or more threads to at least one "critical section". A critical section, as used herein, is one or more resources shared between multiple threads. For example, a critical section might include access to shared memory, one or more control objects, attributes, variables, instructions, data, or other items shared among multiple threads. One attribute of WRTLock object 2400 is a mutex or "exclusive access indicator" 2402, which may be locked and unlocked to control access to attributes or internal variables of WRTLock object 2400 described below.

As one attribute, WRTLock object 2400 includes a reader wait condition 2404, which is used in synchronizing read access among threads, as described herein. Additionally, WRTLock object 2400 includes a writer wait condition 2406, which is used in synchronizing write access among threads, as described herein. WRTLock object 2400 further includes an access count 2408, a read contender count 2410, and a write contender count 2412, all three of which are numeric values. Access count 2408 is used to track a number of threads with read access to the critical section or to indicate that exclusive write access to the critical section is being provided to a single thread. Read contenders count 2410 represents a number of threads seeking read access to the critical section. Write contenders count 2412 represents a number of threads seeking write access to the critical section. Additionally, WRTLock object 2400 includes a write-to-read transition flag 2414, which is a bool value, Boolean value, or other value capable of representing a true condition and a false condition. Write-to-read transition flag 2414 indicates whether a lock (i.e., "exclusive access") to the critical section has transitioned from write access to read access.

WRTLock object 2400 implements a number of functions or operations for managing access to a critical section and for maintaining the above-discussed attributes. WRTLock object 2400 includes an initialization function 2416, an unlock function 2418, a read lock function 2420, a write lock function 2422, and a write-to-read transition function 2424. These functions are described in more detail below.

Figure 25:
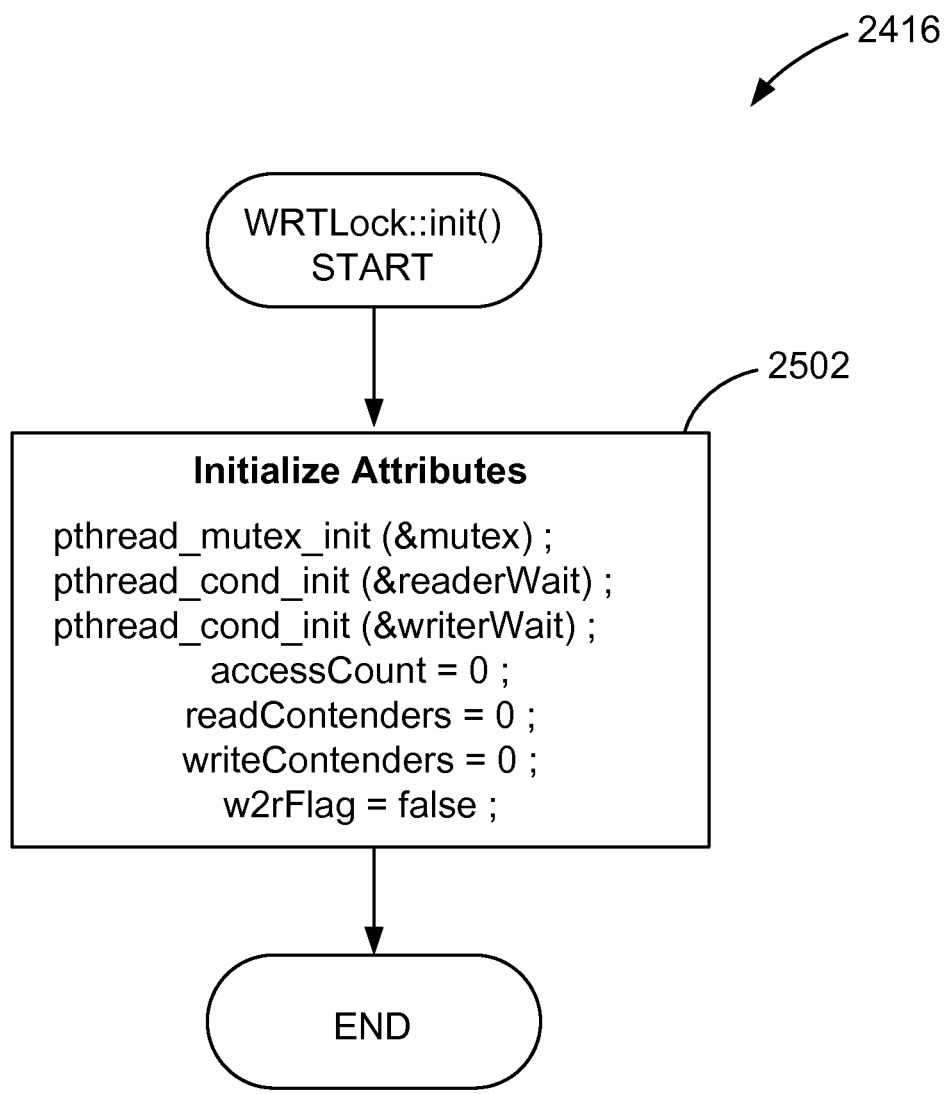
FIG. 25 is a flow chart of the initialization function of the WRTLock object.

FIG. 25 is a flow chart of initialization function 2416 of WRTLock object 2400. In step 2502, all attributes are set to a false, zero, or other initial state indicating that WRTLock object 2400 is not yet managing access among one or more threads to a critical section. That is, exclusive access indicator 2402 is initialized to an unlocked state and reader wait condition 2404 and writer wait condition 2406 are set to corresponding initialization values. Further, access count 2408, read contenders count 2410, and write contenders count 2412 are set to zero, and write-to-read transition flag 2414 is set to false.

Figure 26A:
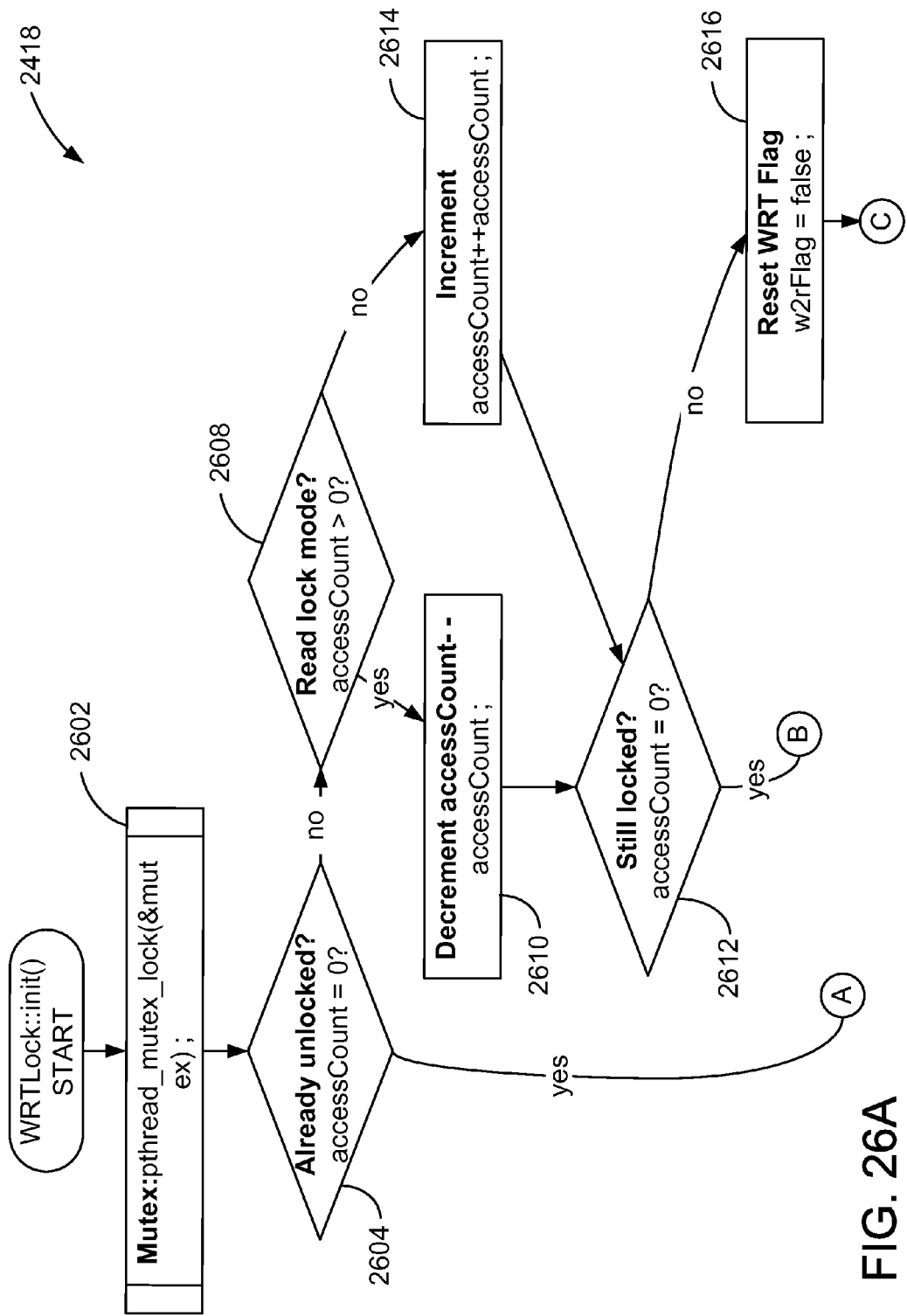
FIGS. 26A and 26B are flow charts of the unlock function of the WRTLock object.
Figure 26B:
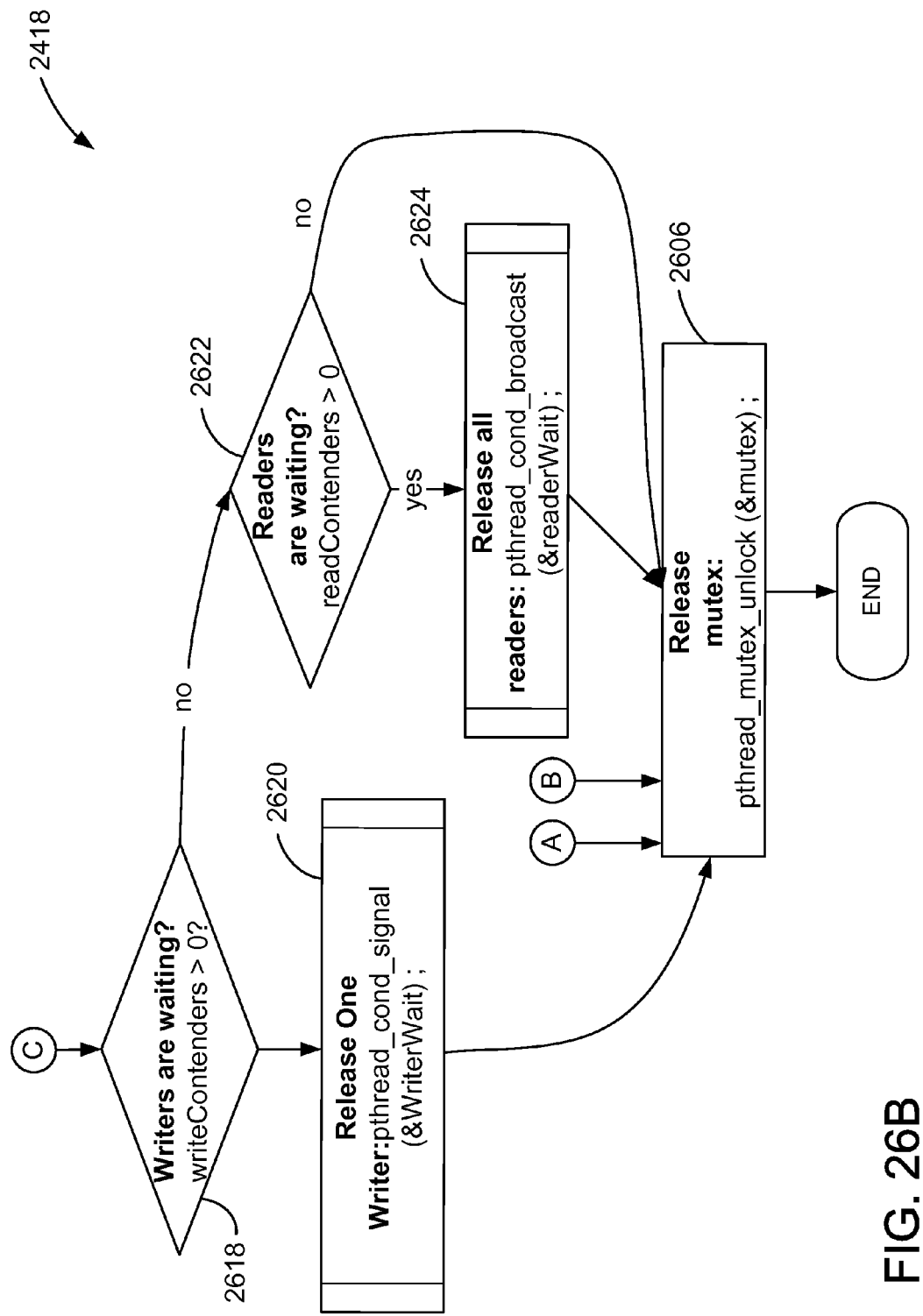

FIGS. 26A and 26B are flow charts of unlock function 2418 of WRTLock object 2400. This function may be called by a thread seeking to release a read or write lock on the critical section maintained by WRTLock object 2400. At step 2602, WRTLock object 2400 locks exclusive access indicator 2402. In locking exclusive access indicator 2402, WRTLock object 2400 first determines whether exclusive access indicator is already locked by another thread. If so, WRTLock object 2400 waits until exclusive access indicator 2402 is unlocked by another thread, then proceeds to lock exclusive access indicator 2402. Next, at step 2604, WRTLock object 2400 determines whether access count 2408 is equal to zero. That is, if access count 2408 is equal to zero, then no threads are accessing a critical section managed by WRTLock object 2400. In that case, WRTLock object 2400 proceeds to step 2606 where exclusive access indicator 2402 is unlocked. If, on the other hand, access count 2408 is not zero, the WRTLock object 2400 proceeds to step 2608. At step 2608, WRTLock object 2400 determines whether access count 2408 is greater than zero. If access count 2408 is greater than zero, this indicates that one or more threads have a read lock on the critical section managed by WRTLock object 2400. Accordingly, WRTLock object 2400 proceeds to step 2610 and decrements access count 2408 by one. If, on the other hand, access count 2408 was not greater than zero in step 2608, and also not equal to zero, as determined in step 2404, WRTLock object 2400 instead proceeds to step 2614 and increments access count 2408 by one.

As explained in more detail in the discussions of the various functions of WRTLock object 2400, access count 2408 is greater than zero if one or more threads have read access to the critical section. For example, if two threads have read access to the critical section, access count 2408 is equal to two. On the other hand, access count 2408 is equal to negative one if a thread has write access to the critical section. Access count 2408 will not go below negative one because only one thread may have write access to the critical section at a time. However, multiple threads may have read access to the critical section at a time. Further, and as will be appreciated from the detailed description herein, there cannot be a situation where at least one thread has read access while another thread simultaneously has write access to the critical section.

At step 2612, WRTLock object 2400 determines whether access count 2408 is not equal to zero. That is, if access count 2408, after being incremented or decremented in the previous step (2610 or 2614), might be equal to zero, indicating that no threads are currently accessing (i.e., reading or writing to) the critical section. If access count 2408 is not equal to zero, then at least one thread is still accessing the critical section. If access count 2408 is not equal to zero, WRTLock object 2400 proceeds to step 2606 where exclusive access indicator 2402 is unlocked. If, instead, access count 2408 is equal to zero, WRTLock object 2400 proceeds to step 2616, where it sets write-to-read transition flag 2614 to false. From step 2616, WRTLock object 2400 proceeds to step 2618. In step 2618, WRTLock object 2400 determines whether one or more threads are awaiting access to write to the critical section. That is, WRTLock object 2400 determines whether write contenders count 2412 is greater than zero. If one or more threads are awaiting access to write to the critical section, WRTLock object 2400 proceeds to step 2620, whereupon one thread awaiting access to write to the critical section is given write access to the exclusion of any other threads that might be awaiting such access. That is, of one or more threads that are blocked on writer wait condition 2406, one such thread is provided write access to the critical section. Next, WRTLock object 2400 proceeds to step 2606, where exclusive access indicator 2402 is unlocked.

If, at step 2618, no threads are awaiting write access to the critical section, WRTLock object 2400 then proceeds to step 2622, where WRTLock object 2400 determines whether any threads are awaiting read access to the critical section. WRTLock object 2400 determines whether any threads are awaiting read access to the critical section by determining whether read contenders count 2410 is greater than zero. If read contenders count 2410 is greater than zero, WRTLock object 2400 proceeds to step 2624, whereupon WRTLock object 2400 provides read access to all threads awaiting read access to the critical section. That is, all threads blocked on reader wait condition 2404 are provided read access to the critical section. Next, WRTLock object 2400 proceeds from step 2624 to step 2606, whereupon exclusive access indicator 2402 is unlocked. If, at step 2622, WRTLock object 2400 instead determines that read contenders count is not greater than zero, then no threads are awaiting read access to the critical section. Accordingly, WRTLock object 2400 proceeds to step 2606 and unlocks exclusive access indicator 2402.

Figure 27:
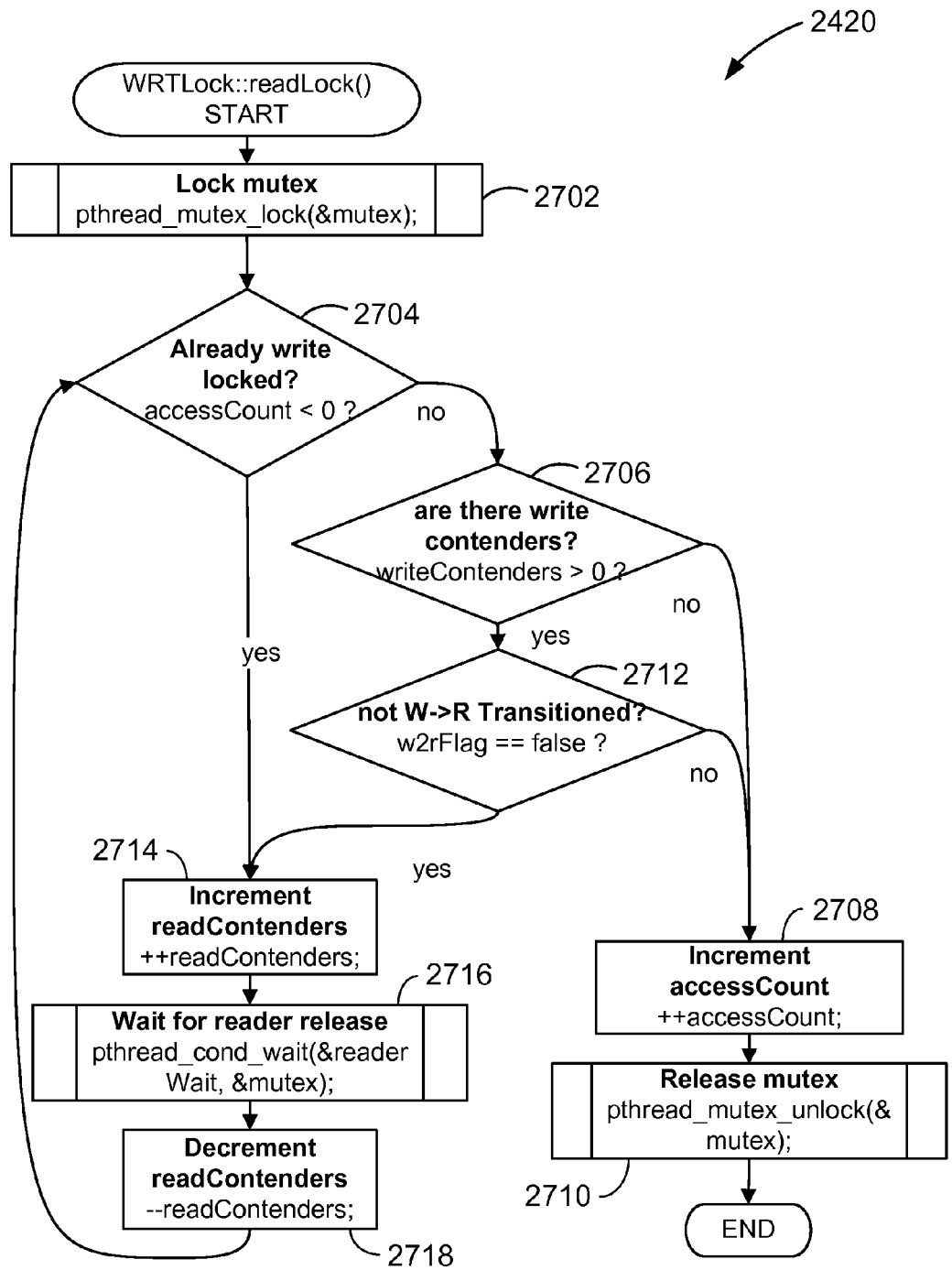
FIG. 27 is a flow chart of the steps involved in the read lock function of the WRTLock object.

FIG. 27 is a flow chart of the steps involved in read lock function 2420 of WRTLock object 2400. Read lock function 2420 may be called by a thread seeking read access to a critical section. At step 2702, WRTLock object 2400 locks exclusive access indicator 2402. In locking exclusive access indicator 2402, WRTLock object 2400 first determines whether exclusive access indicator 2402 is already locked by another thread. If so, WRTLock object 2400 waits until exclusive access indicator 2402 is unlocked by another thread, then proceeds to lock exclusive access indicator 2402. At step 2704, WRTLock object 2400 determines whether a thread has write access to the critical section. That is, WRTLock object 2400 determines whether access count 2408 is less than zero (e.g., negative one). If WRTLock object 2400 determines that no thread currently has write access to the critical section, WRTLock object 2400 proceeds to step 2706. At step 2706, WRTLock object 2400 determines whether any threads are waiting for write access to the critical section. That is, WRTLock object 2400 determines whether write contenders count 2412 is greater than zero. If write contenders count 2412 is not greater than zero (i.e., no threads are waiting for write access to the critical section), then WRTLock object 2400 proceeds to step 2708. At step 2708, WRTLock object 2400 increments access count 2408 by one, thereby indicating that at least the thread that called read lock function 2420 has read access to the critical section. At step 2710, WRTLock object 2400 unlocks exclusive access indicator 2402.

If, at step 2706, WRTLock object 2400 instead determines that at least one thread is waiting for write access to the critical section, WRTLock object 2400 proceeds to step 2712. At step 2712, WRTLock object 2400 determines whether a thread has not made a transition from writing to the critical section to reading from the critical section, without allowing any other threads to write to the critical section during the transition. That is, WRTLock object 2400 determines whether write-to-read transition flag 2414 is false. If write-to-read transition flag 2414 is not false, WRTLock object 2400 proceeds to steps 2708 and 2710 described above. However, if write-to-read transition flag 2414 is false, WRTLock object 2400 proceeds to step 2714.

WRTLock object 2400 may reach step 2714 either from step 2712, as described immediately above, or by determining, in step 2704, that access count 2408 is less than zero (i.e., a thread has exclusive write access to the critical section). At step 2714, WRTLock object 2400 increments read contenders count 2410 by one, thereby indicating that the thread that called read lock function 2420 is waiting for access to the critical section. At step 2716, WRTLock object 2400 waits on reader wait condition 2404 until another thread calls unlock function 2418 (described above) or write-to-read transition function 2424 (described below), thereby allowing WRTLock object 2400 to proceed to step 2718. At step 2718, WRTLock object 2400 decrements read contenders count 2410 by one. Next, WRTLock object 2400 loops back to step 2704, described above.

Figure 28:
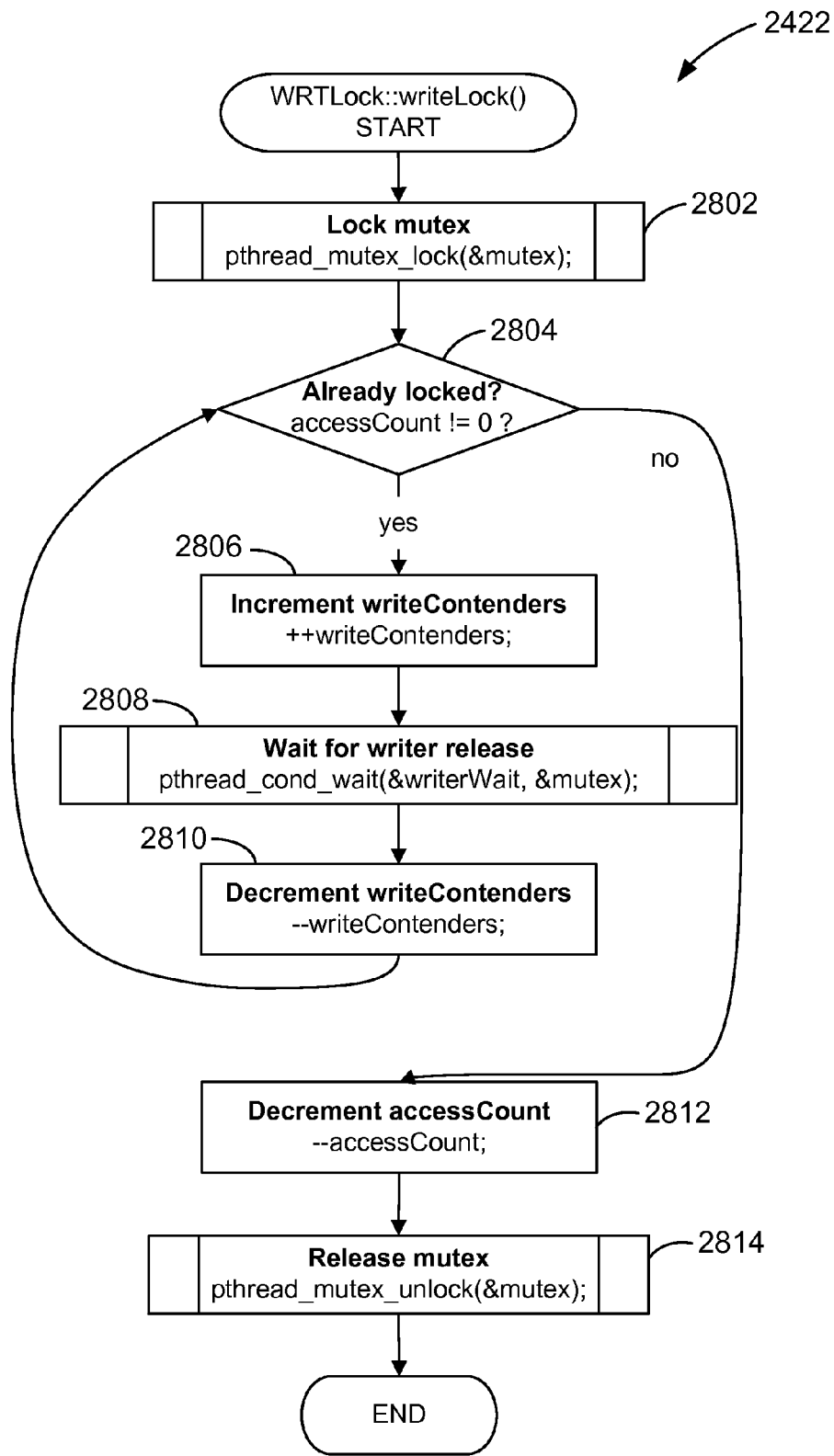
FIG. 28 is a flow chart of the steps involved in the write lock function of the WRTLock object.

FIG. 28 is a flow chart of the steps involved in write lock function 2422 of WRTLock object 2400. Write lock function 2422 may be called by a thread seeking write access to the critical section. At step 2802, WRTLock object 2400 locks exclusive access indicator 2402. In locking exclusive access indicator 2402, WRTLock object 2400 first determines whether exclusive access indicator 2402 is already locked by another thread. If so, WRTLock object 2400 waits until exclusive access indicator 2402 is unlocked by another thread, then proceeds to lock exclusive access indicator 2402. At step 2804, WRTLock object 2400 determines whether another thread has write access or read access to the critical section. That is, WRTLock object 2400 determines whether access count 2408 is not equal to zero.

As described above, access count 2408 is greater than zero if one or more threads have read access to the critical section and access count 2408 is negative one if a thread has write access to the critical section. Multiple threads may not simultaneously have write access to the critical section. If the critical section is being accessed by other threads, as would be indicated by access count 2408 having a non-zero value, then WRTLock object 2400 proceeds to step 2806. At step 2806, WRTLock object 2400 increments write contenders count 2412 by one, thereby indicating that the thread that called write lock function 2422 is waiting for write access to the critical section. At step 2808, WRTLock object 2400 waits on writer wait condition 2406 until all other threads with access to the critical section call unlock function 2418. Next, WRTLock object 2400 proceeds to step 2810, where write contenders count 2412 is decremented by one. After performing step 2810, WRTLock object 2400 loops back to step 2804, described above.

If, at step 2804, WRTLock object 2400 instead determines that no threads currently have write access or read access to the critical section, then WRTLock object 2400 proceeds to step 2812. At step 2812, WRTLock object 2400 decrements access count 2408 by one. In other words, WRTLock object 2400 sets access count 2408 to negative one to indicate that the thread that called write lock function 2422 has write access to the critical section. Next, WRTLock object 2400 proceeds to step 2814, where WRTLock object 2400 unlocks exclusive access indicator 2402.

Figure 29:
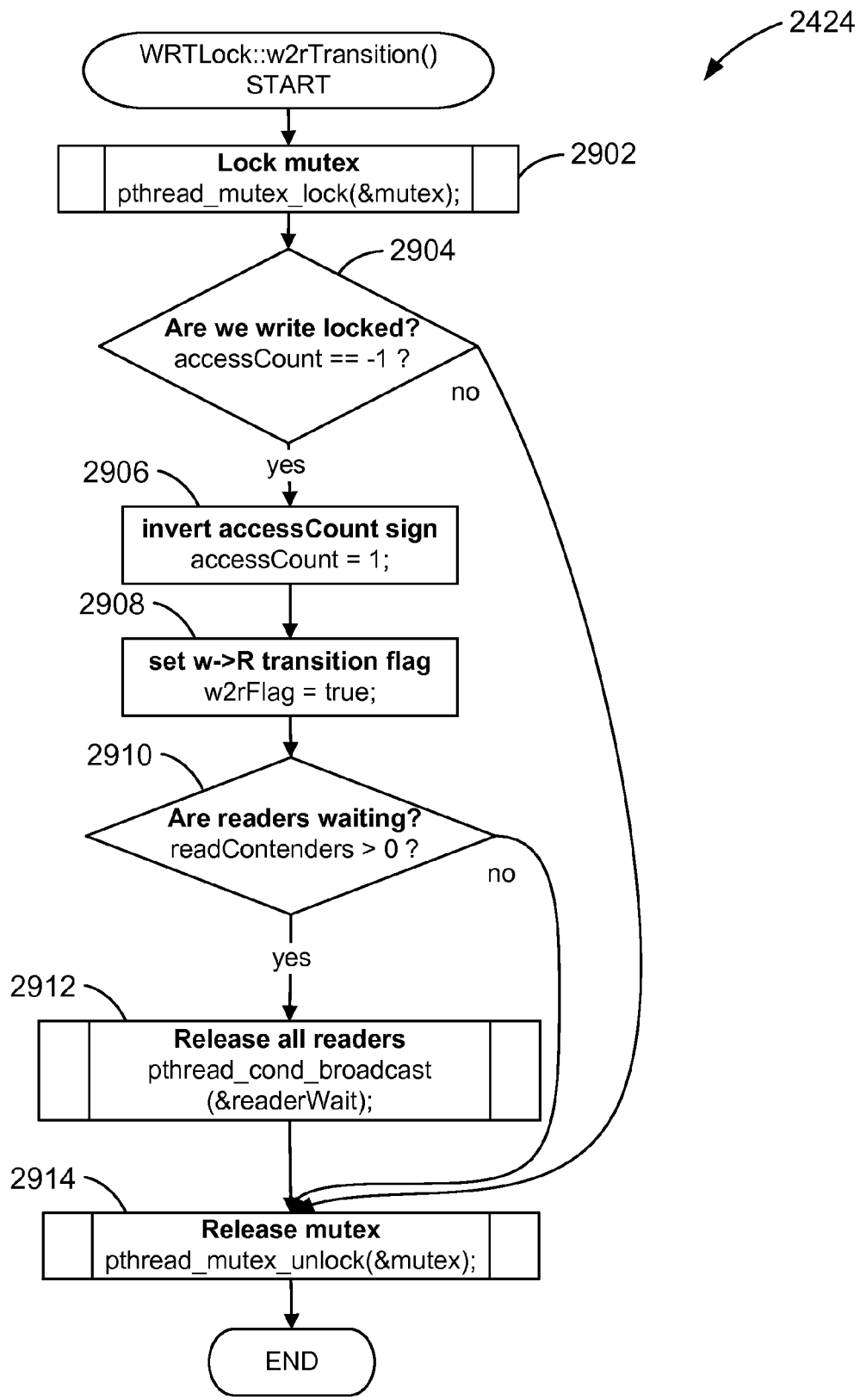
FIG. 29 is a flow chart of the steps involved in the write-to-read transition function of the WRTLock object.

FIG. 29 is a flow chart of the steps involved in write-to-read transition function 2424 of WRTLock object 2400. Write-to-read transition function 2424 may be called by a thread that already has write access to the critical section to transition to having read access to the critical section, without first releasing the critical section to other threads that might be seeking write access to the critical section. At step 2902, WRTLock object 2400 locks exclusive access indicator 2402. In locking exclusive access indicator 2402, WRTLock object 2400 first determines whether exclusive access indicator is already locked by another thread. If so, WRTLock object 2400 waits until exclusive access indicator 2402 is unlocked by another thread, then proceeds to lock exclusive access indicator 2402. At step 2904, WRTLock object 2400 determines whether exclusive access to the critical section is currently being provided to a thread (e.g., the thread that called write-to-read transition function 2424). That is, WRTLock object 2400 determines whether access count is equal to negative one. If access count is equal to negative one, WRTLock object 2400 proceeds to step 2906. At step 2906, WRTLock object 2400 sets access count to positive one, to indicate that the thread that called write-to-read transition function 2424 now has read access to the critical section.

At step 2908, WRTLock object 2400 sets write-to-read transition flag 2414 to true, to indicate that a write-to-read transition has taken place. At step 2910, WRTLock object 2400 determines whether other threads are waiting for read access to the critical section. That is, WRTLock object 2400 determines whether read contenders count 2410 is greater than zero. If reader contenders count 2410 is greater than zero, WRTLock object 2400 proceeds to step 2912, whereupon WRTLock object 2400 provides read access to all threads waiting on reader wait condition 2404, such as in step 2716 of read lock function 2420 (FIG. 27). Next, or if no threads were waiting for read access to the critical section, WRTLock object 2400 proceeds to step 2914, whereupon WRTLock object 2400 releases exclusive access indicator 2402. WRTLock object 2400 may also reach step 2914 if, at step 2904, WRTLock object 2400 determined that write access to the critical section was not being provided to the thread that called write-to-read transition function 2424.

Figure 30:
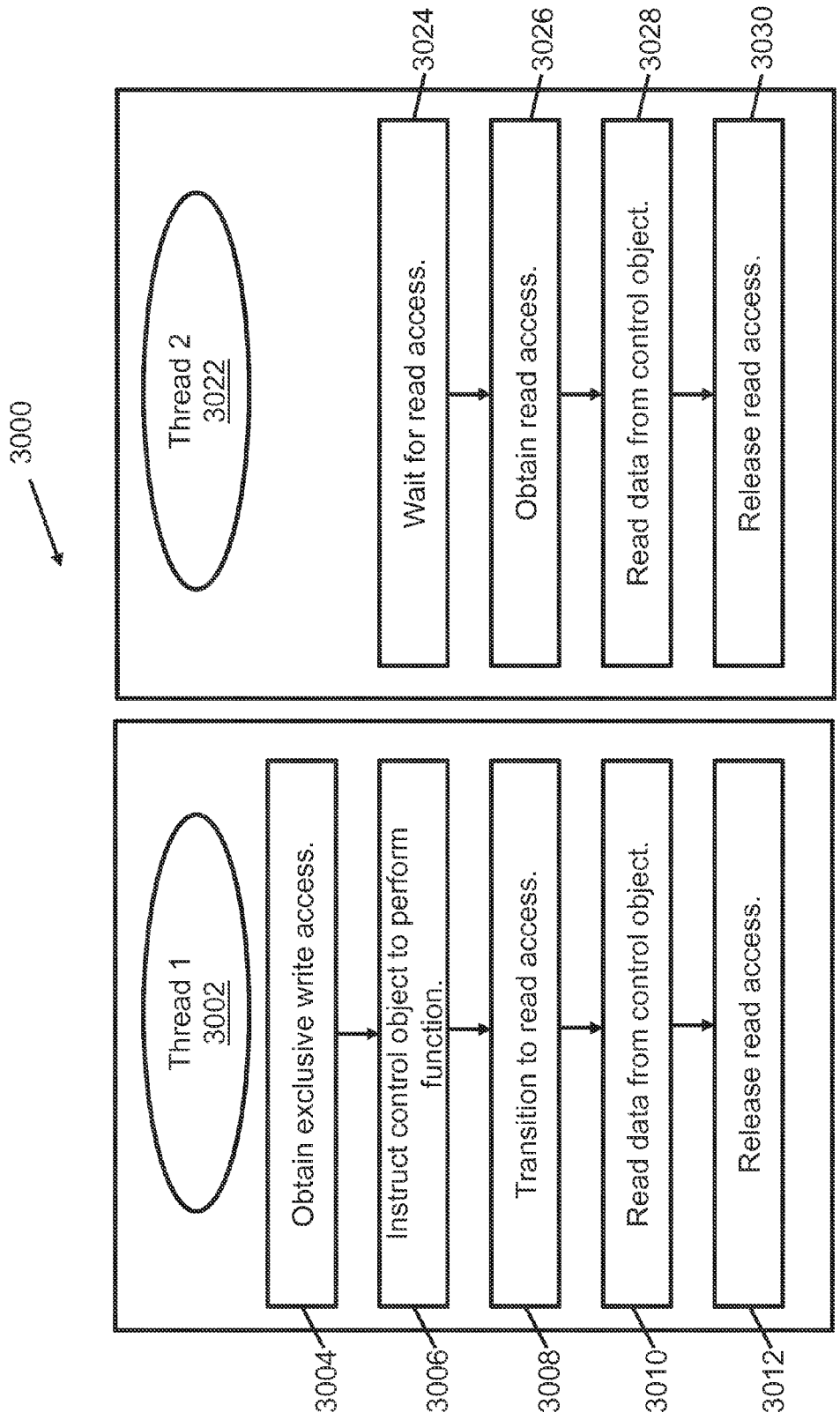
FIG. 30 is a flow chart of steps involved in an exemplary method that may be performed by a control server using the WRTLock object.

FIG. 30 is a flow chart of steps involved in an exemplary method 3000 that may be performed by control server 350 in accordance with the present disclosure. A first thread 3002 and a second thread 3022 are executing concurrently on control server 350 (FIG. 3). At step 3004, first thread 3002 obtains exclusive write access to a critical section. First thread 3002 obtains exclusive write access to the critical section by calling write lock function 2422 of WRTLock object 2400. In this example, the critical section is a set of processor-executable instructions that instruct a control object to perform an operation. For example, through a command issued to the control object by first thread 3002, gas valve 320 in epitaxial reactor 304 begins releasing a gas, for example $H_2$. The critical section also includes processor-executable instructions that read, from the control object associated with gas valve 320, an amount of gas released. At step 3006, having obtained exclusive write access to the critical section, first thread proceeds to issue the above-discussed instruction to the control object to cause gas valve 320 to release $H_2$ gas.

At step 3008, while still in the critical section, thread 3002 transitions the exclusive write access to read access. Read access allows other threads to read the same critical section, but does not allow other threads to write to the critical section (e.g., issue one or more control instructions to one or more control objects in the critical section). First thread 3002 transitions from exclusive write access to read access by calling write-to-read transition function 2424 of WRTLock object 2400. Importantly, by transitioning the exclusive write access to read access, rather than releasing exclusive write access then attempting to acquire read access, there is no possibility for another thread to acquire exclusive write access to the critical section before first thread 3002 obtains read access. Accordingly, it is not possible for another thread to issue a separate instruction for the control object to cause gas valve 320 to stop releasing gas, for example.

At step 3010, having read access to the critical section, first thread 3002 reads data from the control object. As described above, the data is, for example, an amount of gas released by gas valve 320. First thread 3002 may repeat step 3010 multiple times to obtain iterative updates on the amount of gas released by gas valve 320. At step 3012, first thread 3002 releases read access to the critical section by calling unlock function 2418 of WRTLock object 2400.

As mentioned above, second thread 3022 executes concurrently with first thread 3002. At step 3024, second thread 3024 requests read access to a critical section managed by WRTLock object 2400. That is, second thread 3022 calls read lock function 2420 of WRTLock object 2400. Given that WRTLock object 2400 has given exclusive write access to first thread 3002, second thread 3022 must wait until first thread 3002 transitions to having read access. As explained above, first thread 3002 makes the transition to read access at step 3008. At this point, read lock function 2420 of WRTLock object 2400 provides read access to second thread 3022 as well. Accordingly, at step 3028, second thread 3022 successfully reads data from the same control object that first thread 3002 is reading data from in step 3010. That is, second thread 3022 reads, for example, the amount of $H_2$ gas released by gas valve 320. At step 3030, second thread 3022 releases read access to the critical section by calling unlock function 2418 of WRTLock object 2400.

Scalable and Deterministic Counting of Arbitrarily Interlinked Control Objects

Building upon the framework for locking groups of control objects and for implementing a write-read transition lock, as described above, scalable and deterministic counting of arbitrarily interlinked control objects can be implemented as described below.

Figure 31:
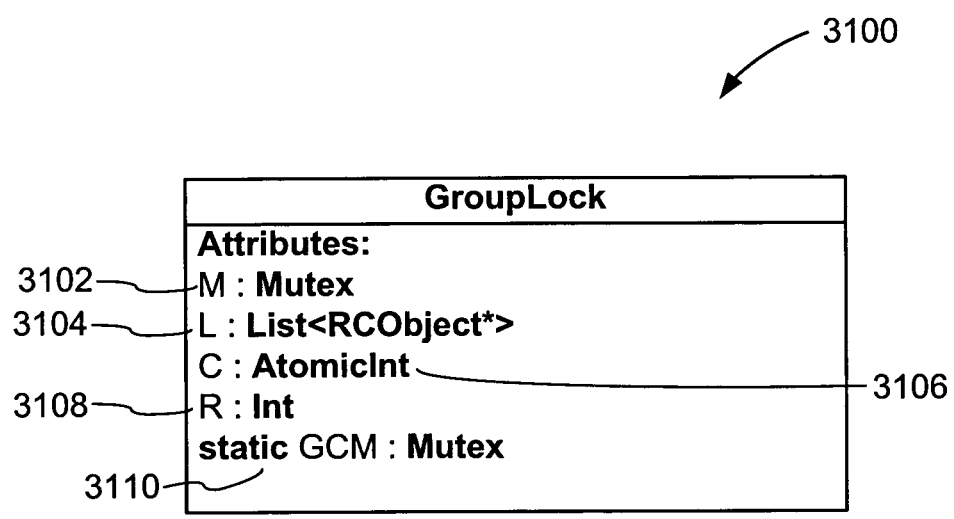
FIG. 31 is a block diagram of an embodiment of an enhanced group representative object.

FIG. 31 is a block diagram of an exemplary embodiment of an enhanced group representative object 3100. Group representative object 3100 is embodied in processor-executable instructions, which may be executed, for example, by processor 505 (FIG. 5) of control server 350. Group representative object 3100 includes a mutex or "exclusive access indicator" 3102 which may be locked to provide a single thread with exclusive access to the reference count variables of control objects associated with the group represented by the group representative object, and unlocked to no longer to provide the thread with exclusive access to the reference count variables of the control objects in the group. Group representative object 3100 also includes a group list 3104, which contains references to the control objects in the group represented by the group representative object 3100. For example, the list of references may be a list of pointers or addresses in memory area 510 of each control object in the group. Group representative object 3100 further includes a reference count 3106, which is a numeric value, and in the exemplary embodiment is an atomic integer, that represents the number of objects, such as control objects, referencing group representative object 3100. Accordingly, group representative object 3100 has certain elements in common with group representative object 700 (FIG. 7).

As additional elements, group representative object 3100 includes an outside reference count 3108, which is a numeric value, and in the exemplary embodiment is an integer. Outside reference count 3108 represents the number of outside references to the group of control objects associated with group representative object 3100. Group representative object 3100 also includes a global exclusive access indicator 3110 (e.g., a mutex), which enables exclusive group construction during a reference loop check in the "reference and detect loop" function of control object 3200, discussed below.

Figure 32:
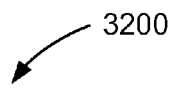
FIG. 32 is a block diagram of an example embodiment of a script object.

FIG. 32 is a block diagram of an example embodiment of an enhanced control object 3200 which is a type of script object. That is, control object 3200 is a reference-counted control object with reference loop management, as described in more detail herein. That is, control object 3200 automatically and deterministically detects and manages loops of references among objects. Control object 3200 includes a reference 3202, for example a memory address pointer, to a group representative object 3100. Control object 3200 additionally includes a mutex or "exclusive access indicator" 3204 which may be locked to provide a single thread with exclusive access to reference 3202 to the group representative object 3100, and unlocked to no longer to provide the thread with exclusive access to the reference 3202. Control object 3200 also includes a WRTLock object 3206, which is identical to WRTLock object 2400 (FIG. 24), described above.

Additionally, control object 3200 includes a reference count 3208 (also referred to herein as a "total reference count"), which is a numeric value, for example an integer. Reference count 3208 represents the number of references to the control object 3200. That is, every instance of control object 3200 may have a different value for reference count 3208, depending on the number of references to that particular instance of control object 3200. Additionally, control object 3200 includes a loop reference count 3210, which is a numeric value, for example an integer. Loop reference count 3210 (also referred to herein as an "in-loop reference count") represents the number of loop references to other group members (e.g., other control objects in the group represented by group representative object 3100) that a particular instance of control object 3200 has. That is, if a particular instance of control object 3200 references two other control objects 3200 in the group represented by group representative object 3100 (which is referenced by reference 3202) then loop reference count 3210 for that particular instance of control object 3200 will have a value of two.

Control object 3200 includes an "assign child object" function 3212, which is public. That is, the "assign child object" function 3212 of control object 3200 may be called by an object or function referencing control object 3200, as will be understood by those skilled in the art of object oriented programming Control object 3200 also includes a number of private functions, which may only be called by control object 3200, as will also be understood by those skilled in the art of object oriented programming. The private functions include a "reference and detect loop" function, a "depth first search" function 3216, a dereference function 3218, an initialization function 3220, a de-initialization function 3222, a lockRC function 3224, an unlockRC function 3226, a "group join" function 3228, a "reference group representative" function 3230, a "reference and lock group representative" function 3232, a "dereference group representative" function 3234, a "dereference and unlock group representative" function 3236, and "set group representative" function 3238. Additionally, control object 3200 includes several private virtual functions, which must be overridden in any object that inherits from control object 3200, as will be appreciated by those skilled in the art of object oriented programming. The private virtual functions include a "get number of child objects" function 3240, a "get child object" function 3242, and a "set child object" function 3244.

Figure 33A:
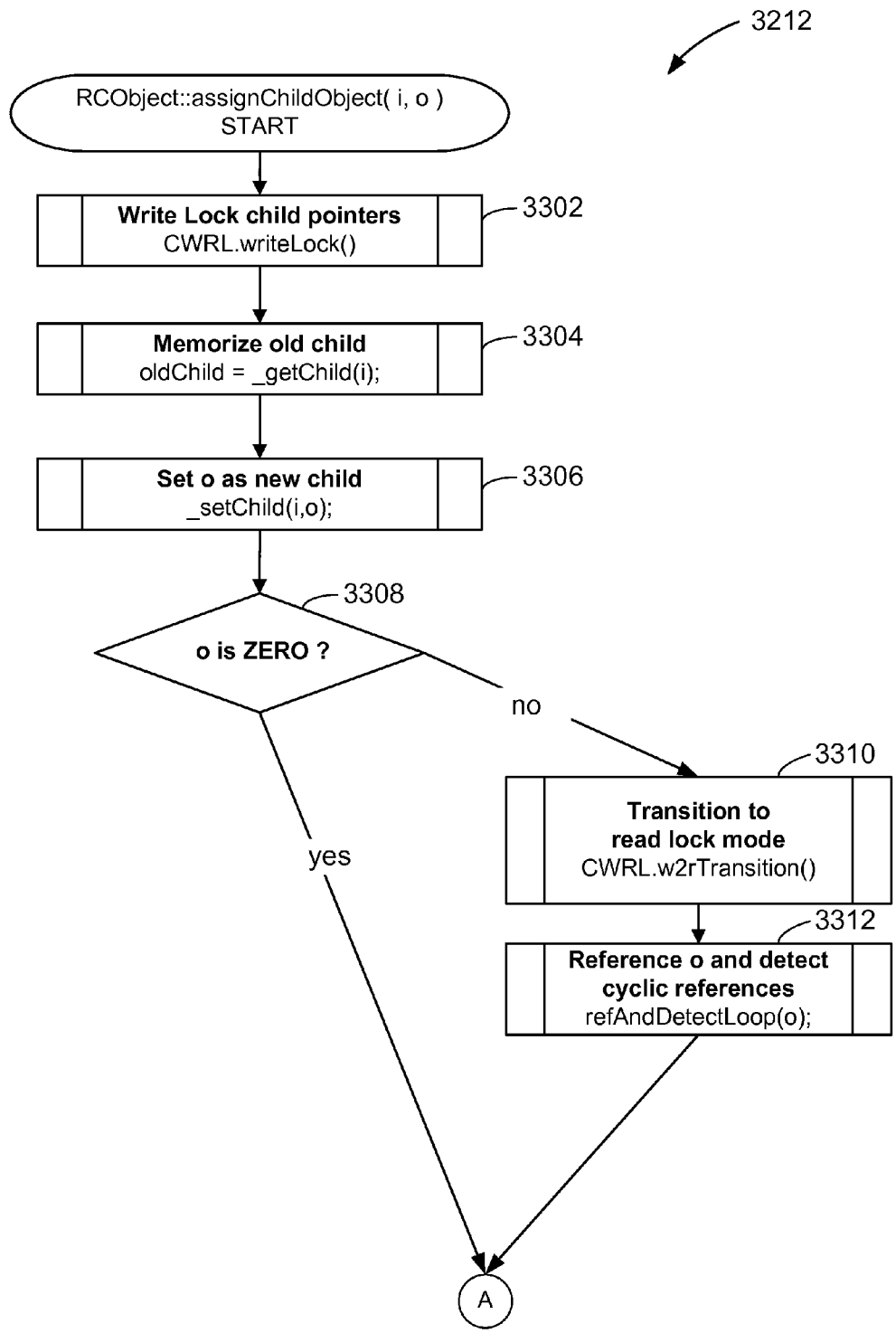
FIGS. 33A and 33B are flow charts of the "assign child object" function of the script object.
Figure 33B:
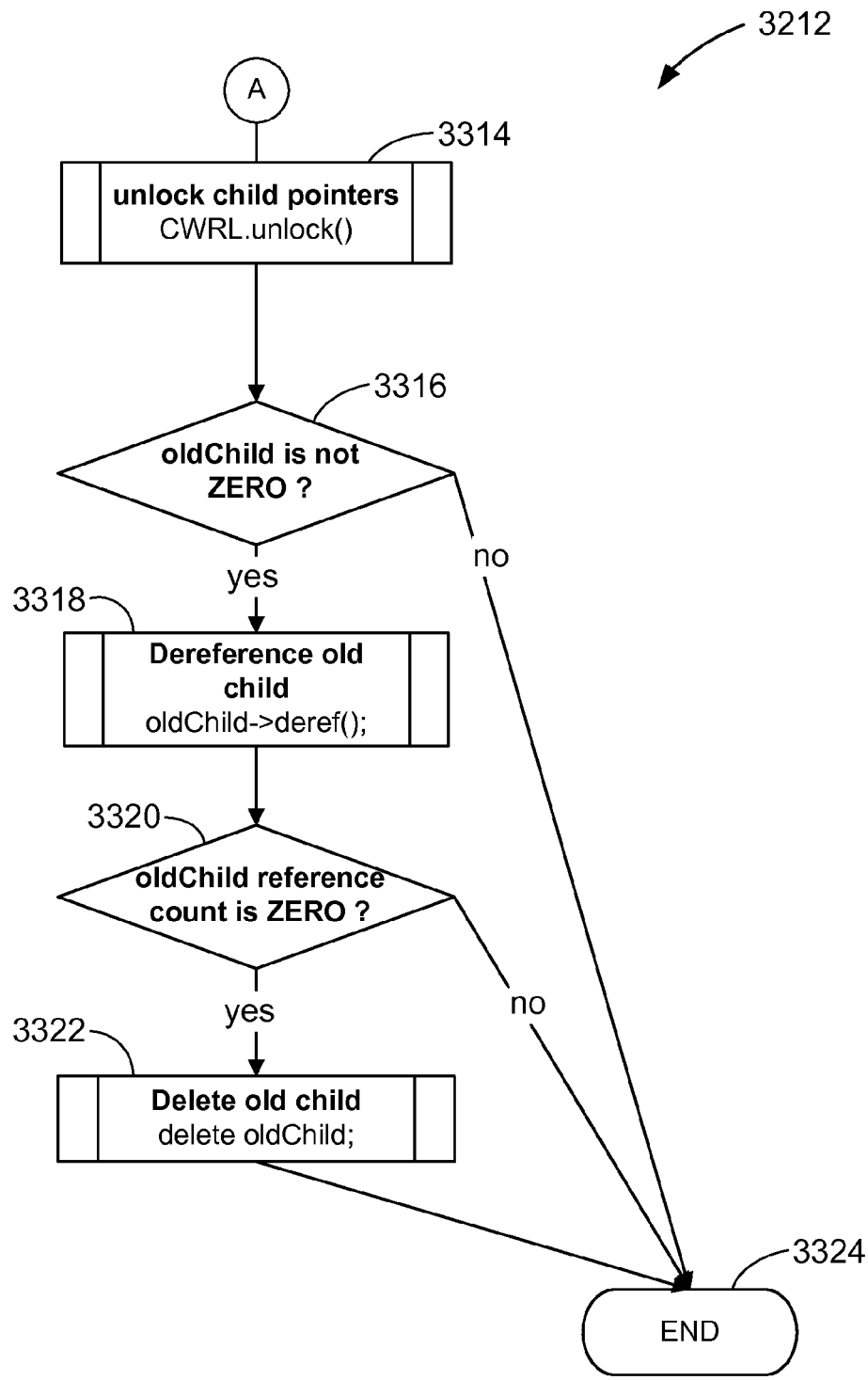

FIGS. 33A and 33B are flow charts of the "assign child object" function 3212 of control object 3200. In summary, the "assign child object" function assigns a control object ("o") 3200 as child ("i") to the group associated with the control object 3200 executing this function. The "assign child object" function receives, as a parameter, a reference, such as an address in memory, of control object "o" 3200 and an integer "i", representing the position in the derived object instance to store control object "o" 3200 at. The "assign child object" function has no return value. At step 3302, the write lock function 2422 of WRTLock object 3206 is called, thereby providing a thread executing the "assign child object" function 3212 exclusive write access to child references maintained by control object 3200. At step 3304, the "get child object" function 3242 is executed, passing in "i" as a parameter. The return value, which is a reference to a control object 3200 stored as a child object at position "i" in the derived object instance associated with control object 3200 is stored in a reference (i.e., a pointer to an address in memory) referred to herein as "oldChild". At step 3306, the "set child object" function 3244 is called, passing in integer "i" and reference to control object "o" as parameters. The "set child object" function 3244 sets control object "o" as the child object, at position "i", in the derived object instance associated with control object 3200. At step 3308, it is determined whether reference to control object "o" is equal to zero. If the determination at step 3308 is no, or false, step 3310 is performed. At step 3310, the write-to-read transition function 2424 of WRTLock object 3206 is called, thereby transitioning the exclusive write access to read access. At step 3312, the "reference and detect loop" function 3214 of control object 3200 is called. Reference to control object "o" is passed in as a parameter to the "reference and detect loop" function 3214. As explained in more detail in conjunction with FIG. 34, the "reference and detect loop" function 3214 references control object "o" and detects any cyclic references.

Step 3314 is performed after step 3312 if the determination at step 3308 was no or false. If, however, the determination at step 3308 was yes or true, then step 3314 is performed immediately after step 3308. At step 3314, the unlock function 2418 of WRTLock object 3206 is called, thereby releasing the read access lock to references to child control objects in the derived object instance associated with control object 3200. At step 3316, it is determined whether the "oldChild" reference is not equal to zero. If the determination at step 3316 is no, or false (i.e., "oldChild" is equal to zero), then the "assign child object" function 3212 proceeds to step 3324, where the function 3212 ends. However, if the determination at step 3316, is true, or yes, then step 3318 is performed. At step 3316, the dereference function 3218 of the control object 3200 referenced by "oldChild" is called. At step 3320, it is determined whether the "oldChild" reference count is zero. If the determination at step 3320 is no, or false, the "assign child object" function 3212 proceeds to step 3324, where the function 3212 ends. However, if the determination at step 3320 is true, or yes, then step 3322 is performed. At step 3322, the "oldChild" reference is deleted, and the control object 3200 referred to by the "oldChild" reference is destroyed and deallocated from memory. Next, the "assign child object" function 3212 proceeds to 3324, where the function 3212 ends.

Figure 34A:
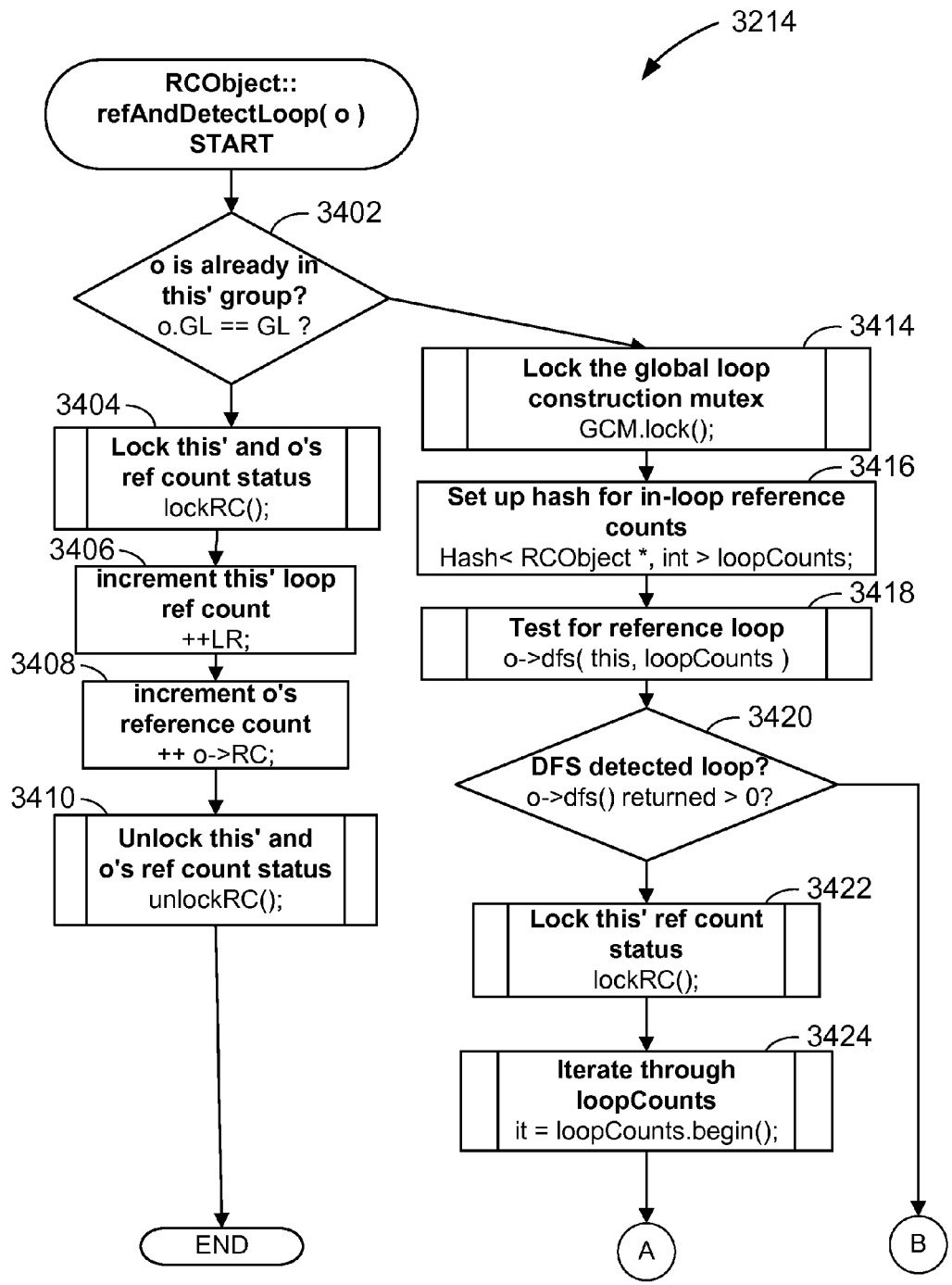
FIGS. 34A, 34B, and 34C are flow charts of the "reference and detect loop" function of the script object.
Figure 34B:
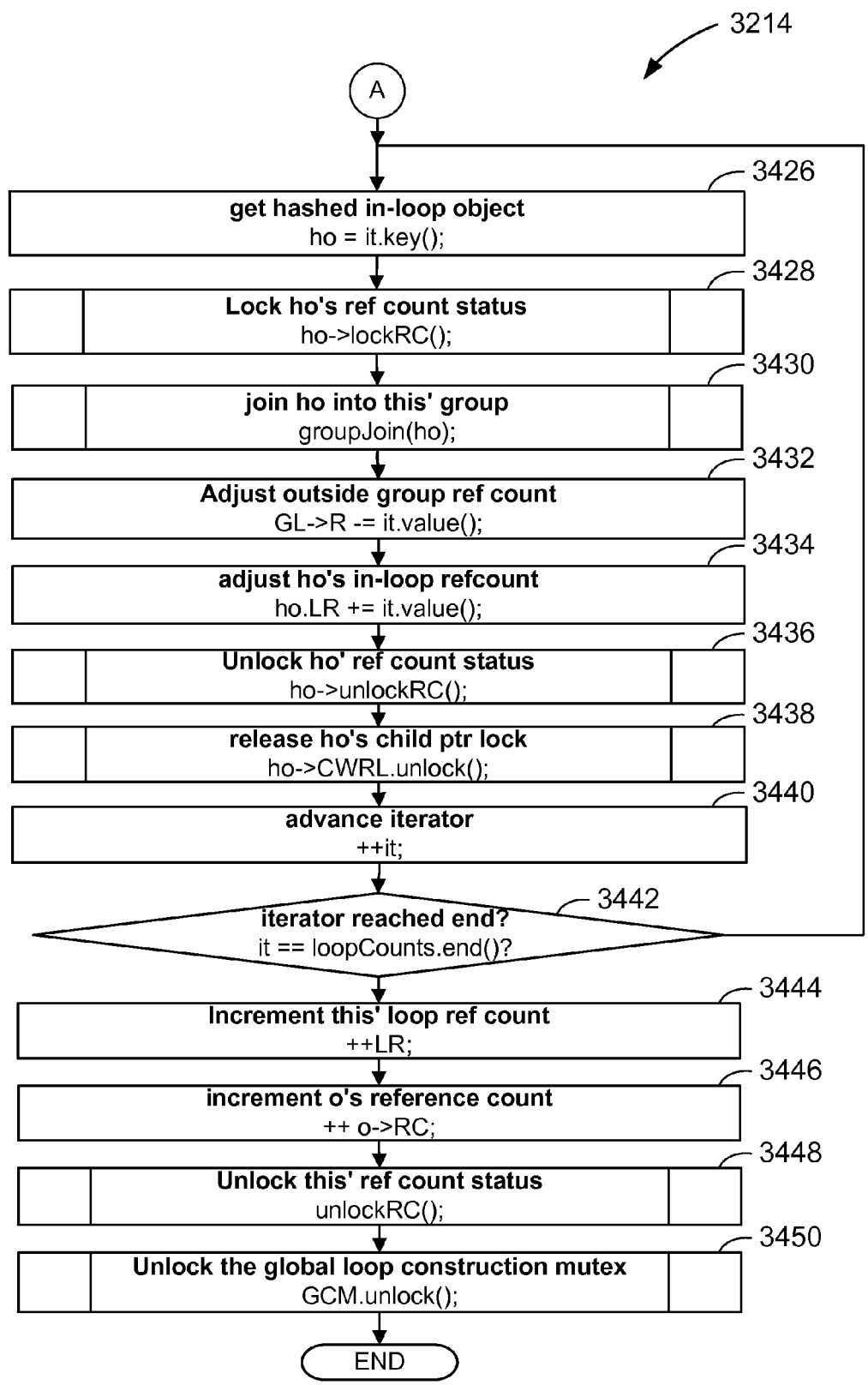
Figure 34C:
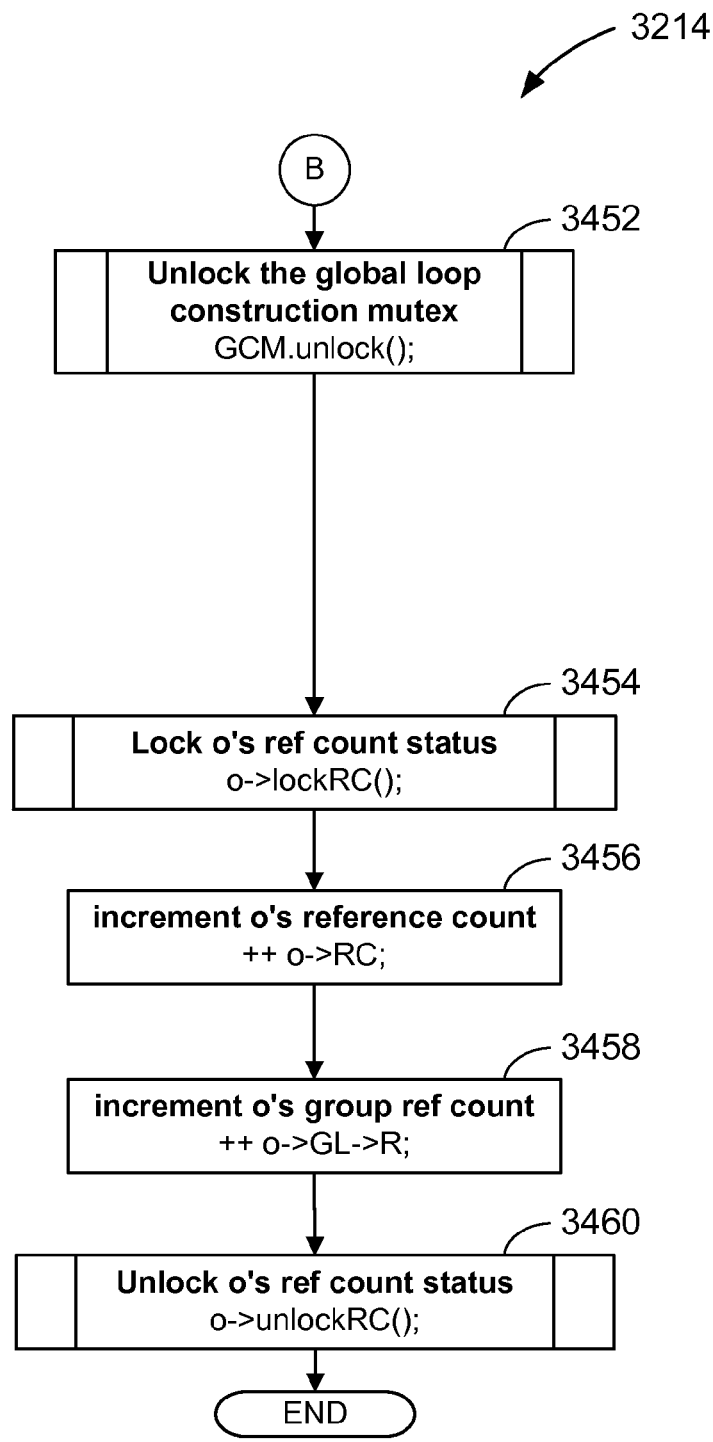

FIGS. 34A, 34B, and 34C are flow charts of the "reference and detect loop" function 3214 of control object 3200. The "reference and detect loop" function 3214 receives, as a parameter, a reference to a control object 3200 ("o"). In summary, the "reference and detect loop" function counts up the reference variables of "o" and checks for reference loops. At step 3402, it is determined whether control object "o" is in the same group as the control object 3200 executing the "reference and detect loop" function 3214. That is, it is determined whether the group representative reference of "o" is equal to the group representative reference 3202 of the control object 3200 executing the "reference and detect loop" function 3214. If the determination at step 3402 is yes, or true, then function 3214 proceeds to step 3404 where the lockRC function 3224 of control object 3200 is called, thereby locking the reference count status of the control object 3200 executing function 3214 and the reference count status of control object "o". At step 3406, loop reference count 3210 is incremented by one. At step 3408, reference count 3208 of control object "o" is incremented by one. At step 3410, the unlockRC function 3226 of the control object 3200 executing function 3214 is called, thereby unlocking the reference count status of control object 3200 and control object "o".

If the determination at step 3402 is false, or no, function 3214 proceeds to step 3414. At step 3414, global exclusive access indicator 3204 is locked, permitting only one thread at a time to execute the remainder of the loop check and construction function. At step 3416, a hash ("loopCounts") is set up for in-loop reference counts. At step 3418, a test for a reference loop is performed by calling the "depth first search" function 3216 of control object "o", passing in a reference to the control object executing function 3214 and the "loopCounts" hash. At step 3420, it is determined whether the "depth first search" function 3216 performed at step 3418 detected a loop. That is, it is determined whether the "depth first search" function returned a value that is greater than zero. If the determination at step 3420 is no, or false, then function 3214 proceeds to step 3422. At step 3422, the reference count status of the control object 3200 executing function 3214 is locked, by calling the lockRC function 3224. At step 3424, function 3214 begins a process of iterating through the "loopCounts" hash. A first key-value pair is stored in variable "it". At step 3426, the hashed in-loop control object stored in the key of variable "it" is retrieved and stored in variable "ho". That is, "ho" is a reference to a control object. At step 3428, the lockRC function 3224 of the control object referred by "ho" is called. At step 3430, the "group join" function 3228 of the control object 3200 executing function 3214 is called, passing the "ho" reference in as a parameter. At step 3432, the outside group reference count is adjusted. That is, the value of key-value pair "it" is subtracted from outside reference count 3108 of the group representative object 3100 associated with the control object 3200 executing function 3214 (e.g., the group representative object 3100 referenced by reference 3202).

At step 3434, the in-loop reference count of control object "ho" is adjusted. That is, the value of key-value pair "it" is added to loop reference count 3210 of control object "ho". At step 3436, the unlockRC function 3226 of control object "ho" is called. At step 3438, the child objector pointer lock of control object "ho" is unlocked. That is, the unlock function 2418 of WRTLock object 3206 of control object "ho" is called. At step 3440, "it" is incremented by one. At step 3442, it is determined whether "it" key-value pair is equal to the last key-value pair in the "loopCounts" hash. If the determination at step 3440 is false, or no, then function 3214 proceeds back to step 3426. Otherwise, function 3214 proceeds to step 3444. At step 3444, the loop reference count 3210 of the control object 3200 executing function 3214 is incremented by one, indicating that with "o", it is referencing an in-loop object. At step 3446, the reference count 3208 of control object "o" is incremented by one, indicating that it is now referenced by the control object executing function 3214. At step 3448, the unlockRC function 3226 of the control object executing function 3214 is called, thereby unlocking the reference count status of the control object executing function 3214. At step 3450, the global exclusive access indicator 3204 is unlocked. Next, function 3214 proceeds to step 3412, where function 3214 ends.

If the determination at step 3420 if false, or no, then function proceeds to step 3452. At step 3452, exclusive access indicator 3204 is unlocked. At step 3454, the reference count status of control object "o" is locked by calling the lockRC function 3224 of control object "o". At step 3456, the reference count 3208 of control object "o" is incremented by one. At step 3458, the outside reference count 3208 of the group representative object 3100 associated with control object "o" is incremented by one. In other words, the group reference count associated with control object "o" is incremented. At step 3460, the unlockRC function 3226 of control object "o" is called. Next, function 3214 proceeds to step 3412, where function 3214 ends.

Figure 35A:
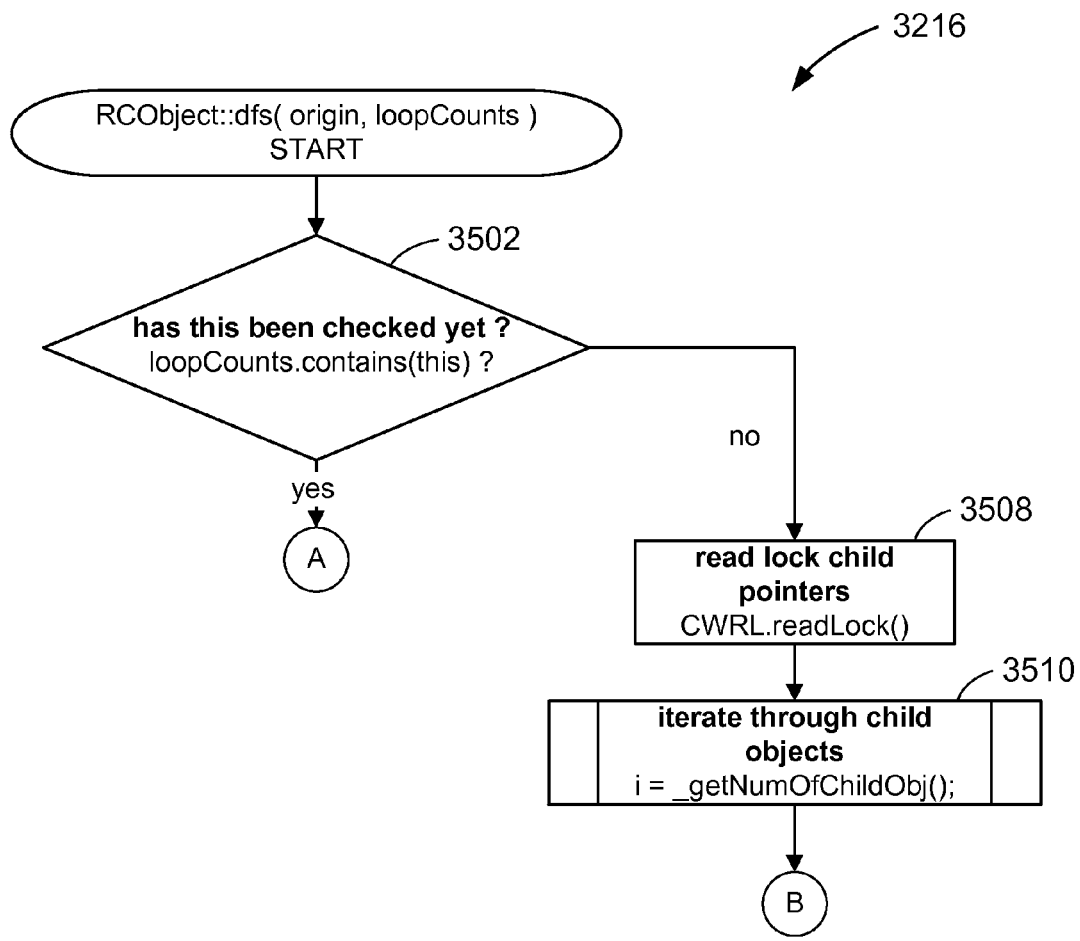
FIGS. 35A, 35B, and 35C are flow charts of the "depth first search" function of the script object.
Figure 35B:
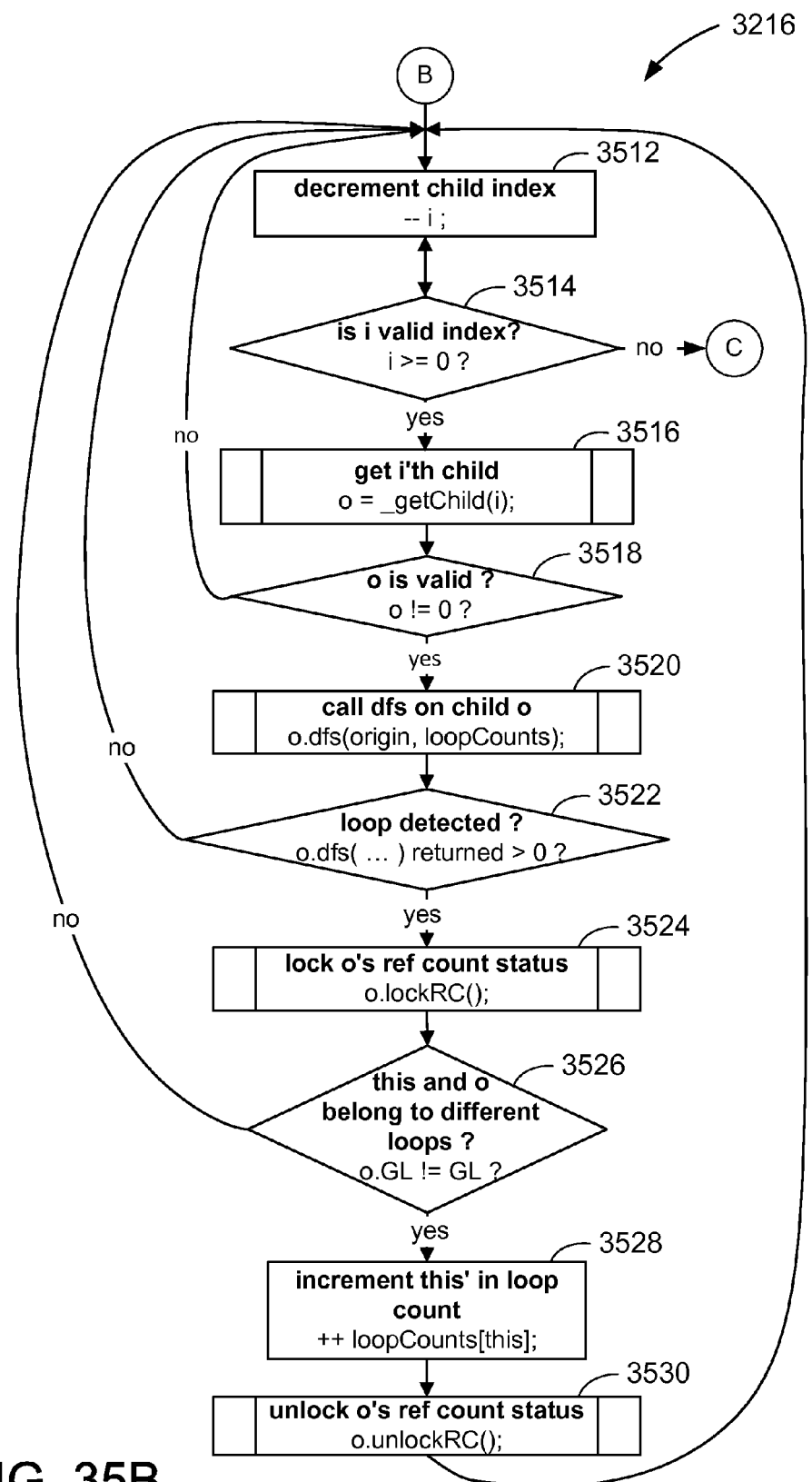
Figure 35C:
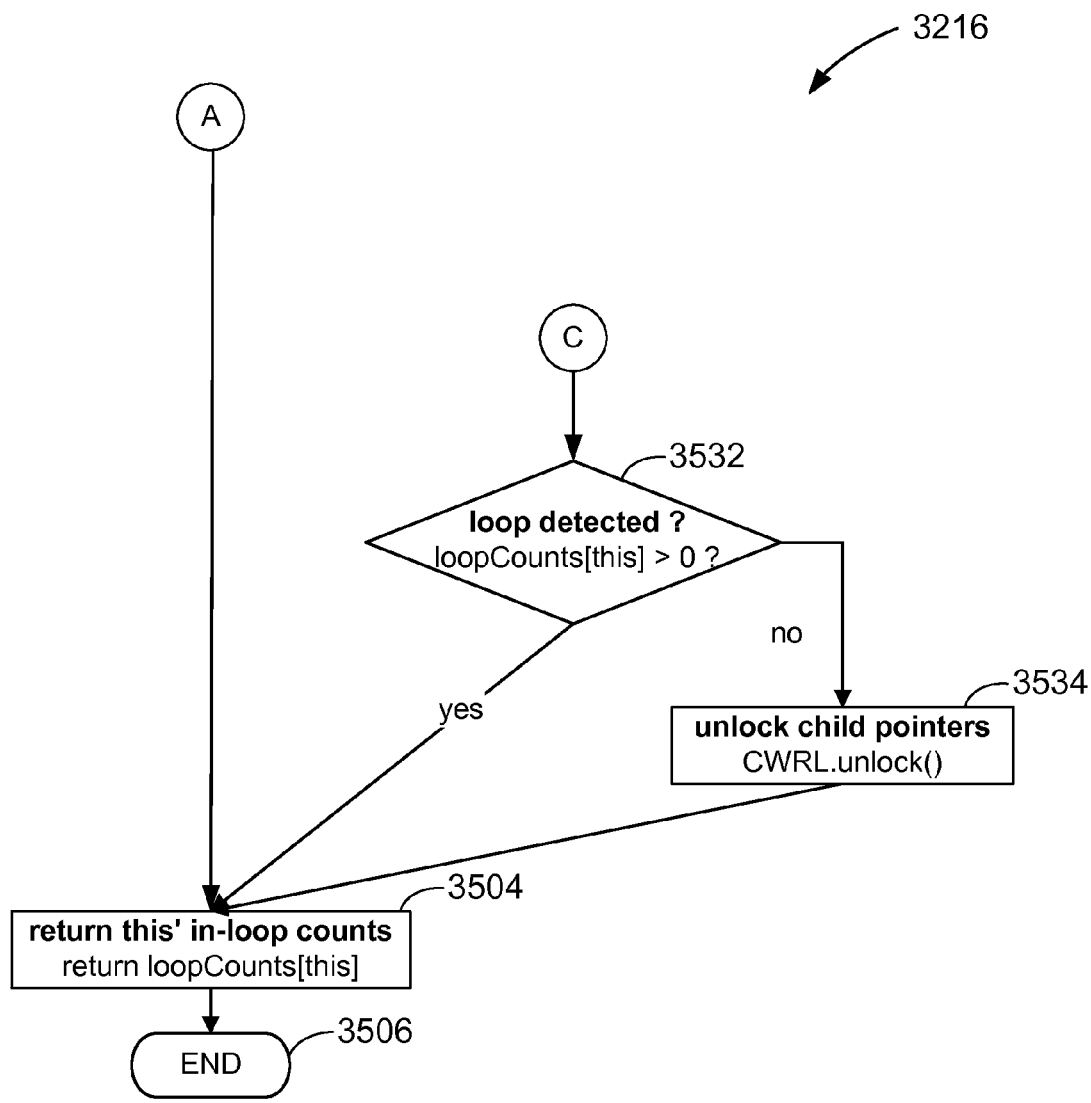

FIGS. 35A, 35B, and 35C are flow charts of the "depth first search" function 3216 of control object 3200. In summary, the "depth first search" function 3216 determines references loops. The "depth first search" function receives as parameters a reference to a control object ("origin") and a hash ("loopCounts"). The control object reference, "origin", is an origin control object to check if references loop back to it. Hash "loopCounts" is a key-value hash with object references as keys and in-loop reference counts as values, to keep in-loop reference counts of objects referencing other objects. Function 3216 returns a number of in-loop counts found for control object "origin".

At step 3502, it is determined whether the control object 3200 executing function 3216 has already been checked to determine whether any references loop back to it. That is, it is determined whether "loopCounts" hash contains a reference to the control object 3200 executing function 3216. If the result of the determination at step 3502 is true, or yes, then function 3216 proceeds to step 3504. At step 3504, function 3216 returns the number of in-loop reference counts associated with the control object 3200 executing function 3216. That is, function 3216 returns the value stored in the "loopCounts" hash for the control object 3200 executing function 3216. Next, function 3216 proceeds to step 3506, where function 3216 ends.

If the determination at step 3502 is false, or no, then function 3216 proceeds to step 3508. At step 3508, a read lock for child references is obtained. That is, the read lock function 2420 of the WRTLock object 3206 of the control object 3200 executing function 3216 is called. At step 3510, the "get number of child objects" function 3240 is called, and the result, which is an integer, is stored as integer "i". At step 3512, integer "i", which is used as a child index, is decremented by one. At step 3514, it is determined whether integer "i" is valid, meaning it is greater than or equal to zero. If the determination at step 3514 is true, or yes, then function 3216 proceeds to step 3516. At step 3516, the "get child object" function 3242 is called, passing "i" as a parameter. The return value of the "get child object" function 3242 is stored in control object reference "o". At step 3518, it is determined whether control object reference "o" is a valid reference. That is, it is determined whether reference "o" is not equal to zero. If the determination at step 3518 is false, or no, then function 3216 proceeds to step 3512.

If the determination at step 3518 is true, or yes, then step 3520 is performed. At step 3520, the "depth first search" function 3216 of control object "o" is called, passing in control object "origin" and hash "loopCounts" as parameters. At step 3522, it is determined whether a loop was detected by the "depth first search" function 3216 called in step 3520. If the determination at step 3522 is false, then function 3216 proceeds to step 3512. Otherwise, function 3216 proceeds to step 3524. At step 3524, reference count status of control object "o" is locked, by calling the lockRC function 3224 of control object "o". At step 3526, it is determined whether the control object 3200 executing function 3216 and control object "o" are in the same group, meaning they both refer to the same group representative object 3100 with their respective group representative references 3202. If the determination at step 3526 is false, or no, then function 3216 proceeds to step 3512. Otherwise, function 3216 proceeds to step 3528. At step 3528, the in-loop reference count stored in hash "loopCounts" for the control object 3200 executing function 3216 is incremented by one. At step 3530, the unlockRC function 3226 of control object "o" is called, releasing the object's reference count status. Next, function 3216 proceeds to step 3512, described above.

If the determination at step 3514 is false, or no, function 3216 proceeds to step 3532. At step 3532, it is determined whether a reference loop was detected for the control object 3200 executing function 3216. That is, it is determined whether the value stored in hash "loopCounts" for the control object 3200 executing function 3216 is greater than zero. If the determination at step 3532 is true, or yes, then function 3216 proceeds to step 3504, described above. If the determination at step 3532 is false, or no, then function 3216 proceeds to step 3534. At step 3534, references to child objects are unlocked. That is, the unlock function 2418 of the WRTLock object 3206 of the control object 3200 executing function 3216 is called. Next, function 3216 proceeds to step 3504, described above.

Figure 36:
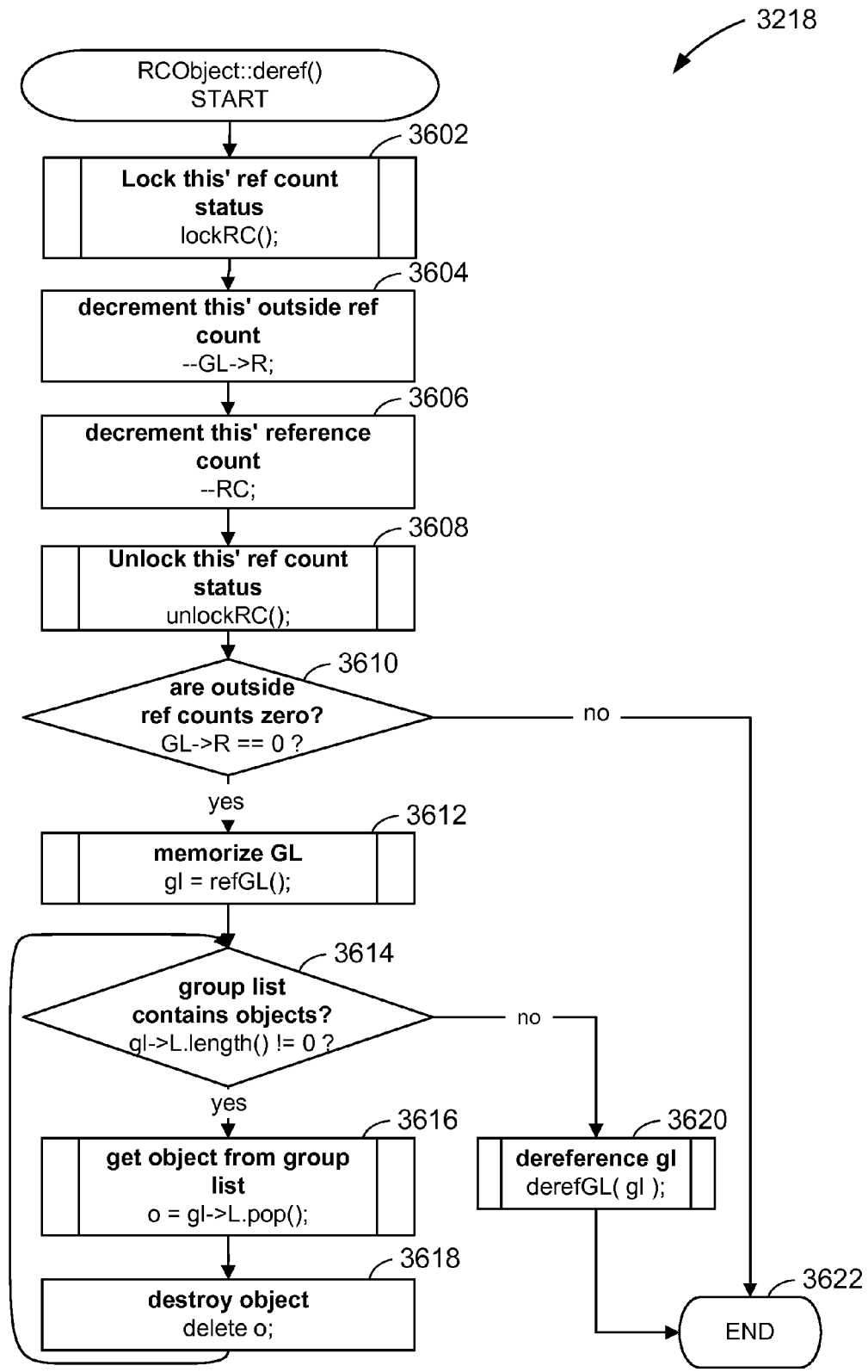
FIG. 36 is a flow chart of the dereference function of the script object.

FIG. 36 is a flow chart of the dereference function 3218 of control object 3200. At step 3602, the reference count status of the control object 3200 executing function 3218 is locked, by calling the lockRC function 3224. At step 3604, the outside reference count 3108 of the group representative object 3100 associated referenced by reference 3202 is decremented by one. At step 3606, reference count 3208 is decremented by one. At step 3608, the reference count status of the control object 3200 executing function 3218 is unlocked by calling unlockRC function 3226. At step 3610, it is determined whether outside reference count 3108 is equal to zero. If the determination at step 3610 is true, or yes, then at step 3612, the "reference group representative" function 3230 is called and the return value is stored in a group representative object reference "gr".

At step 3614, it is determined whether the group list 3104 of the group representative object referenced by reference "gr" contains any references to control objects. If the determination at step 3614 is true, or yes, then at step 3616, a control object is "popped" from the group list 3104 and deleted at step 3618. Function 318 then proceeds back to step 3614. If the determination at step 3614 is false, or no, then function 3218 proceeds to step 3620. At step 3620, the "dereference group representative" function 3234 is called, passing the "gr" reference as a parameter. Next, function 3218 proceeds to step 3622, where the function 3218 ends. Also, if the determination at step 3610 is false, or no, then function ends at step 3622.

Figure 37:
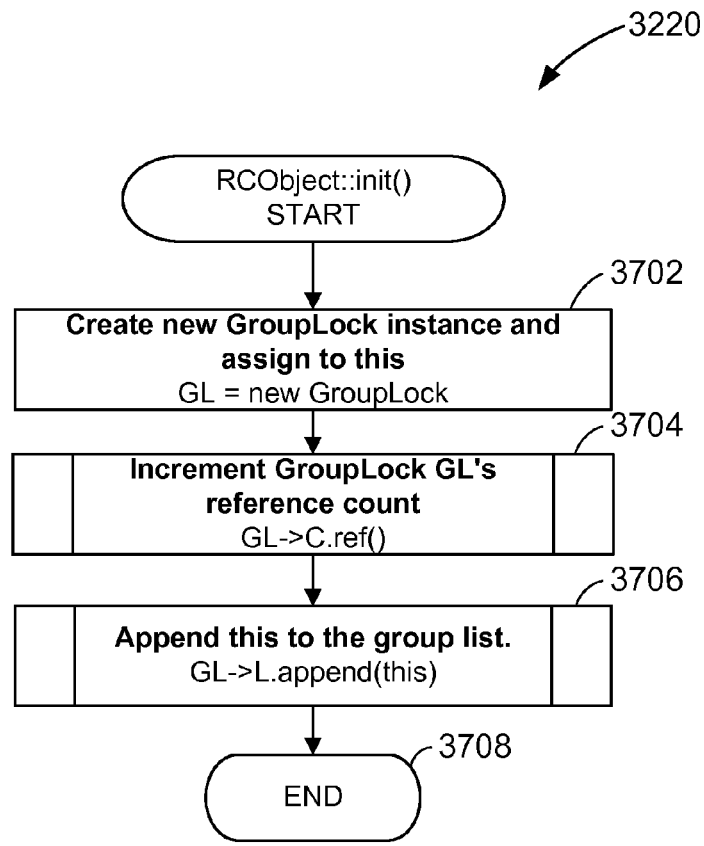
FIG. 37 is a flow chart of the initialization function of the script object.

FIG. 37 is a flow chart of the initialization function 3220 of control object 3200. At step 3702, a new group representative object 3100 is generated and referenced by reference "GR". At step 3704, reference count 3106 of the group representative object 3100 referred to by "GR" is incremented by one. At step 3706, a reference to the control object 3200 executing function 3220 is appended to the group list 3104 of the group representative object 3100 referenced by "GR". Function 3220 ends at step 3220.

Figure 38:
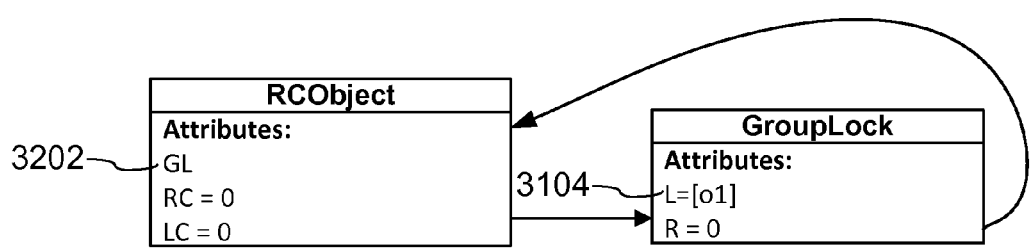
FIG. 38 is a block diagram showing the results of the initialization function of the script object.

FIG. 38 is a block diagram showing the results of the initialization function 3220 of control object 3200. As can be seen, group list 3104 of the group representative object 3100 referenced by group representative object reference 3202 now contains a control object 3200. The control object 3200 in group list 3104 is the control object 3200 that executed initialization function 3220.

Figure 39:
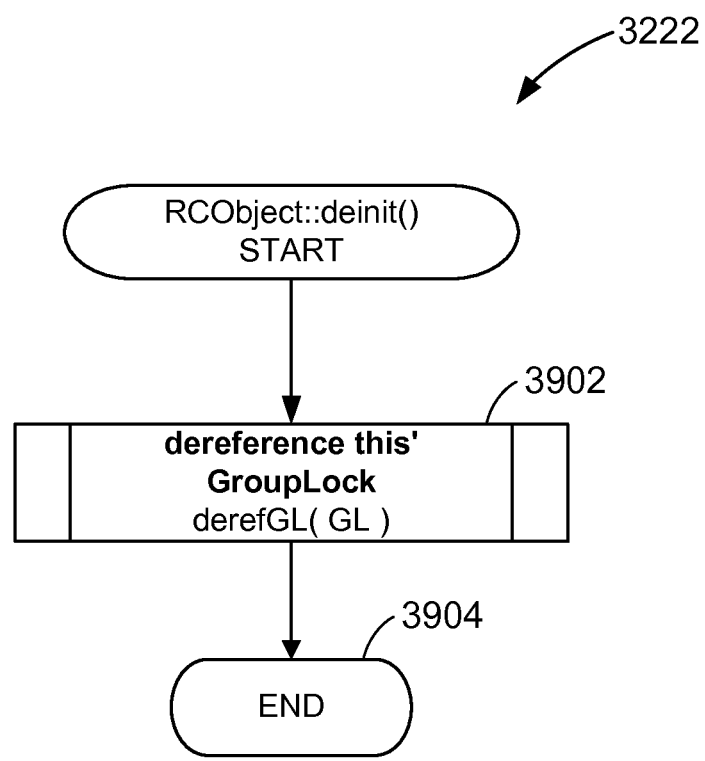
FIG. 39 is a flow chart of the de-initialization function of the script object.

FIG. 39 is a flow chart of the de-initialization function 3222 of control object 3200. This function de-initializes the control object 3200 executing function 3222. At step 3902, the group representative object 3100 referenced by group representative object reference 3202 is dereferenced. That is, the "dereference group representative" function 3234 is called, passing in group representative object reference 3202 as a parameter. Next, function 3222 ends at step 3904.

Figure 40:
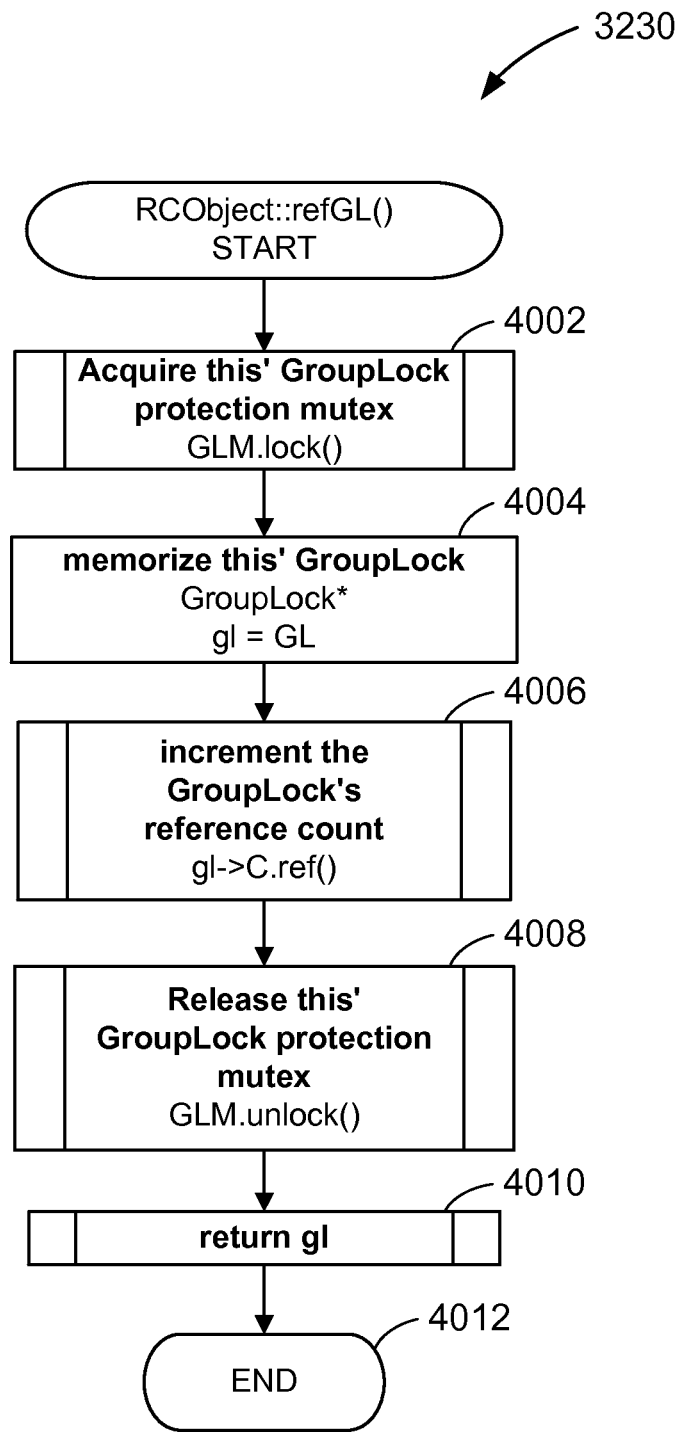
FIG. 40 is a flow chart of the "reference group representative" function of the script object.

FIG. 40 is a flow chart of the "reference group representative" function 3230 of the control object 3200. This function atomically increments the reference count of, and returns a copy of group representative reference object reference 3202. At step 4002, exclusive access indicator 3204 is locked. At step 4004, a copy of group representative reference 3202 is stored in group representative object reference "gr". At step 4006, reference count 3106 of the group representative object 3100 referenced by "gr" is incremented by one. At step 4008, exclusive access indicator 3204 is unlocked. At step 4010, function 3230 returns the "gr" reference and ends at step 4012.

Figure 41:
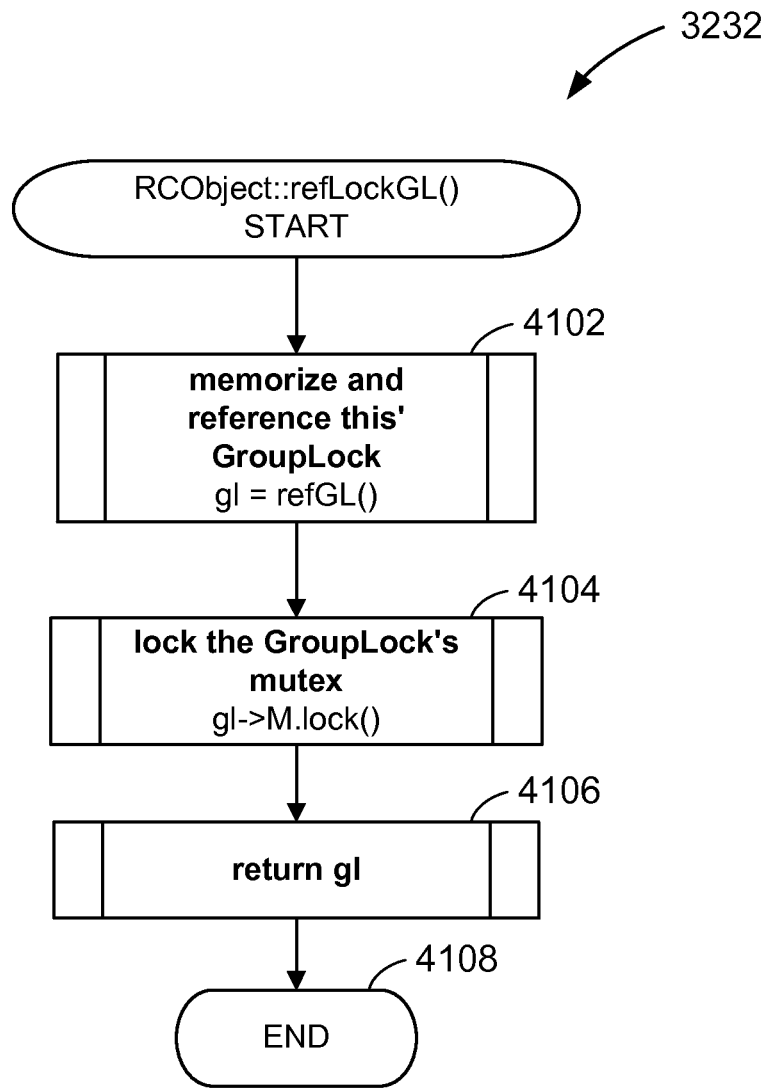
FIG. 41 is a flow chart of the "reference and lock group representative" function of the script object.

FIG. 41 is a flow chart of the "reference and lock group representative" function 3232 of control object 3200. In summary, function 3232 references and locks the group representative object 3100 referenced by group representative object reference 3202 and returns a copy of group representative object reference 3202. At step 4102, the "reference group representative" function 3230 and the return value, a reference to group representative object 3100 referenced by group representative object reference 3202 is stored in reference "gr". At step 4104, exclusive access indicator 3102 of the group representative object referenced by "gr" is locked. At step 4106, function 3232 returns the "gr" reference and at step 4108, function 3232 ends.

Figure 42:
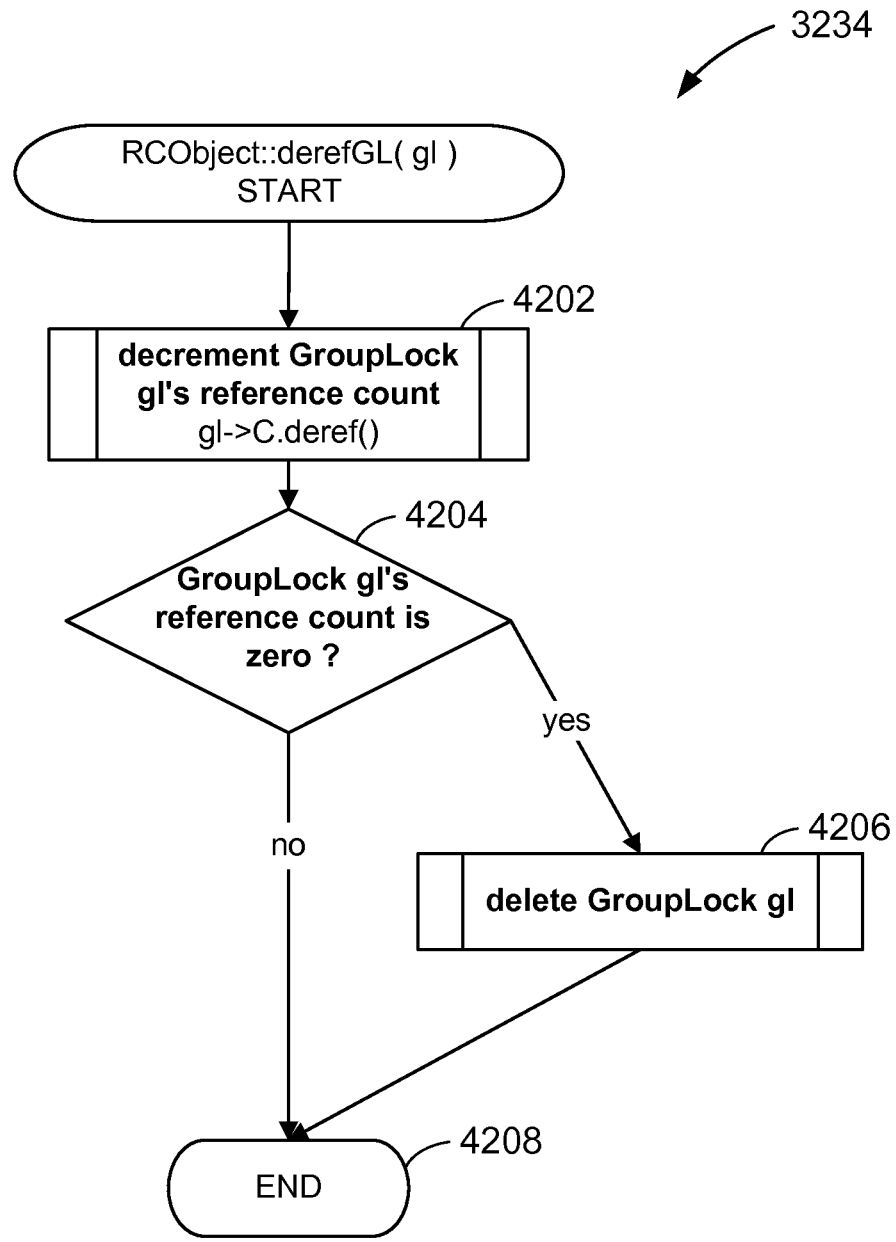
FIG. 42 is a flow chart of the "dereference group representative" function of the script object.

FIG. 42 is a flow chart of the "dereference group representative" function 3234 of control object 3200. In summary, this function decrements and potentially discards the group representative object 3100 referenced by reference "gr", which is passed in as a parameter to function 3234. At step 4202, reference count 3106 of the group representative object 3100 referenced by "gr" is decremented. At step 4204, it is determined whether the group representative object 3100 referenced by "gr" has a reference count of zero. If the determination at step 4204 if true, or yes, then function 3234 proceeds to step 4206. At step 4206, the group representative object 3100 referenced by "gr" is deleted. At step 4208, function 3234 ends. If the determination at step 4204 is false, function 4204 proceeds directly to step 4208, where function 4204 ends.

Figure 43:
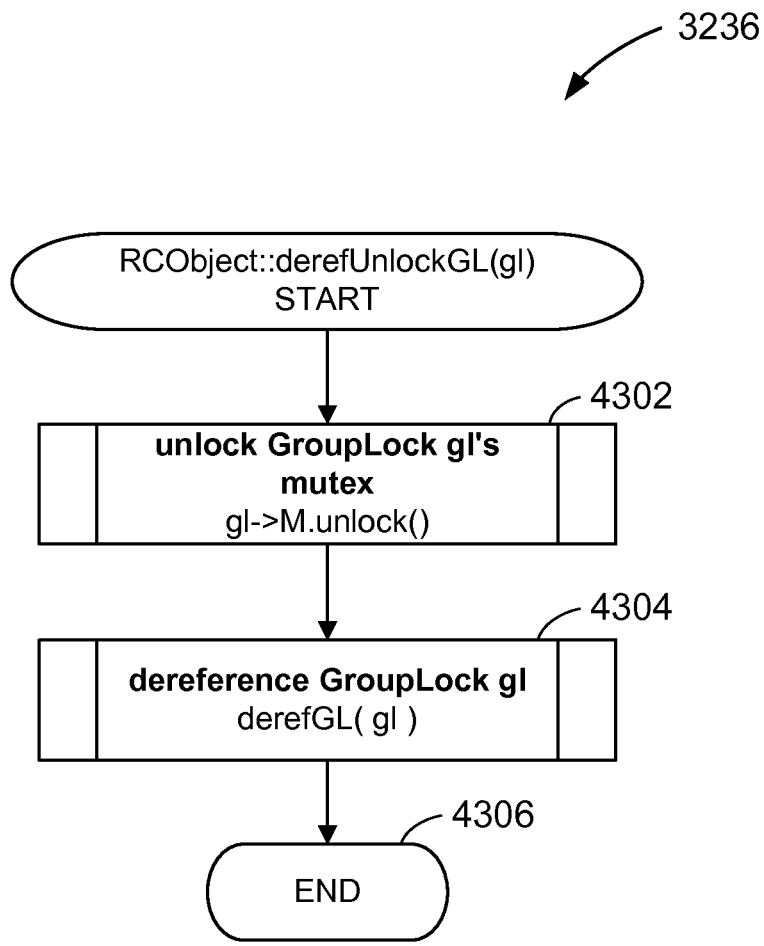
FIG. 43 is a flow chart of the "dereference and unlock group representative" function of the script object.

FIG. 43 is a flow chart of the "dereference and unlock group representative" function 3236 of control object 3200. In summary, function 3236 unlocks and dereferences a group representative object 3100 referenced by reference "gr", which is passed in as a parameter. At step 4302, the group representative object 3100 referenced by "gr" is unlocked. That is, exclusive access indicator 3102 of the group representative object 3100 referenced by "gr" is unlocked. At step 4304, the "dereference group representative" function 3234 is called, passing in the "gr" reference as a parameter. At step 4306, function 3236 ends.

Figure 44:
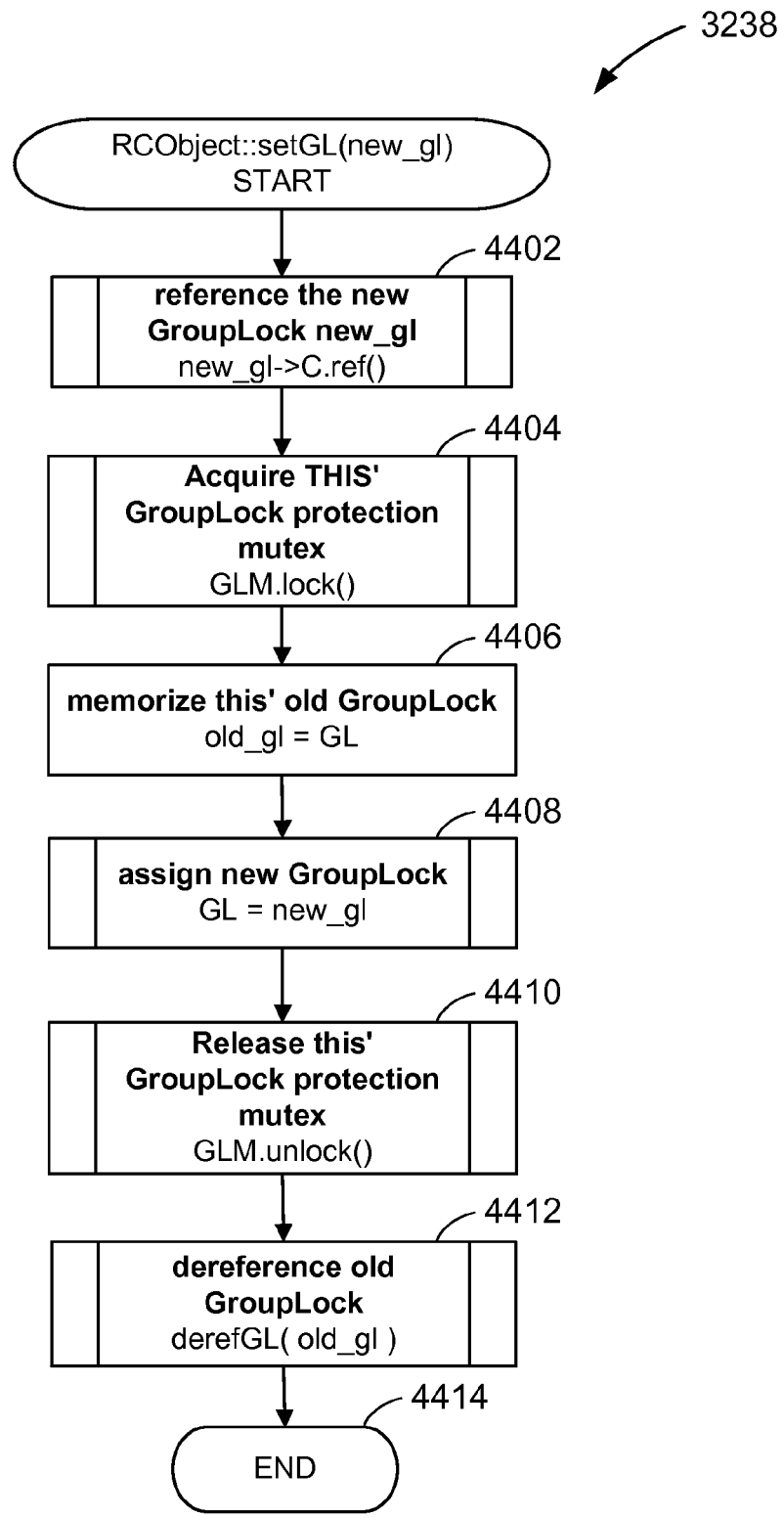
FIG. 44 is a flow chart of the "set group representative" function of the script object.

FIG. 44 is a flow chart of the "set group representative" function 3238 of control object 3200. In summary, function 3238 assigns a new group representative object 3100 to the control object 3100 executing function 3238, references the new group representative object 3100, and dereferences the previous group representative object 3200 associated with the control object 3100 executing function 3238. Function 3238 receives, as a parameter, a reference ("new_gr") to a group representative object 3100. At step 4402, the group representative object 3200 referred to by "gr" is referenced. That is, reference count 3106 of the group representative object referenced by "gr" is incremented. At step 4404, exclusive access indicator 3204 of the control object 3200 executing function 3238 is locked. At step 4406, the value of group representative object reference 3202 is stored in group representative object reference "old_gr". At step 4408, group representative reference 3202 is assigned the value of reference "new_gr". That is, the new group representative object 3100 is associated with the control object 3200 executing function 3238. At step 4410, exclusive access indicator 3204 is unlocked. At step 4412, the "dereference group representative" function is called, passing "old_gr" as a parameter. That is, the previous group representative object 3100 associated with the control object 3200 executing function 3238 is dereferenced. At step 4414, function 3238 ends.

Figure 45:
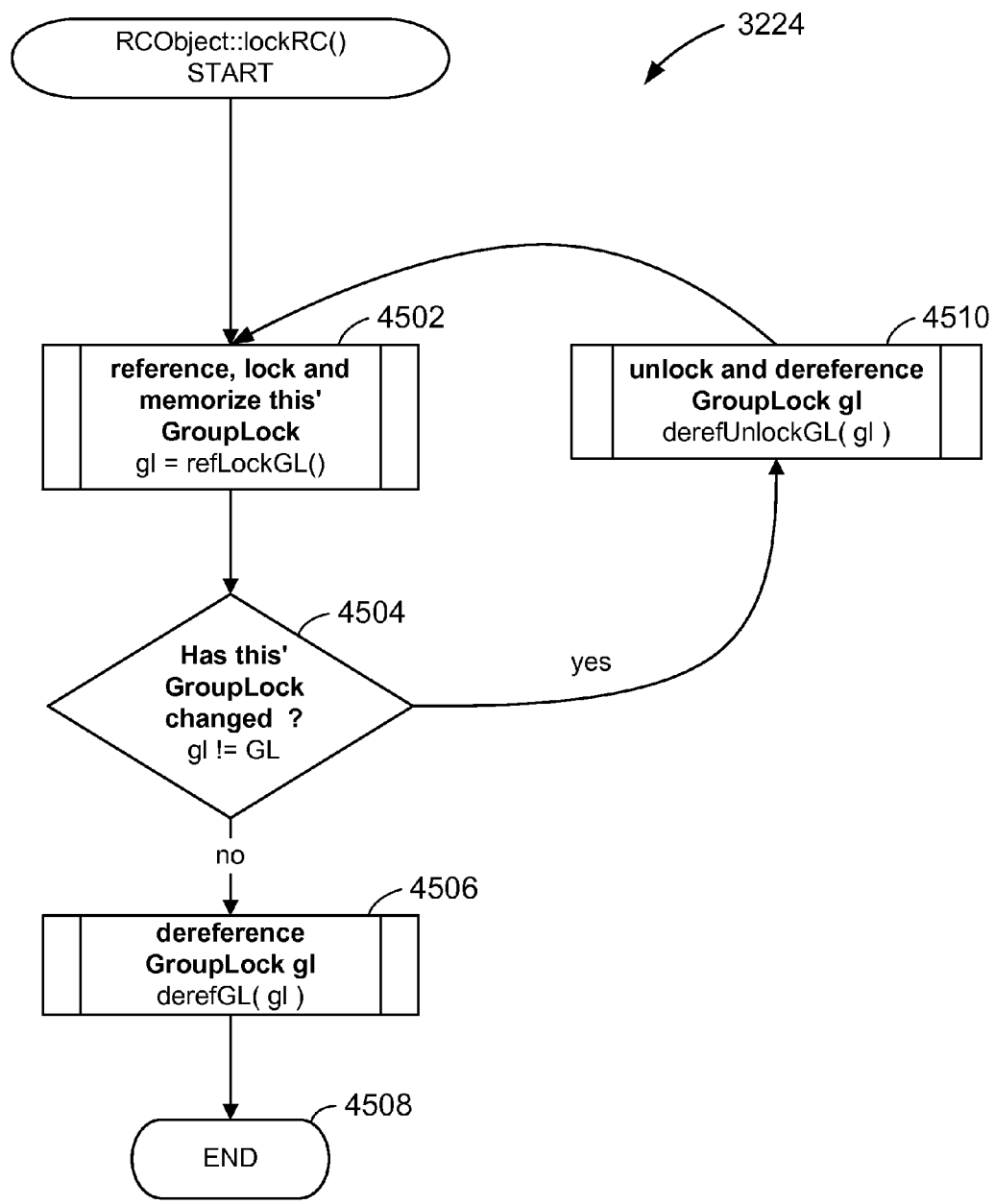
FIG. 45 is a flow chart of the lock function of the script object.

FIG. 45 is a flow chart of the lockRC function 3224 of control object 3200. In summary, function 3224 locks the exclusive access indicator of the group representative object 3100 associated with the control object 3200 executing function 3224. At step 4502, the "reference and lock group representative" function 3232 is called, and the returned reference is stored as "gr". At step 4504, it is determined whether the value of "gr" differs from the value of group representative object reference 3202 of the control object 3200 executing function 3224, thereby protecting the group's reference count status. That is, it is determined whether the group representative object reference 3202 has changed. If the determination at step 4504 is false, or no, then function 3224 proceeds to step 4506. At step 4506, the "dereference group representative" function 3234 is called, passing in the "gr" reference as a parameter. At step 4508, function 3224 ends. If the determination at step 4504 is true, or yes, step 4510 is performed. At step 4510, the group representative object referenced by "gr" is unlocked and dereferenced through a call to the "dereference and unlock group representative" function 3236. Next, function 3224 proceeds back to step 4502.

Figure 46:
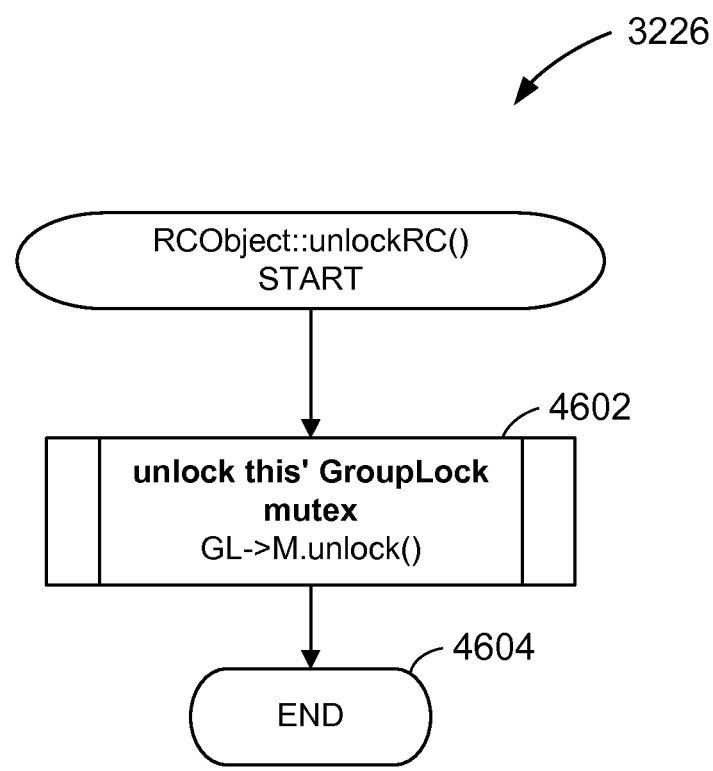
FIG. 46 is a flow chart of the unlock function of the script object.

FIG. 46 is a flow chart of the unlockRC function 3226 of control object 3200. At step 4602, the exclusive access indicator 3102 of the group representative object 3100 associated with the control object 3200 executing function 3226 is unlocked. Function 3226 ends at step 4604.

Figure 47:
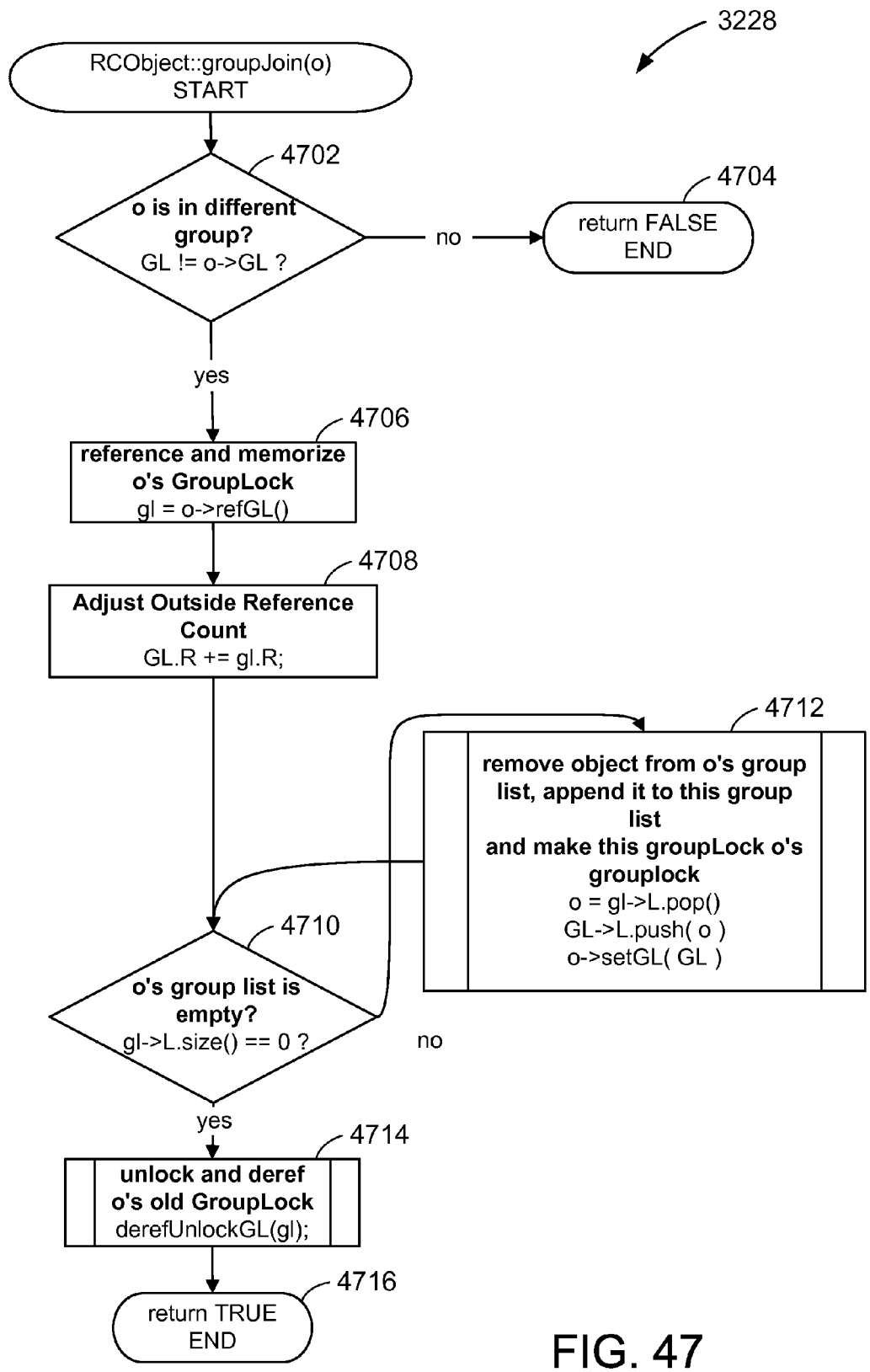
FIG. 47 is a flow chart of the "group join" function of the script object.

FIG. 47 is a flow chart of the "group join" function 3228 of control object 3200. In summary, function 3228 joins the group associated with the control object 3200 executing function 3228 with the group associated with the control object referenced by passed-in reference "o". At step 4702, it is determined whether the control object "o" is in a different group than the control object executing function 3228. If the determination at step 4702 is false, or no, then function 3228 proceeds to step 4704, where function 3228 ends. If the determination at step 4702 is true, or yes, then function 3228 proceeds to step 4706. At step 4706, the group representative object reference 3202 of control object "o" is copied to reference "gr". At step 4708, the outside reference count 3108 of the group representative object 3100 associated with the control object 3200 executing function 3228 is adjusted, by adding to it the outside reference count 3108 of the group representative object referenced by "gr". At step 4710, it is determined whether the group list 3104 of the group representative object referenced by "gr" is empty.

If the determination at step 4710 is false, or no, then function 3228 proceeds to step 4712. At step 4712, a control object 3200 is removed from the group list 3104 of the group representative object referenced by "gr" and a reference to the control object 3200 is stored in reference "o". Then, control object "o" is added to the group list 3104 of the group representative object 3100 associated with the control object 3200 executing function 3200. Next, the "set group representative" function 3238 of control object "o" is called, passing in group representative object reference 3202 as a parameter. Next, function 3228 proceeds back to step 4710.

If the determination at step 4710 is true, or yes, then function proceeds to step 4714. At step 4714, the "dereference and unlock group representative" function 3236 is called, passing in the "gr" reference as a parameter. That is, the old group representative object 3100 that was previously associated with control object "o" is unlocked and dereferenced. At step 4716, function 3228 ends.

Figure 48:
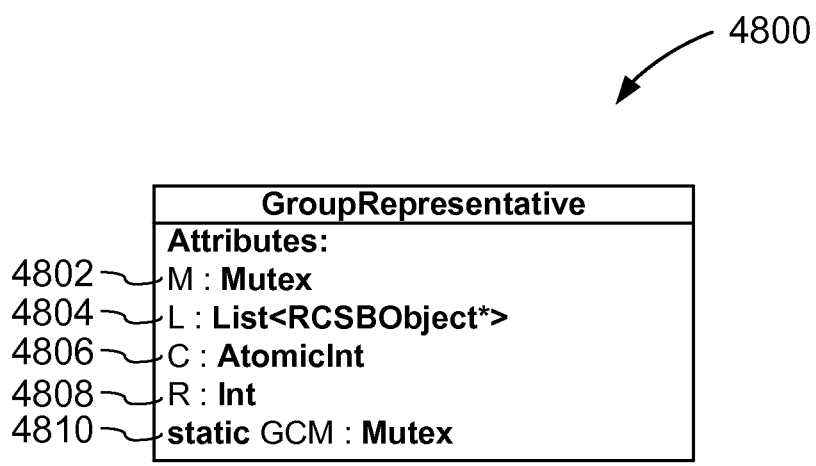
FIG. 48 is a block diagram of a group representative object for use with reference counted script base objects with reference loop management ("RCSB objects").

Methods and Systems for Deterministic and Multithreaded Script Objects and Script Engine FIG. 48 is a block diagram of a group representative object 4800 for use with reference counted script base objects with reference loop management ("RCSB objects"). Group representative object 4800 is embodied in processor-executable instructions, which may be executed, for example, by processor 505 (FIG. 5) of control server 350 (FIGS. 3 and 4). Group representative object 4800 includes a mutex or "exclusive access indicator" 4802 which may be locked to provide a single thread with exclusive access to a reference count status of a group of objects associated with group representative object 4800. Group representative object 4800 also includes a list 4804 of pointers (references) to objects (members) of a group associated with group representative object 4800. That is, list 4804 includes references to RCSB objects, described in more detail herein. Additionally, group representative object 4800 includes a reference count 4806, which is a numeric value, and in the exemplary embodiment is an atomic integer, that represents the number of objects referencing group representative object 4800. Group representative object 4800 also includes an outside reference count 4808, which is numeric value that represents a total number of outside references to the group of objects associated with group representative object 4800. Additionally, group representative object 4800 includes a global mutex (global exclusive access indicator) which enables exclusive group construction during reference loop checking in a "reference and detect loop" function described herein.

Figure 49:
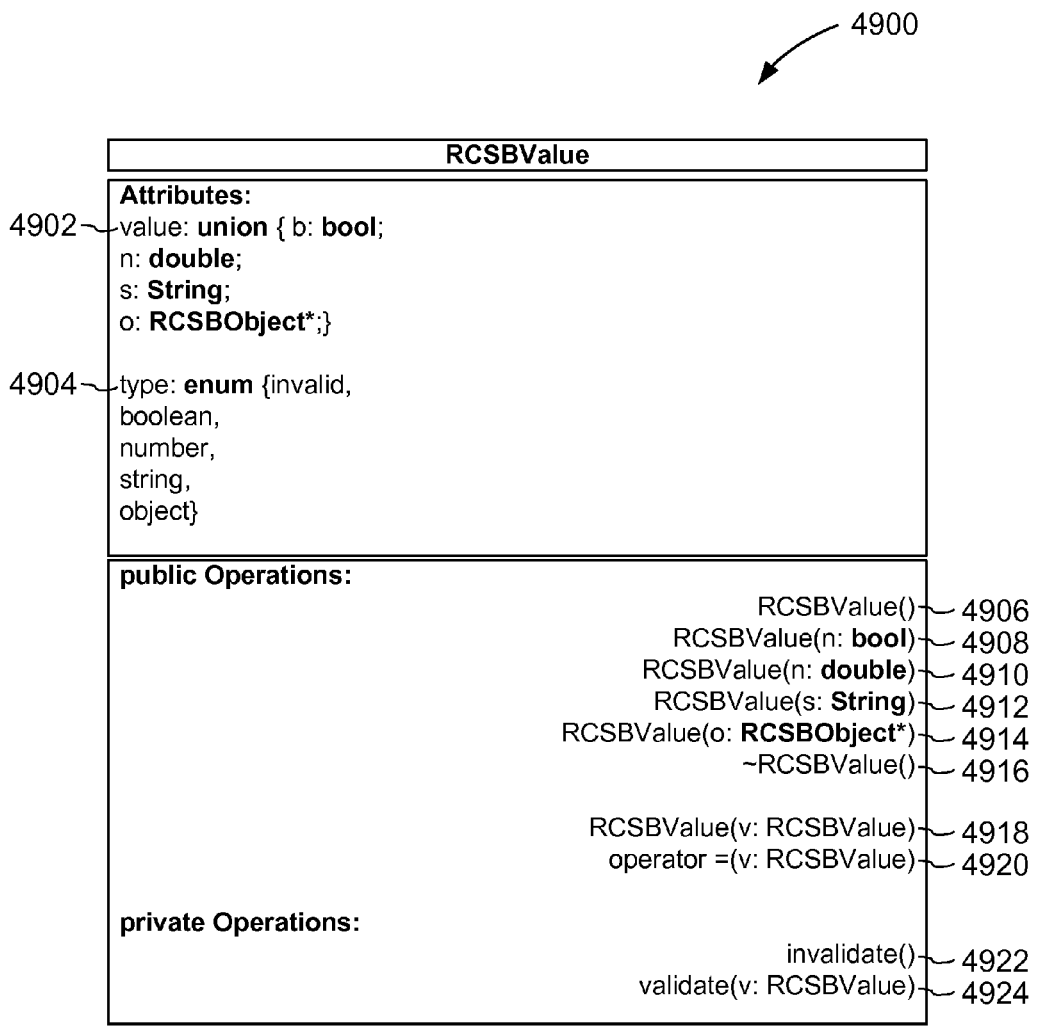
FIG. 49 is a block diagram of an exemplary embodiment of a reference counted script base value object ("RCSBValue object").

FIG. 49 is a block diagram of an exemplary embodiment of a reference counted script base value object ("RCSBValue object") 4900. RCSBValue object includes a value member variable 4902, which in the exemplary embodiment is a union that may be a bool, a double, a string, or a reference to a reference counted script base object with reference loop management ("RCSB object"). Additionally, RCSBValue object includes a type member 4904, which is an enumeration of constants named "invalid", "boolean", "number", "string", and "object". Type member 4904 indicates what type of value is stored in value member variable 4902. RCSBValue object 4900 includes the following public member functions: a constructor 4906 that takes no parameters, a constructor 4908 that takes a bool as a parameter, a constructor 4908 that takes a double as a parameter 4910, a constructor 4912 that takes a string as a parameter, a constructor 4914 that takes a reference to an RCSB object as a parameter, a destructor 4916, a constructor 4918 that takes an RCSBValue object 4900 as a parameter, and an overloaded equals operator 4920 which takes an RCSBValue object 4900 as a parameter. Additionally, RCSBValue object 4900 includes the following private functions: an invalidate function 4922 and a validate function 4924. In exemplary embodiments, the RCSBValue object 4900 is not instantiated directly, but rather objects that derive from the RCSBValue object 4900 are instantiated.

Figure 50:
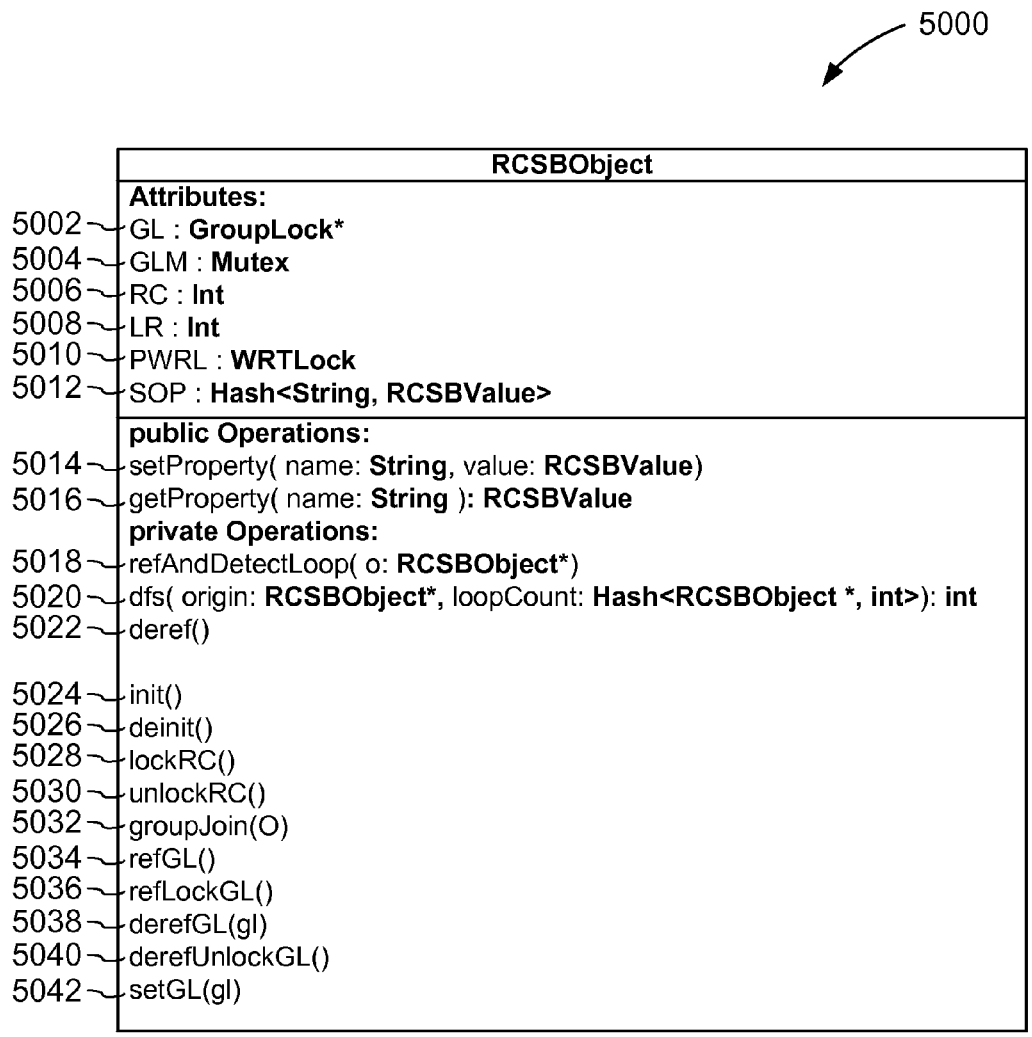
FIG. 50 is a block diagram of an exemplary embodiment of a reference counted script base object with reference loop management ("RCSB object").

FIG. 50 is a block diagram of an exemplary embodiment of a reference counted script base object with reference loop management ("RCSB object"). In some embodiments, an RCSB object 5000 acts as a control object 900 in that an RCSB object 5000 may represent and provide access to at least one component of at least one machine. However, more broadly, and as will be understood by those skilled in the art in view of the description herein, an RCSB object 5000 is a script object, which is an element of an object oriented script engine (e.g., Javascript or Python). RCSB object 5000 is a reference counted script base object with reference loop management. That is, an RCSB object 5000 is a thread-safe, reference counted script object that, in some embodiments, represents a control object, whereas in other embodiments it does not. In exemplary embodiments, the RCSB object 5000 is not instantiated directly, but rather objects that derive from the RCSB object 5000 are instantiated.

RCSB object 5000 includes a group representative reference 5002. That is, group representative reference 5002 is a reference to an instance of a group representative object 4800 that a particular instance of RCSB object is associated with. Also included in RCSB object 5000 is a group representative mutex (exclusive access indicator) 5004 which locks and unlocks access to group representative reference 5002. As explained herein, group representative exclusive access indicator 5004 enables preventing race conditions between functions "reference group representative" 5034 and "set group representative" 5042, described herein. Additionally, RCSB object 5000 includes a reference count 5006, which is an integer that represents a number of references to an instance of RCSB object 5000. Further, RCSB object 5000 includes a loop reference count 5008, which represents how many loop references to other group members that an instance of RCSB object 5000 holds. Additionally, RCSB object 5000 includes a WRTLock member variable 5010, which protects properties hash, SOP 5012, which holds the RCSB object's 5000 properties as name-RCSBValue object 4900 pairs. RCSB object 5000 includes the following public functions: "set property" 5014 and "get property" 5016. RCSB object 5000 also includes the following private functions: "reference and detect loop" 5018, "depth first search" 5020, dereference 5022, initialize 5024, de-initialize 5026, "lock reference count" 5028, "unlock reference count" 5030, "group join" 5032, "reference group representative" 5034, "reference and lock group representative" 5036, "dereference group representative" 5038, "dereference and unlock group representative" 5040, and "set group representative" 5042.

Figure 51:
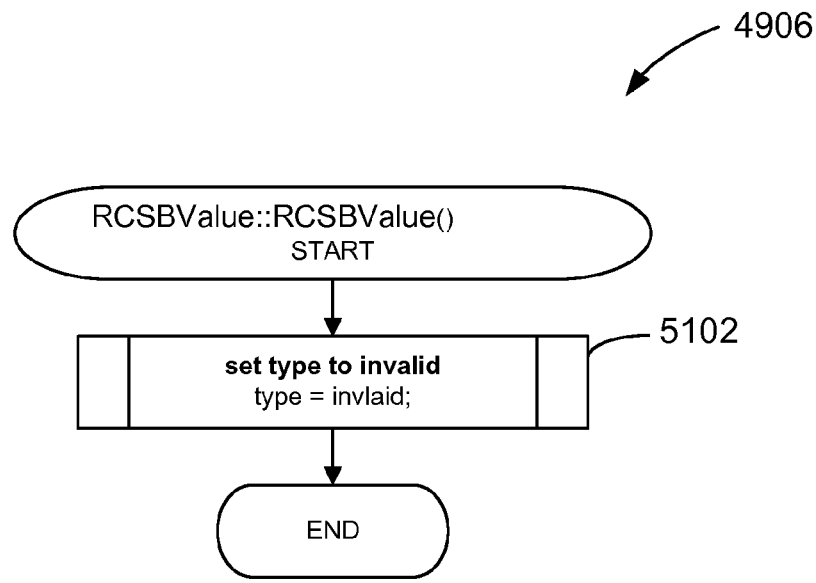
FIG. 51 is a flow chart of a constructor function of the RCSBValue object.

FIG. 51 is a flow chart of constructor function 4906 of the RCSBValue object 4900. Step 5102 of constructor function 4906 is shown and described in FIG. 51. More specifically, step 5102 includes setting type equal to invalid.

Figure 52:
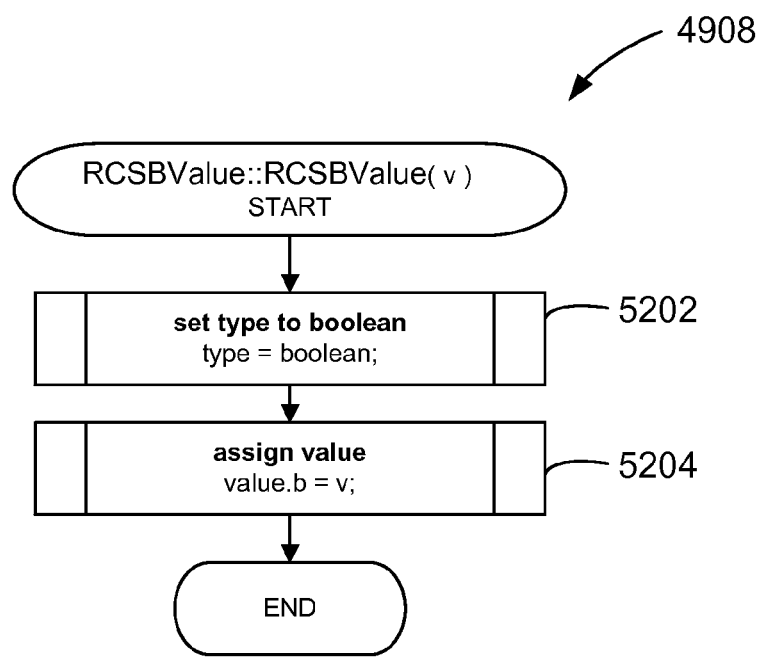
FIG. 52 is a flow chart of a constructor function of the RCSBValue object.

FIG. 52 is a flow chart of constructor function 4908 of the RCSBValue object 4900. The steps 5202 and 5204 of constructor function 4908 are shown and described in FIG. 52. More specifically, step 5202 includes setting type to Boolean and step 5204 includes setting value.b equal to the passed in variable, v.

Figure 53:
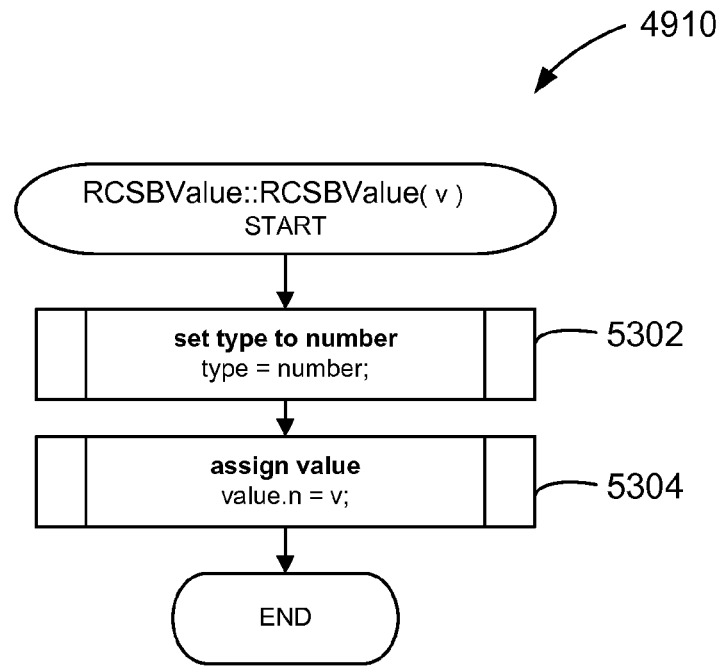
FIG. 53 is a flow chart of a constructor function of the RCSBValue object.

FIG. 53 is a flow chart of constructor function 4910 of the RCSBValue object 4900. The steps 5302 and 5304 of constructor function 4910 are shown and described in FIG. 53. More specifically, step 5302 includes setting type to number and step 5304 includes setting value.n to the passed in variable, v.

Figure 54:
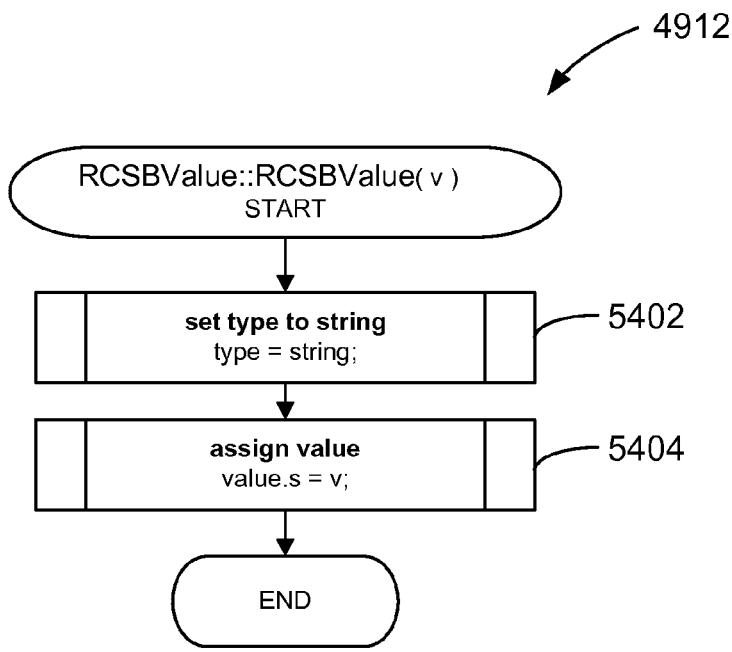
FIG. 54 is a flow chart of a constructor function of the RCSBValue object.

FIG. 54 is a flow chart of constructor function 4912 of the RCSBValue object 4900. The steps 5402 and 5404 of constructor function 4912 are shown and described in FIG. 54. More specifically, step 5402 includes setting type to string and step 5404 includes setting value.s equal to the passed in variable, v.

Figure 55:
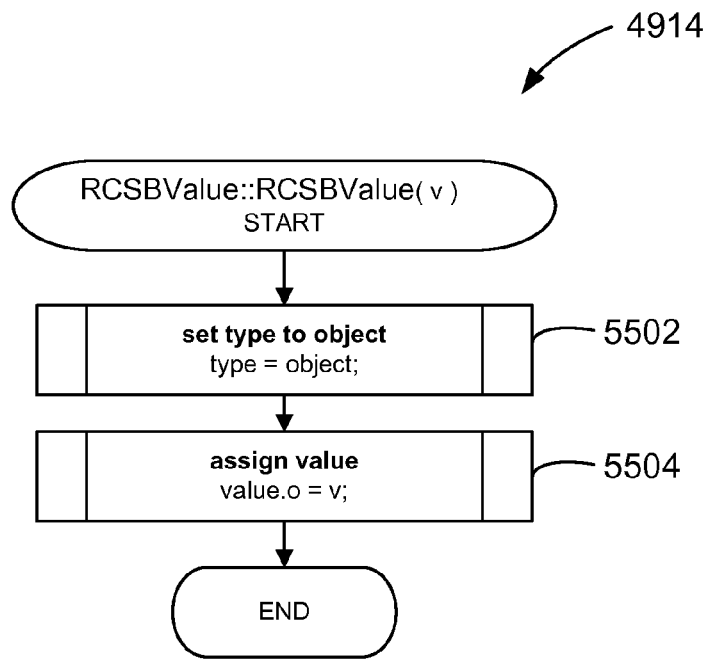
FIG. 55 is a flow chart of a constructor function of the RCSBValue object.

FIG. 55 is a flow chart of constructor function 4914 of the RCSBValue object 4900. The steps 5502 and 5504 of constructor function 4914 are shown and described in FIG. 55. More specifically, step 5502 includes setting type to object and step 5404 includes setting value.o equal to the passed in variable, v.

Figure 56:
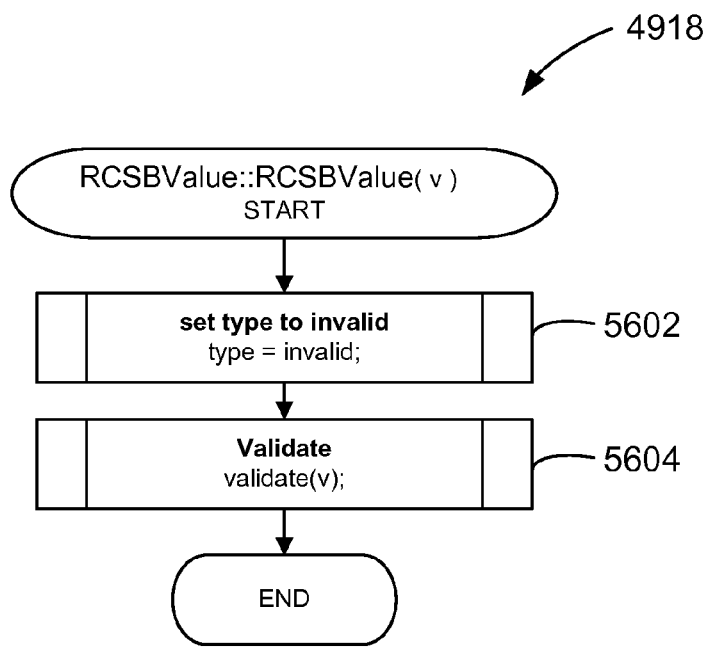
FIG. 56 is a flow chart of a constructor function of the RCSBValue object.

FIG. 56 is a flow chart of constructor function 4918 of the RCSBValue object 4900. The steps 5602 and 5604 of constructor function 4918 are shown and described in FIG. 56. More specifically, step 5602 includes setting type to invalid and step 5604 includes calling validate function 4924 and passing in variable, v, as a parameter.

Figure 57:
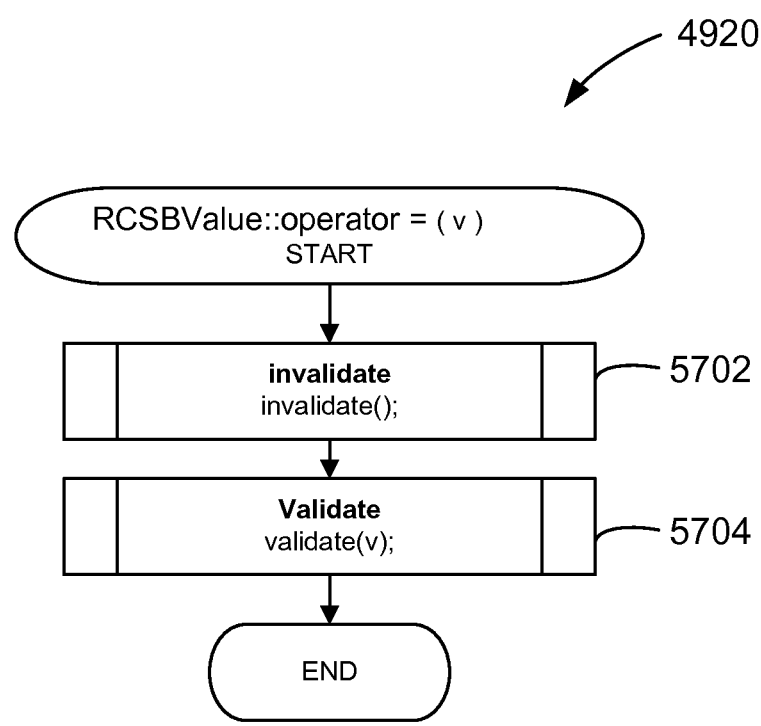
FIG. 57 is a flow chart of an overloaded equals operator of the RCSBValue object.

FIG. 57 is a flow chart of overloaded equals operator 4920 of the RCSBValue object 4900. The steps 5702 and 5704 of overloaded equals operator 4920 are shown and described in FIG. 57. More specifically, step 5702 includes calling invalidate function 4922. Step 5704 includes calling validate function 4924 and passing in variable, v, as a parameter.

Figure 58:
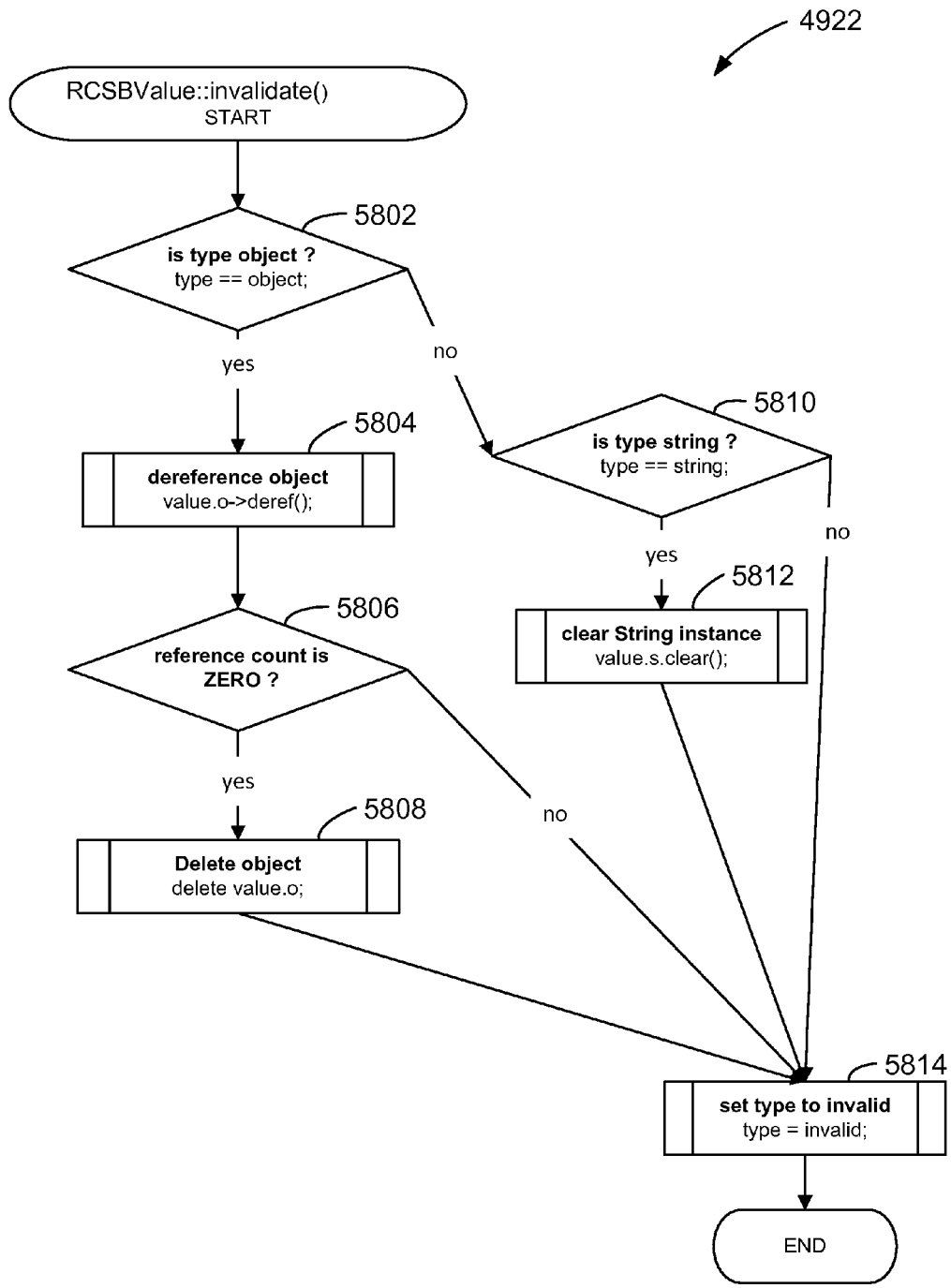
FIG. 58 is a flow chart of the invalidate function of the RCSBValue object.

FIG. 58 is a flow chart of the invalidate function 4922 of the RCSBValue object 4900. The steps 5802, 5804, 5806, 5808, 5810, 5812, and 5814 of the invalidate function 4922 are shown and described in FIG. 58.

Figure 59:
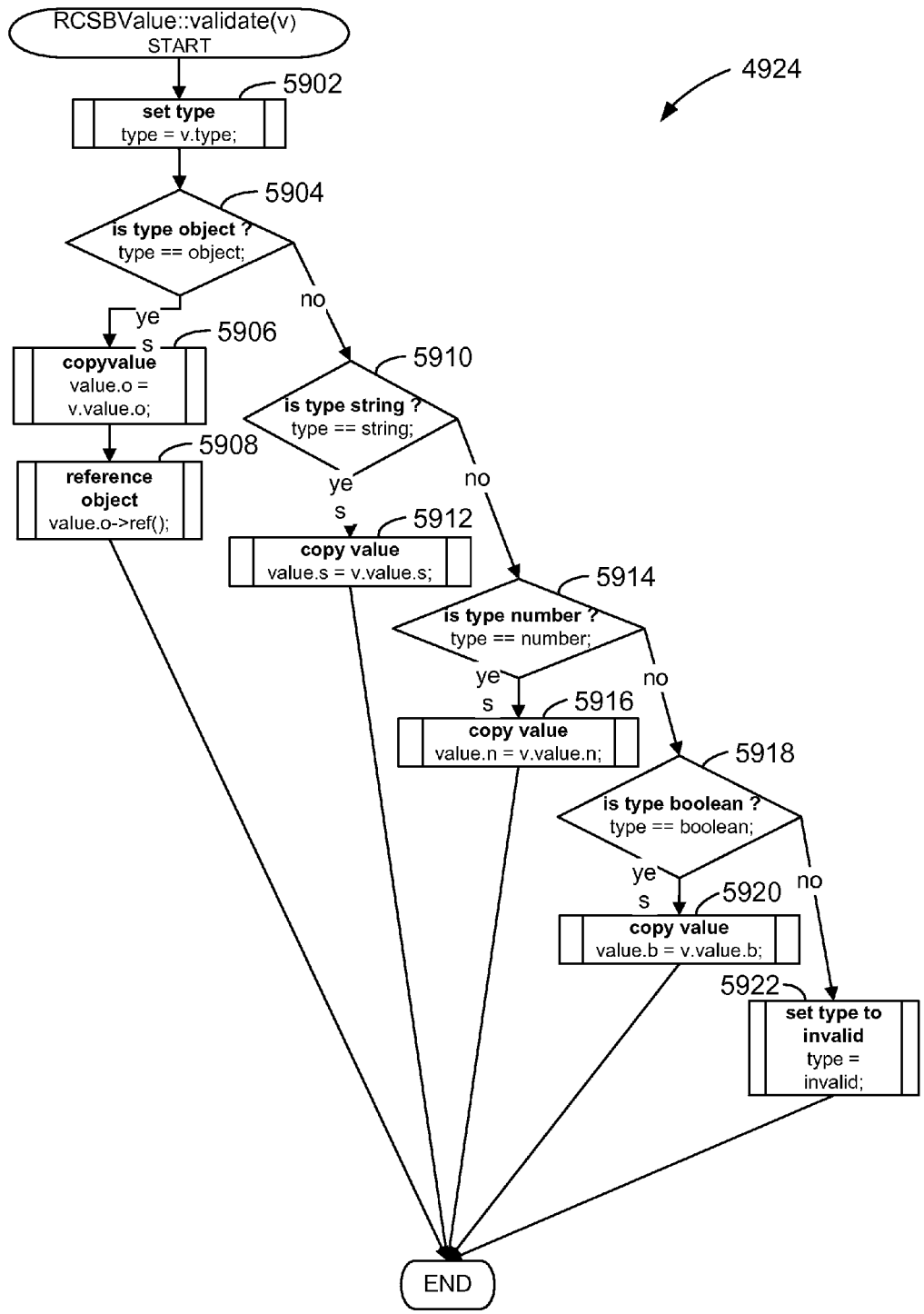
FIG. 59 is a flow chart of the validate function of the RCSBValue object.

FIG. 59 is a flow chart of the validate 4924 function of the RCSBValue object 4900. The steps 5902, 5904, 5906, 5908, 5910, 5912, 5914, 5916, 5918, 5920, and 5922 of the validate function 4924 are shown and described in FIG. 59.

Figure 60:
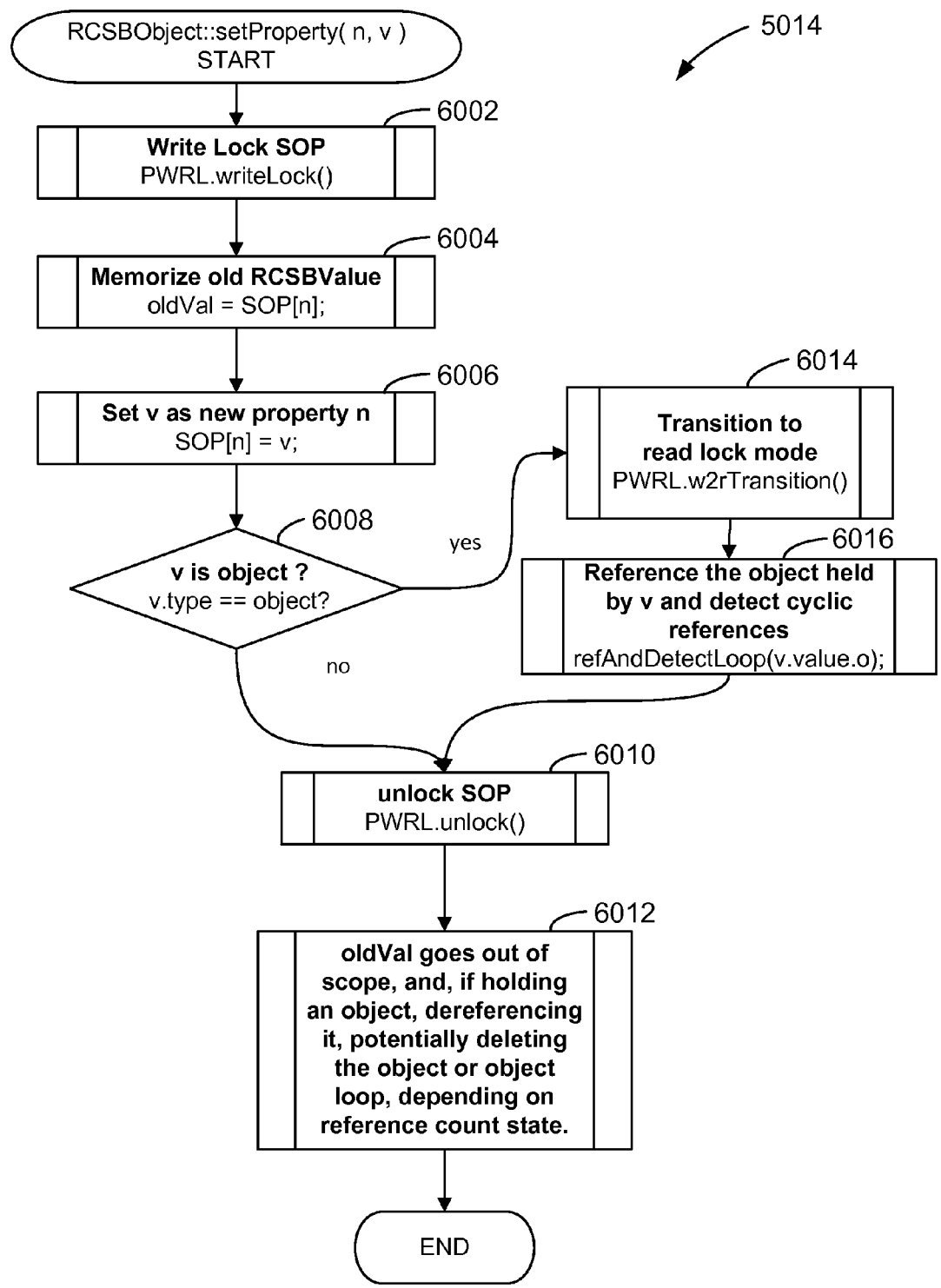
FIG. 60 is a flow chart of the "set property" function of the RCSB object.

FIG. 60 is a flow chart of the "set property" function 5014 of the RCSB object 5100. The steps 6002, 6004, 6006, 6008, 6010, 6012, 6014, and 6016 of the "set property" function 5014 are shown and described in FIG. 60.

Figure 61:
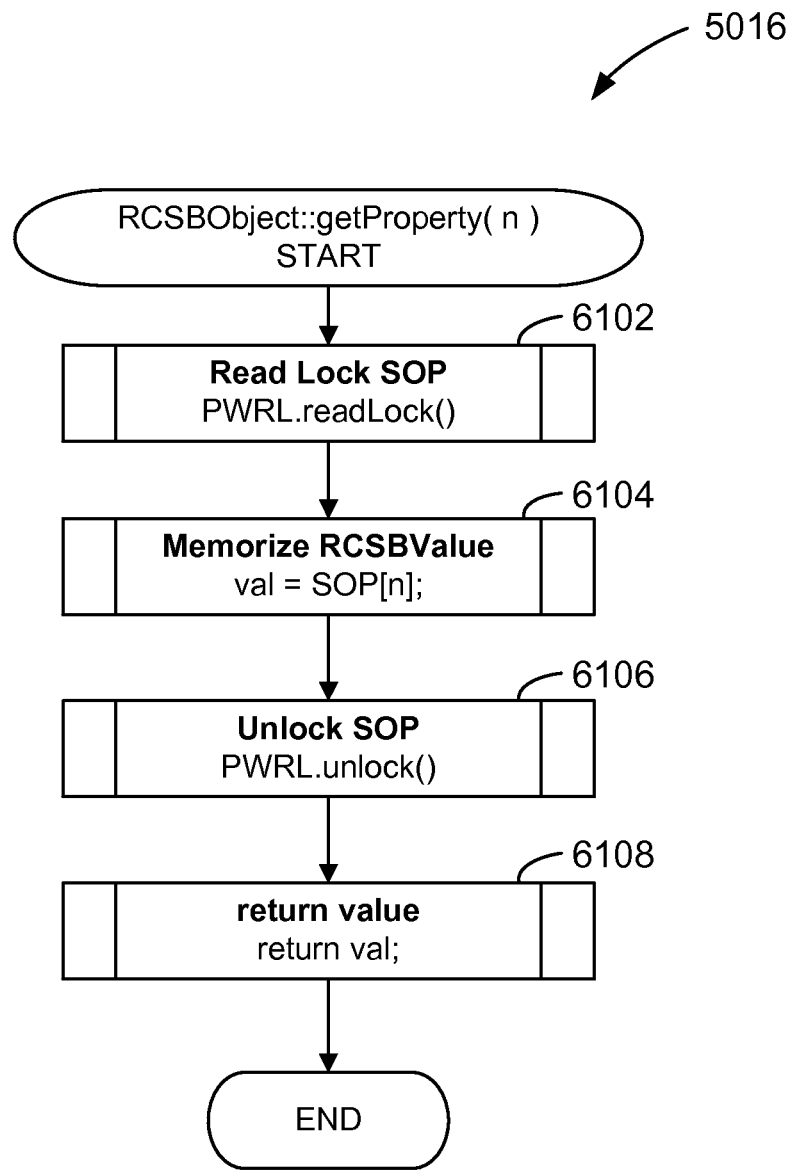
FIG. 61 is a flow chart of the "get property" function of the RCSB object.

FIG. 61 is a flow chart of the "get property" function 5016 of the RCSB object 5100. The steps 6102, 6104, 6106, and 6108 of the "get property" function 5016 are shown and described in FIG. 61.

Figure 62A:
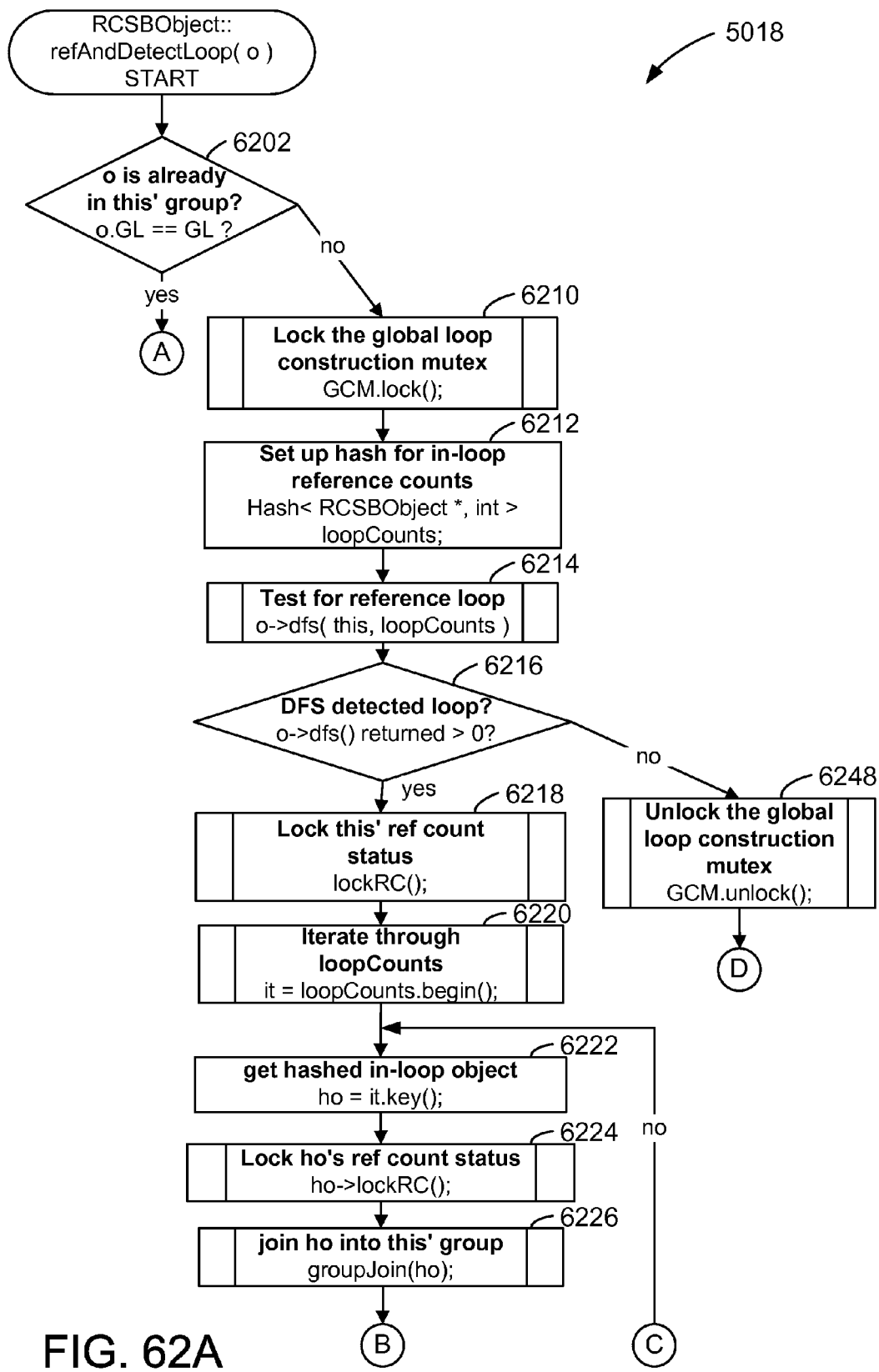
FIGS. 62A and 62B are flow charts of the "reference and detect loop" function of the RCSB object.
Figure 62B:
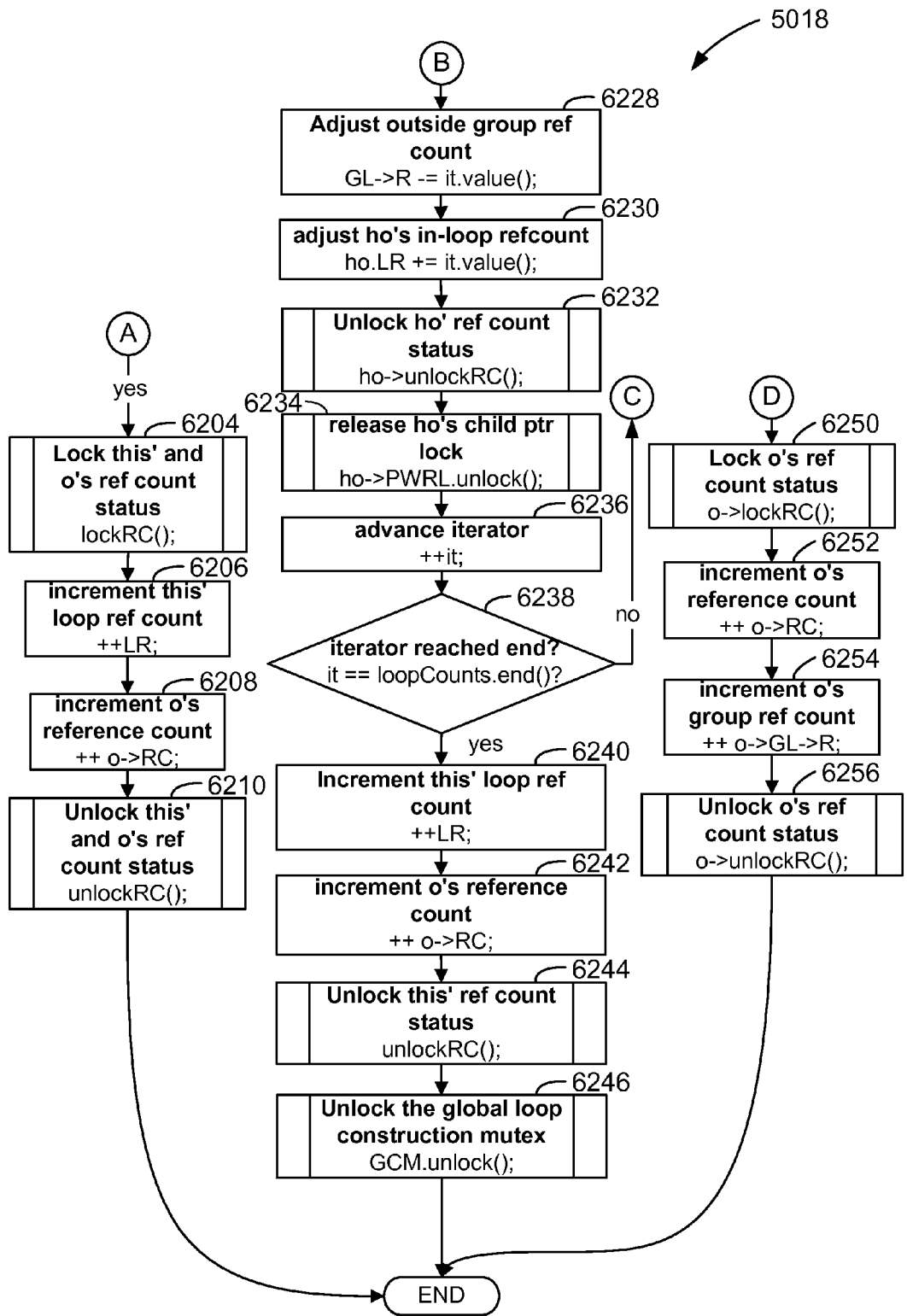

FIGS. 62A and 62B are flow charts of the "reference and detect loop" function 5018 of the RCSB object 5100. The steps 6202, 6204, 6206, 6208, 6210, 6212, 6214, 6216, 6218, 6220, 6222, 6224, 6226, 6228, 6230, 6232, 6234, 6236, 6238, 6240, 6242, 6246, 6248, 6250, 6252, 6254, and 6256 of the "reference and detect loop" function 5018 are shown and described in FIG. 62.

Figure 63A:
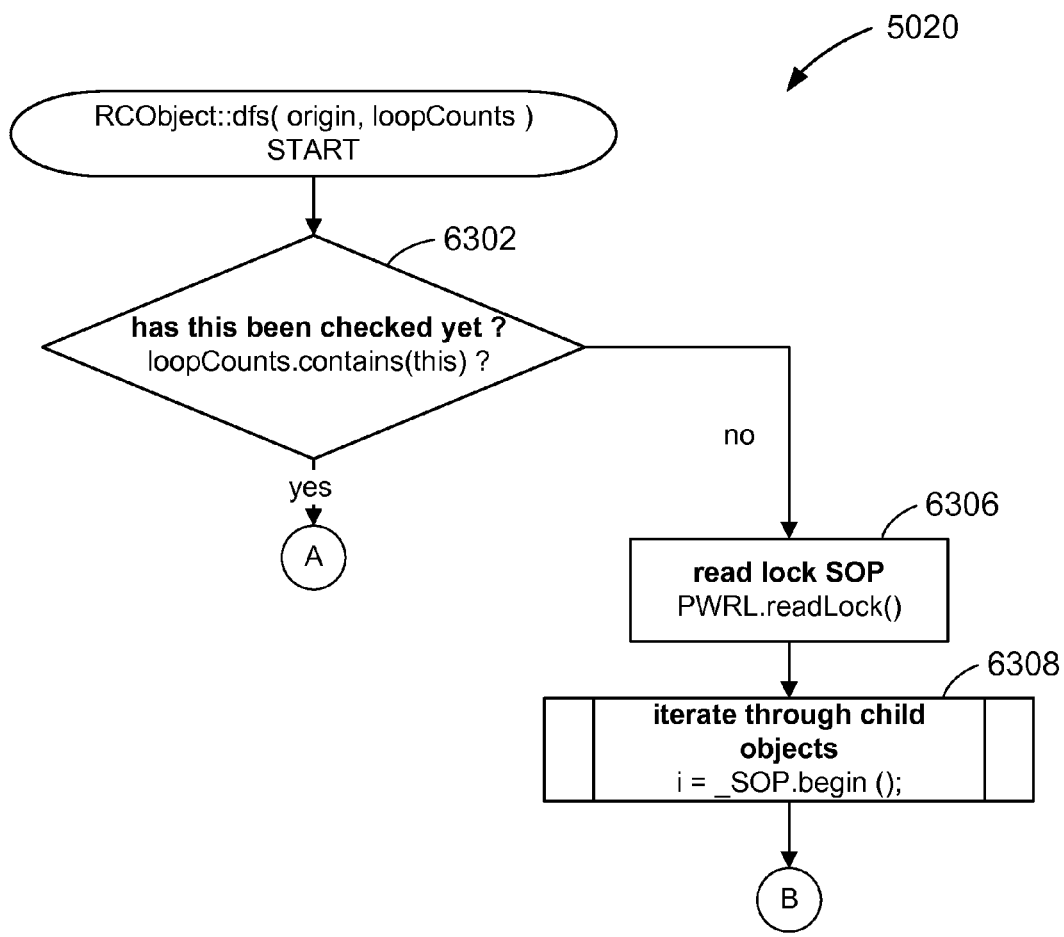
FIGS. 63A, 63B, and 63C are flow charts of the "depth first search" function of the RCSB object.
Figure 63B:
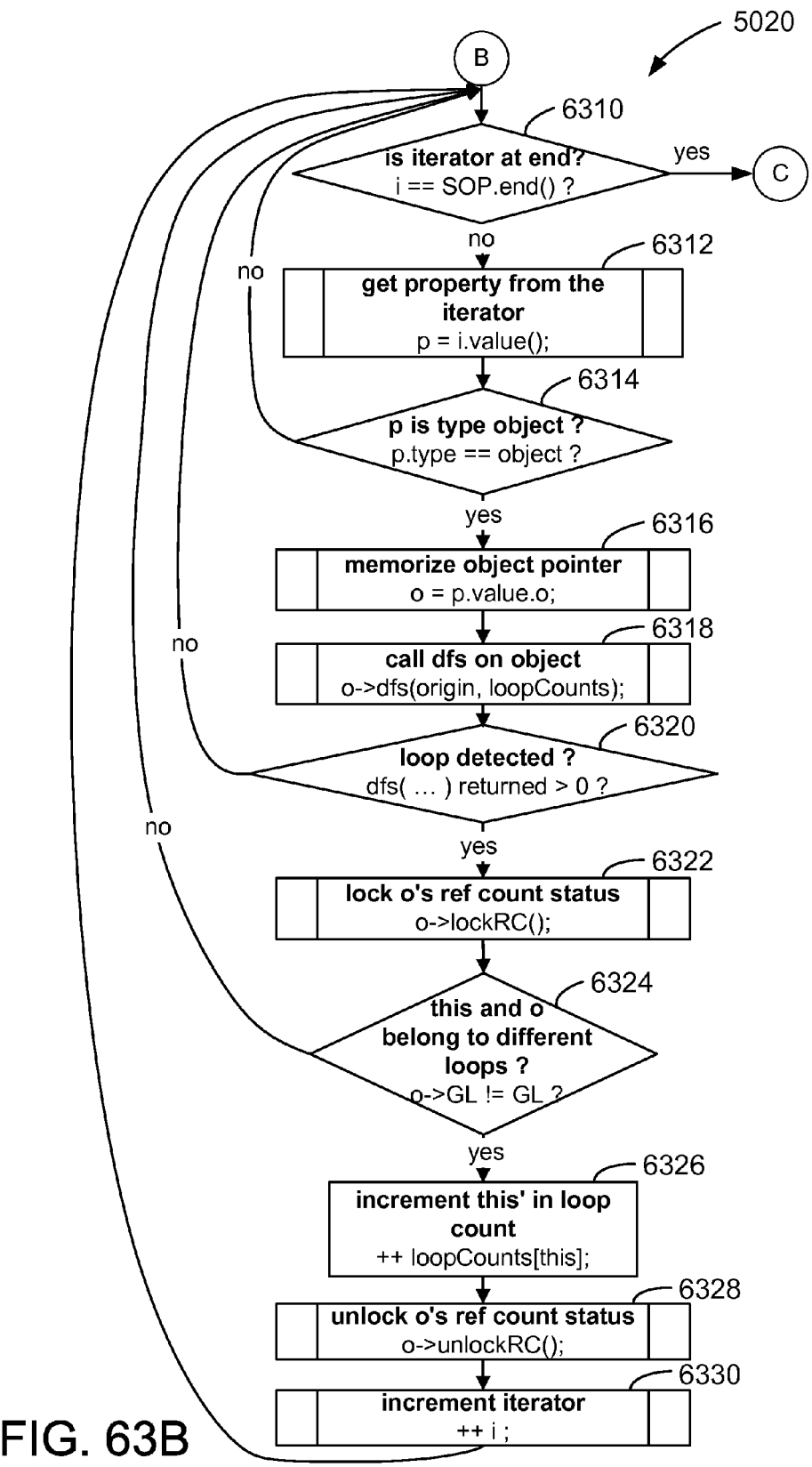
Figure 63C:
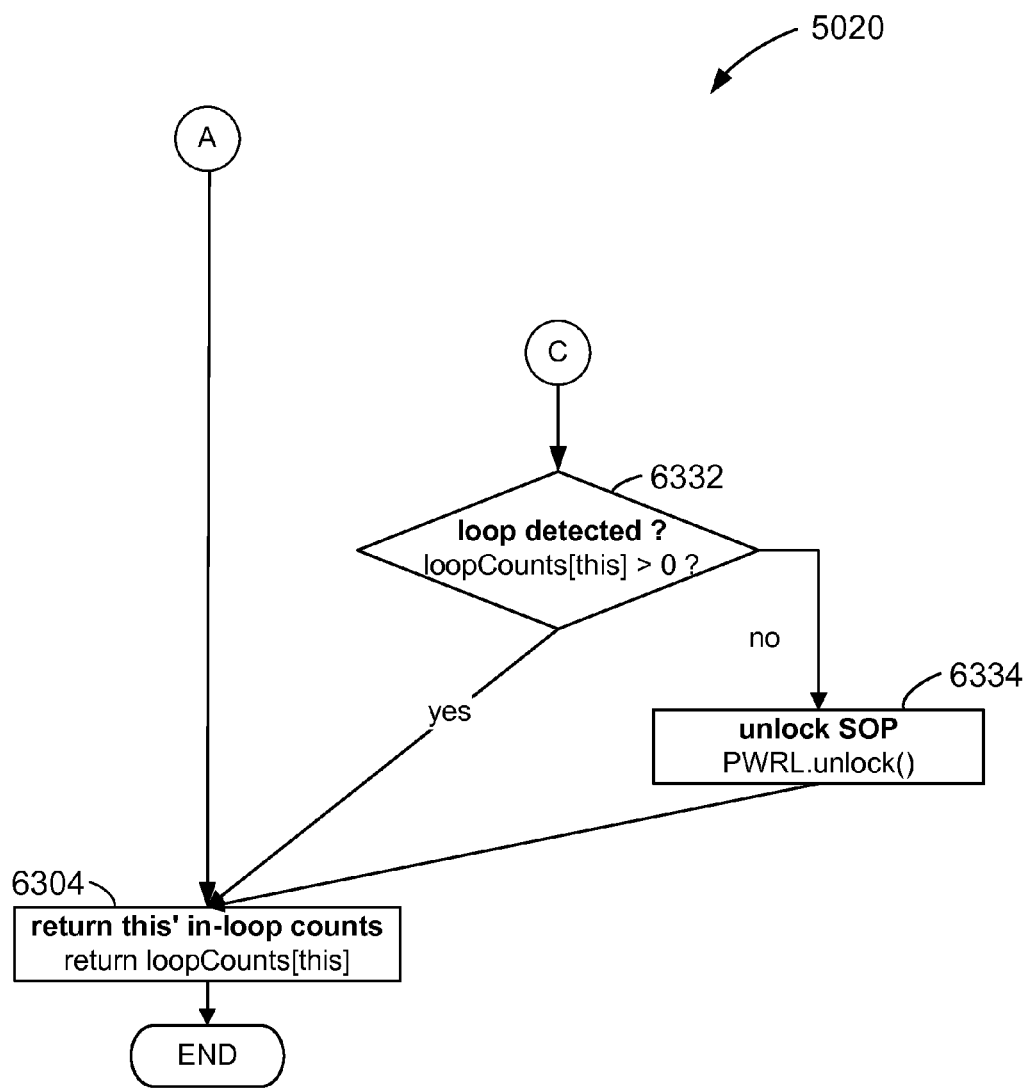

FIGS. 63A, 63B, and 63C are flow charts of the "depth first search" function 5020 of the RCSB object 5100. The steps 6302, 6304, 6306, 6308, 6310, 6312, 6314, 6316, 6318, 6320, 6322, 6324, 6326, 6328, 6330, 6332, and 6334 of the "depth first search" function 5020 are shown and described in FIG. 63.

Figure 64:
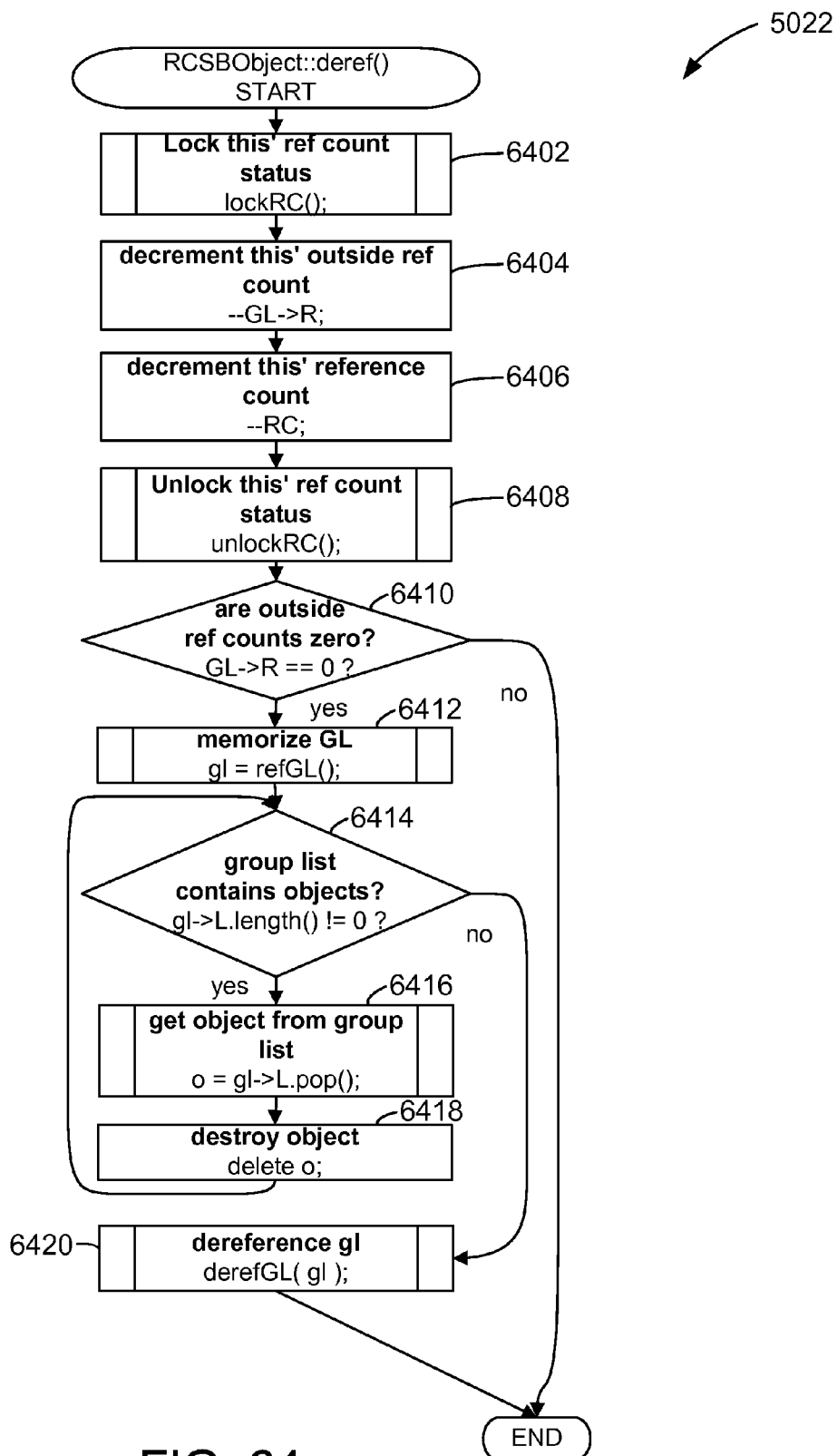
FIG. 64 is a flow chart of the dereference function of the RCSB object.

FIG. 64 is a flow chart of the dereference function 5022 of the RCSB object 5100. The steps 6402, 6404, 6406, 6408, 6410, 6412, 6414, 6416, 6418, and 6420 of the dereference function 5022 are shown and described in FIG. 64.

Figure 65:
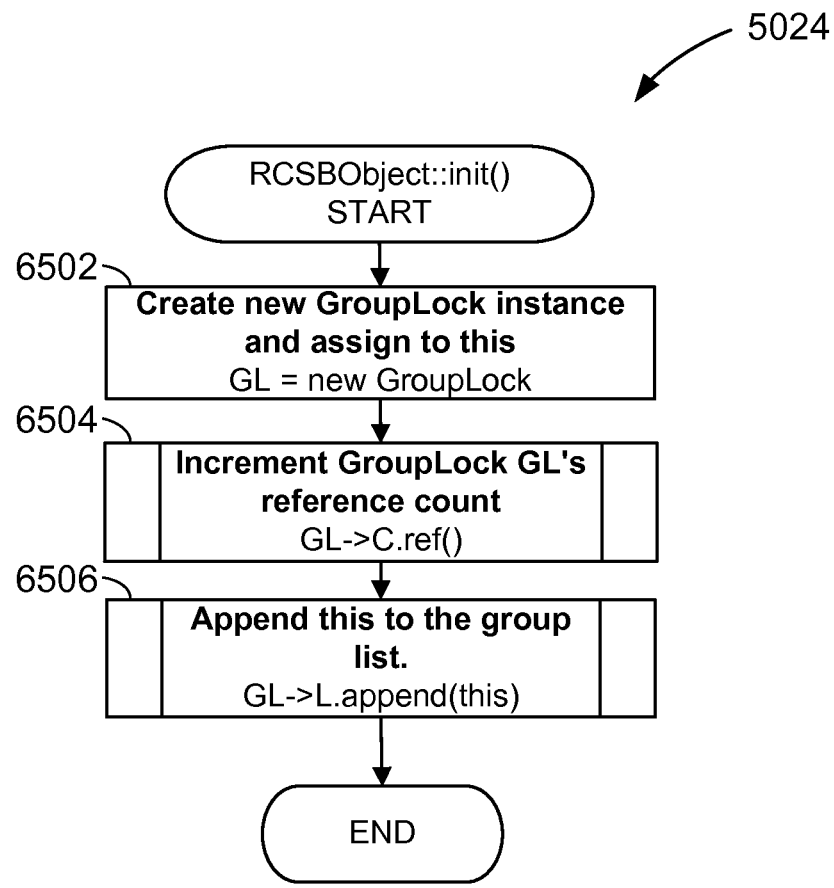
FIG. 65 is a flow chart of the initialization function of the RCSB object.
Figure 66:
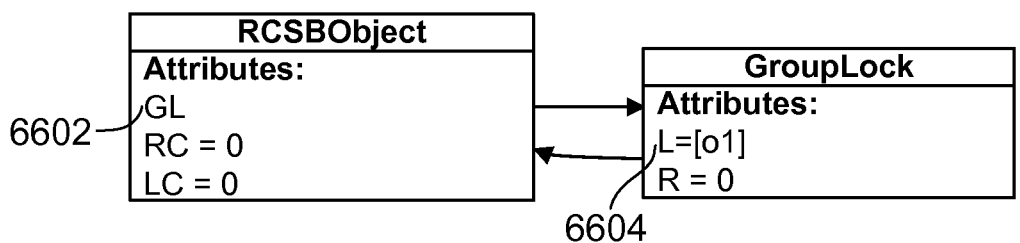
FIG. 66 is a block diagram showing the results of the initialization function of the RCSB object.

FIG. 65 is a flow chart of the initialization function 5024 of the RCSB object 5100. The steps 6502, 6504, and 6506 of the initialization function 5024 are shown and described in FIG. 65. FIG. 66 is a block diagram that shows attributes 6602 and 6604 after the initialization function 5024 of the RCSB object 5100 has been performed.

Figure 67:
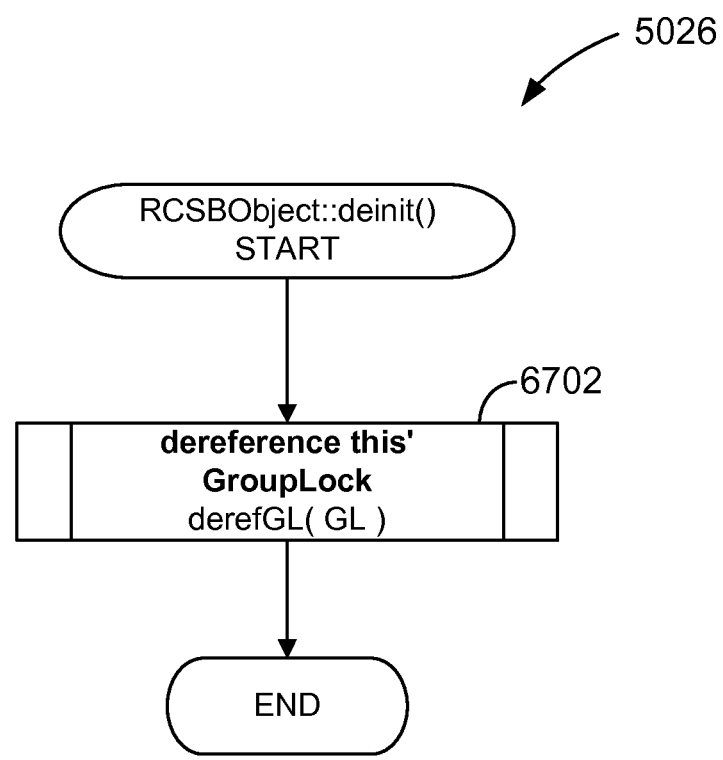
FIG. 67 is a flow chart of the de-initialization function of the RCSB object.

FIG. 67 is a flow chart of the de-initialization function 5026 of the RCSB object 5100. The step 6702 of the de-initialization function 5026 is shown and described in FIG. 67. More specifically, step 6702 includes calling the deference group representative function 5038.

Figure 68:
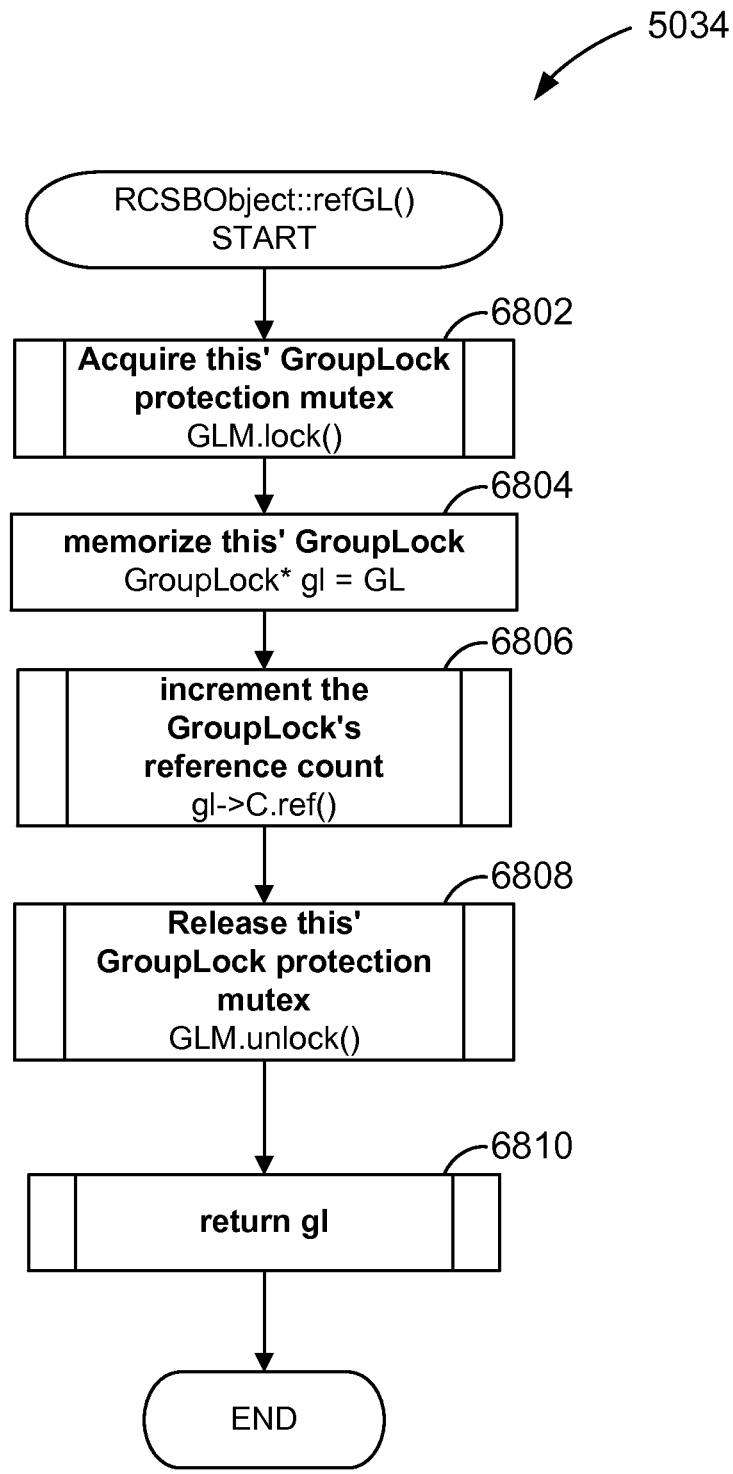
FIG. 68 is a flow chart of the "reference group representative" function of the RCSB object.

FIG. 68 is a flow chart of the "reference group representative" function 5034 of the RCSB object 5100. The steps 6802, 6804, 6806, 6808, and 6810 of the "reference group representative" function 5034 are shown and described in FIG. 68.

Figure 69:
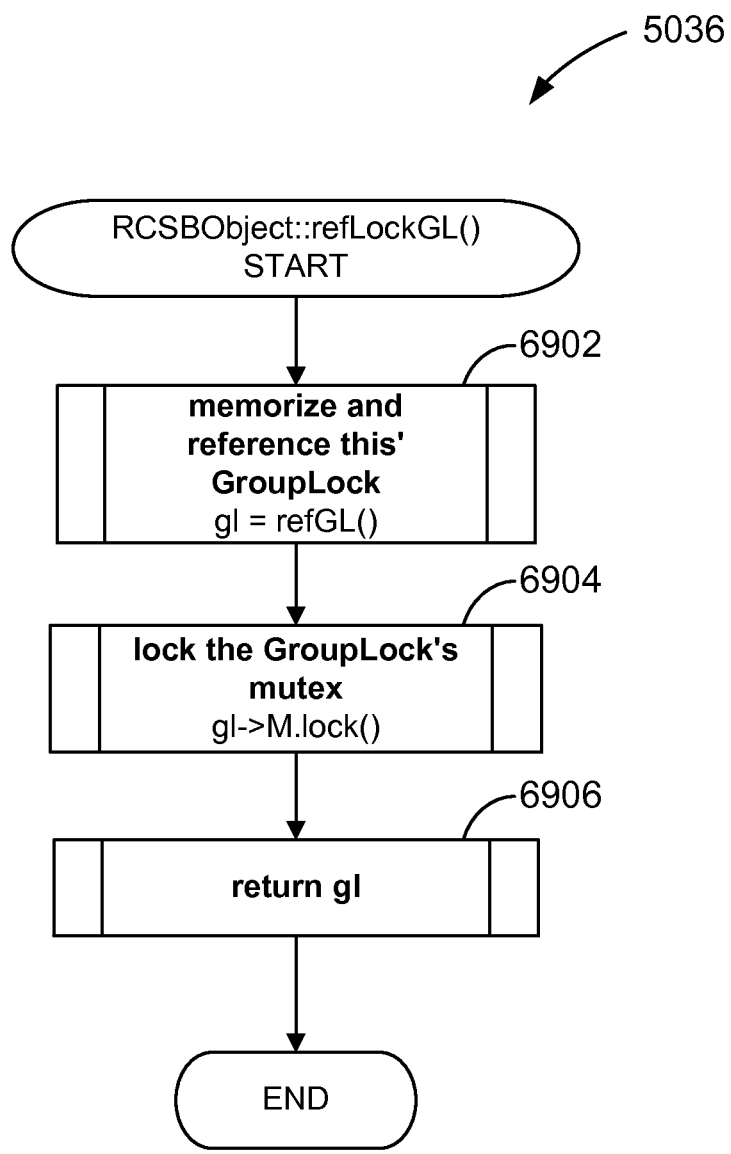
FIG. 69 is a flow chart of the "reference and lock group representative" function of the RCSB object.

FIG. 69 is a flow chart of the "reference and lock group representative" function 5036 of the RCSB object 5100. The steps 6902, 6904, and 6906 of the "reference and lock group representative" function 5036 are shown and described in FIG. 69.

Figure 70:
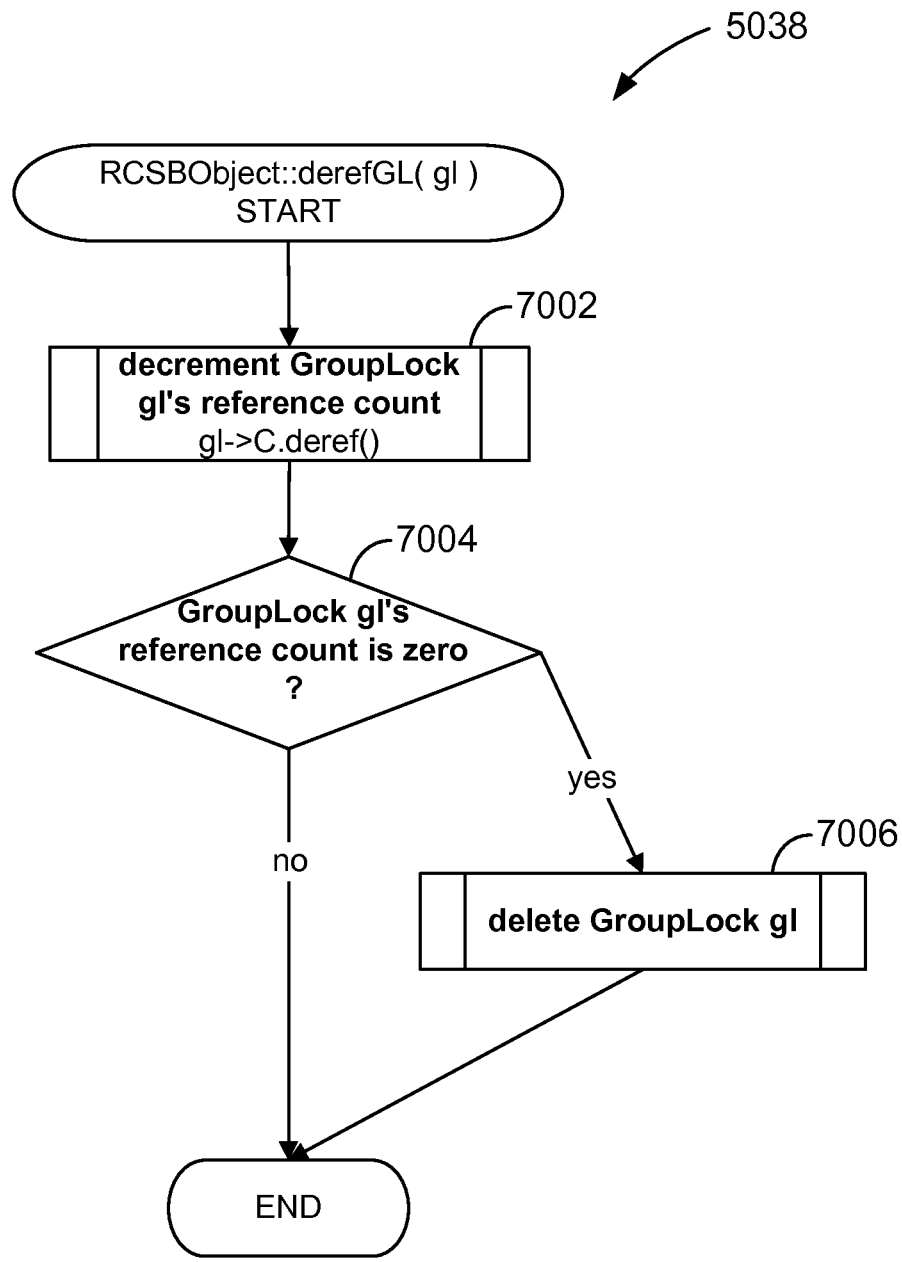
FIG. 70 is a flow chart of the "dereference group lock" function of the RCSB object.

FIG. 70 is a flow chart of the "dereference group lock" function 5038 of the RCSB object 5100. The steps 7002, 7004, and 7006 of the "dereference group lock" function 5038 are shown and described in FIG. 70.

Figure 71:
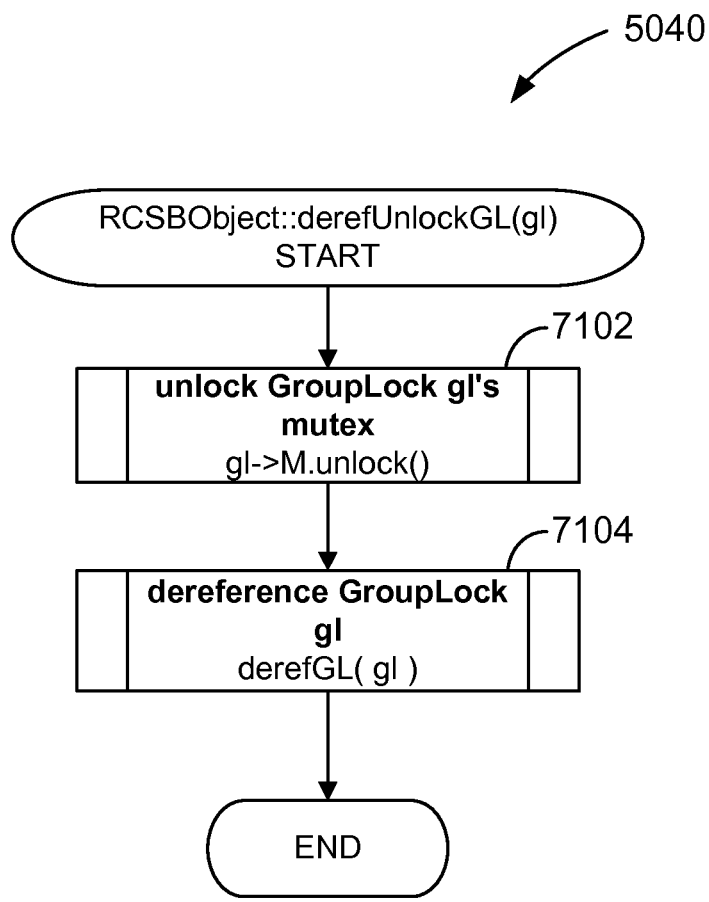
FIG. 71 is a flow chart of the "dereference and unlock group representative" function of the RCSB object.

FIG. 71 is a flow chart of the "dereference and unlock group representative" function 5040 of the RCSB object 5100. The steps 7102 and 7104 of the "dereference and unlock group representative" function 5040 are shown and described in FIG. 71.

Figure 72:
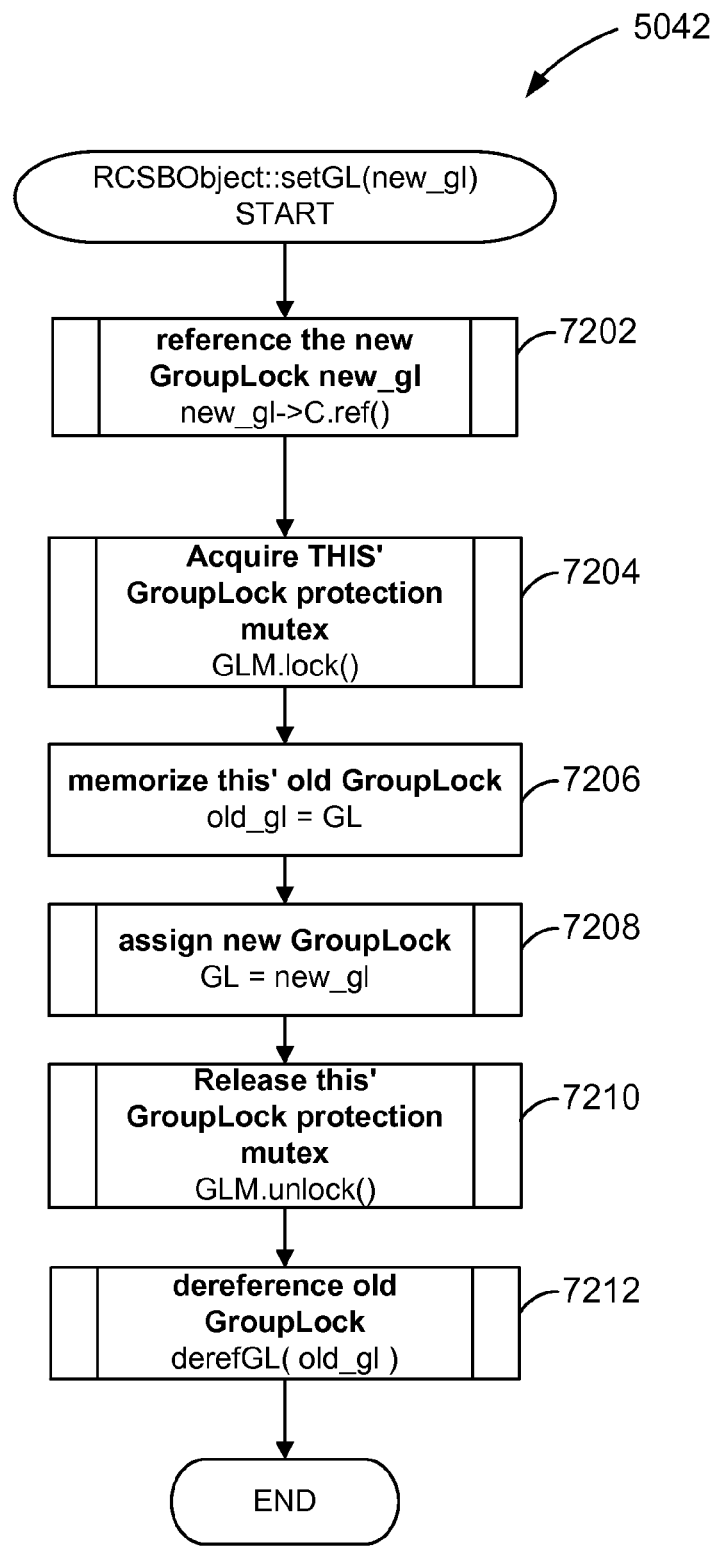
FIG. 72 is a flow chart of the "set group representative" function of the RCSB object.

FIG. 72 is a flow chart of the "set group representative" function 5042 of the RCSB object 5100. The steps 7202, 7204, 7206, 7208, 7210, and 7212 of the "set group representative" function 5042 are shown and described in FIG. 72.

Figure 73:
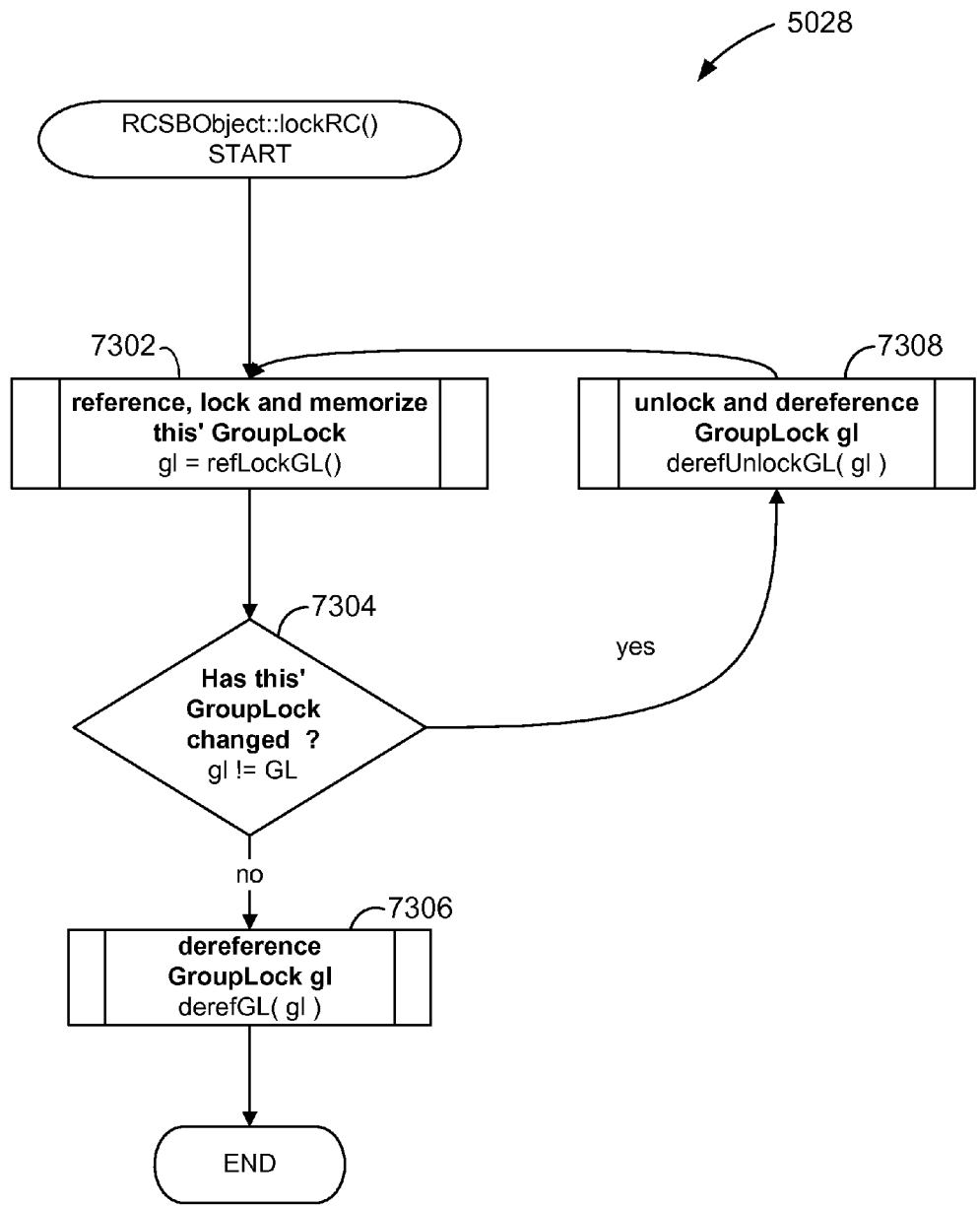
FIG. 73 is a flow chart of the "lock reference count" function of the RCSB object.

FIG. 73 is a flow chart of the "lock reference count" function 5028 of the RCSB object 5100. The steps 7302, 7304, 7306, and 7308 of the "lock reference count" function 5028 are shown and described in FIG. 73.

Figure 74:
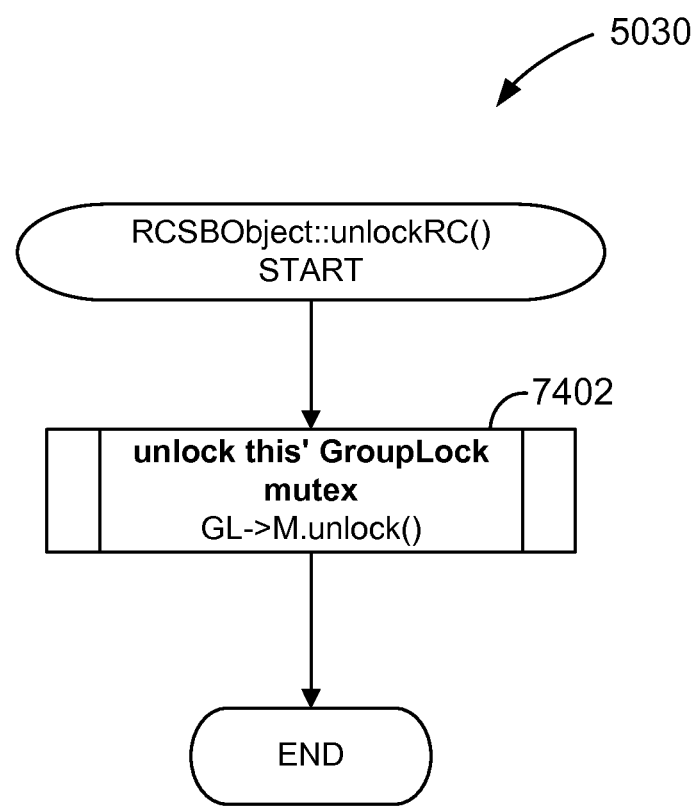
FIG. 74 is a flow chart of the "unlock reference count" function of the RCSB object.

FIG. 74 is a flow chart of the "unlock reference count" function 5030 of the RCSB object 5100. Step 7402 of the "unlock reference count" function 5030 is shown and described in FIG. 74. More specifically, step 7402 includes unlocking the mutex associated with the group representative object associated with the RCSB Object.

Figure 75:
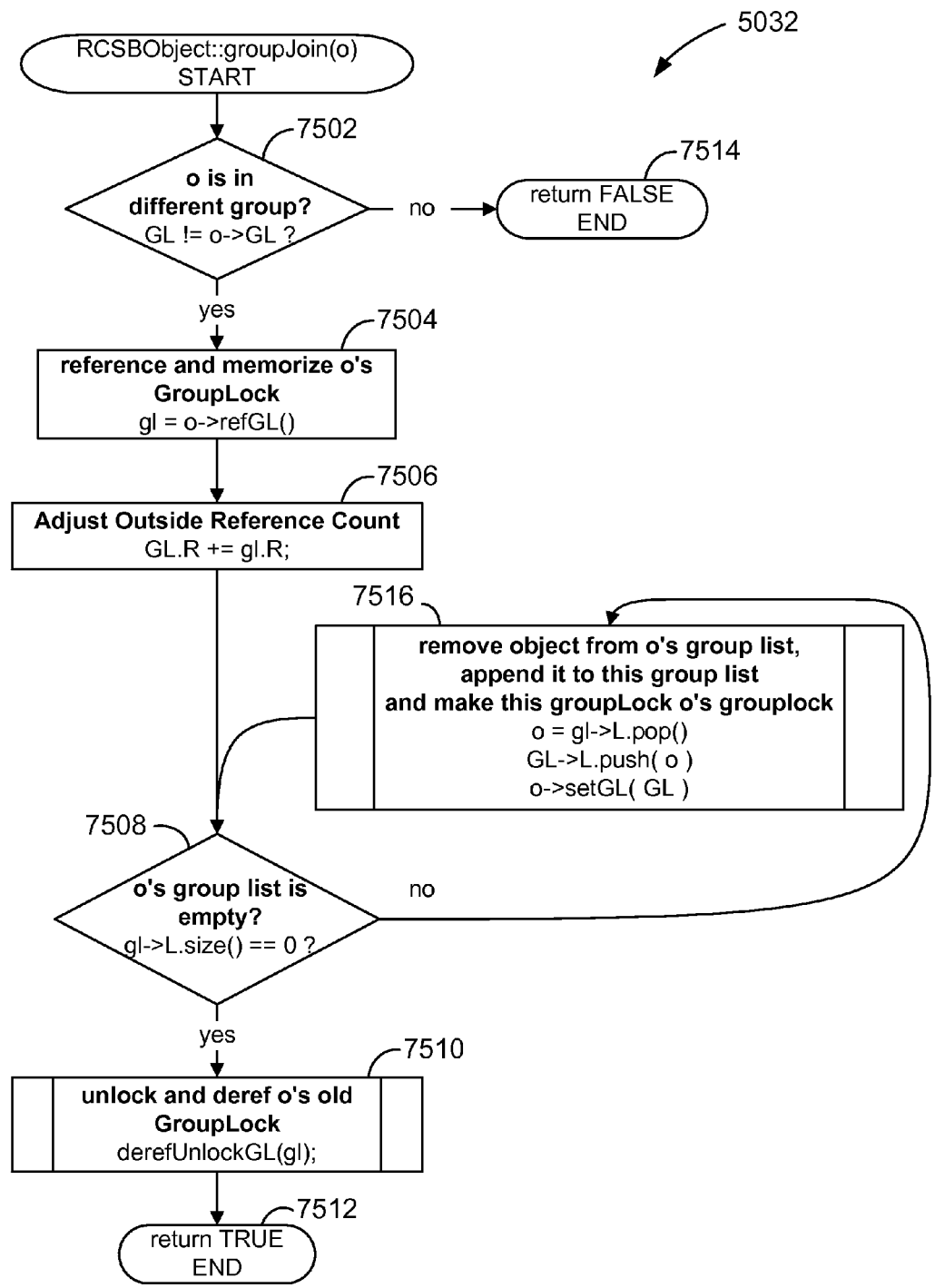
FIG. 75 is a flow chart of the "group join" function of the RCSB object.

FIG. 75 is a flow chart of the "group join" function 5032 of the RCSB object 5100. The steps 7502, 7504, 7506, 7508, 7510, 7512, 7514, and 7516 of the "group join" function 5032 are shown and described in FIG. 75.

Figure 76:
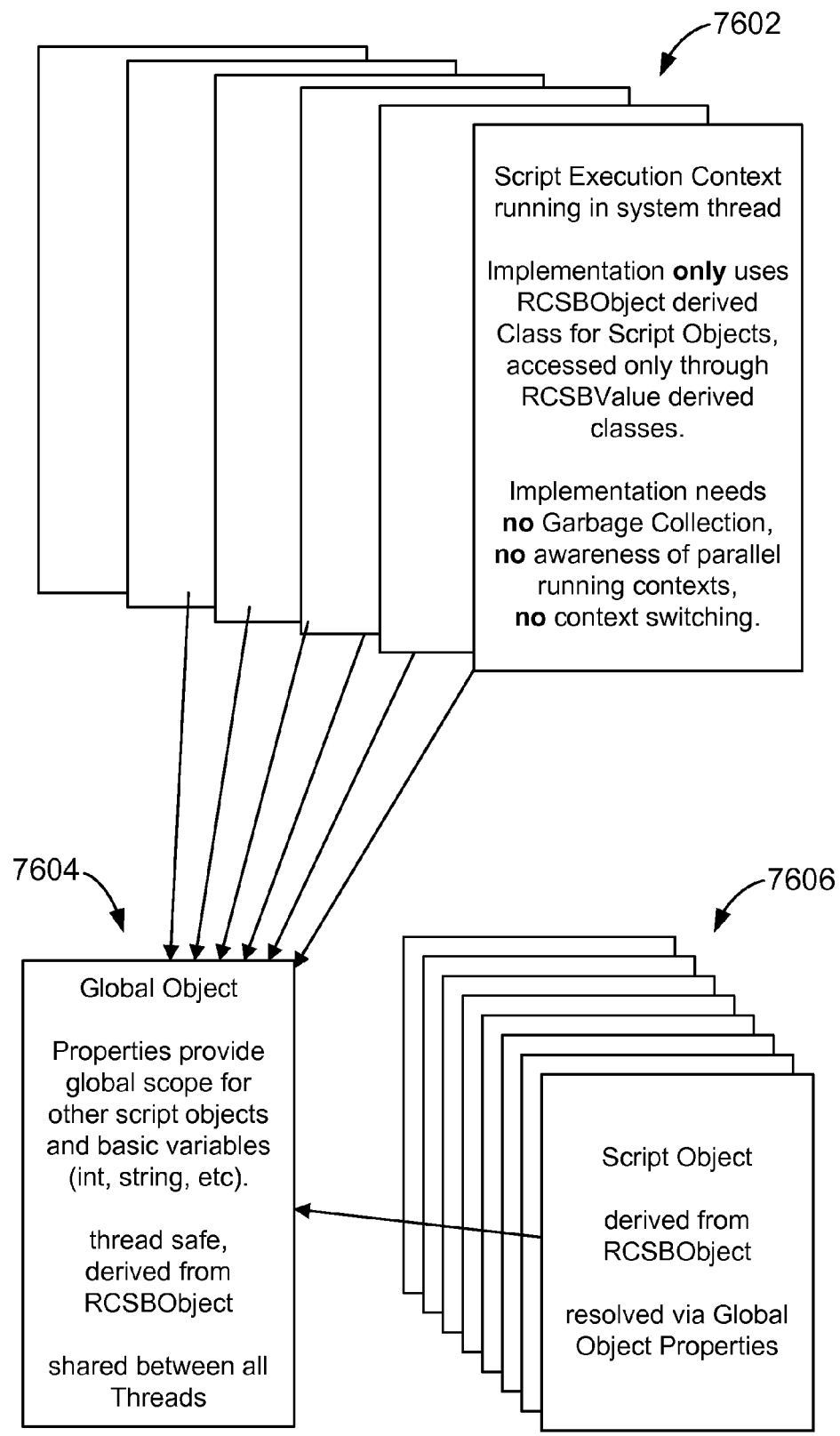
FIG. 76 is a block diagram showing a relationship between a script execution contexts, a global object, and script objects.

FIG. 76 is a block diagram showing a relationship between a script execution context, a global object, and script objects. The relationship is shown and described in FIG. 76. Using the systems and methods described herein, the need for a garbage collector is eliminated, and the script execution context need not include any processor-executable instructions specifically for managing multiple threads. That is, the script execution context has no awareness of parallel running contexts and does not manage context switching. In other words, multiple script execution contexts may execute in parallel, in separate system threads, with the thread safe script objects (e.g., objects that inherit from RCSB object 5000), described above, managing all issues pertaining to multiple threads, with objects derived from RCSBValue object 4900 being used to access the script objects that derive from the RCSB object 5000. The global object includes properties that provide global scope for other script objects and basic variables, including for example, integers and strings. A script object is resolved via properties of the global object. The global object is shared between all threads, and, given that it is derived from RCSB object 5000, the global object is thread safe.

Figure 77:
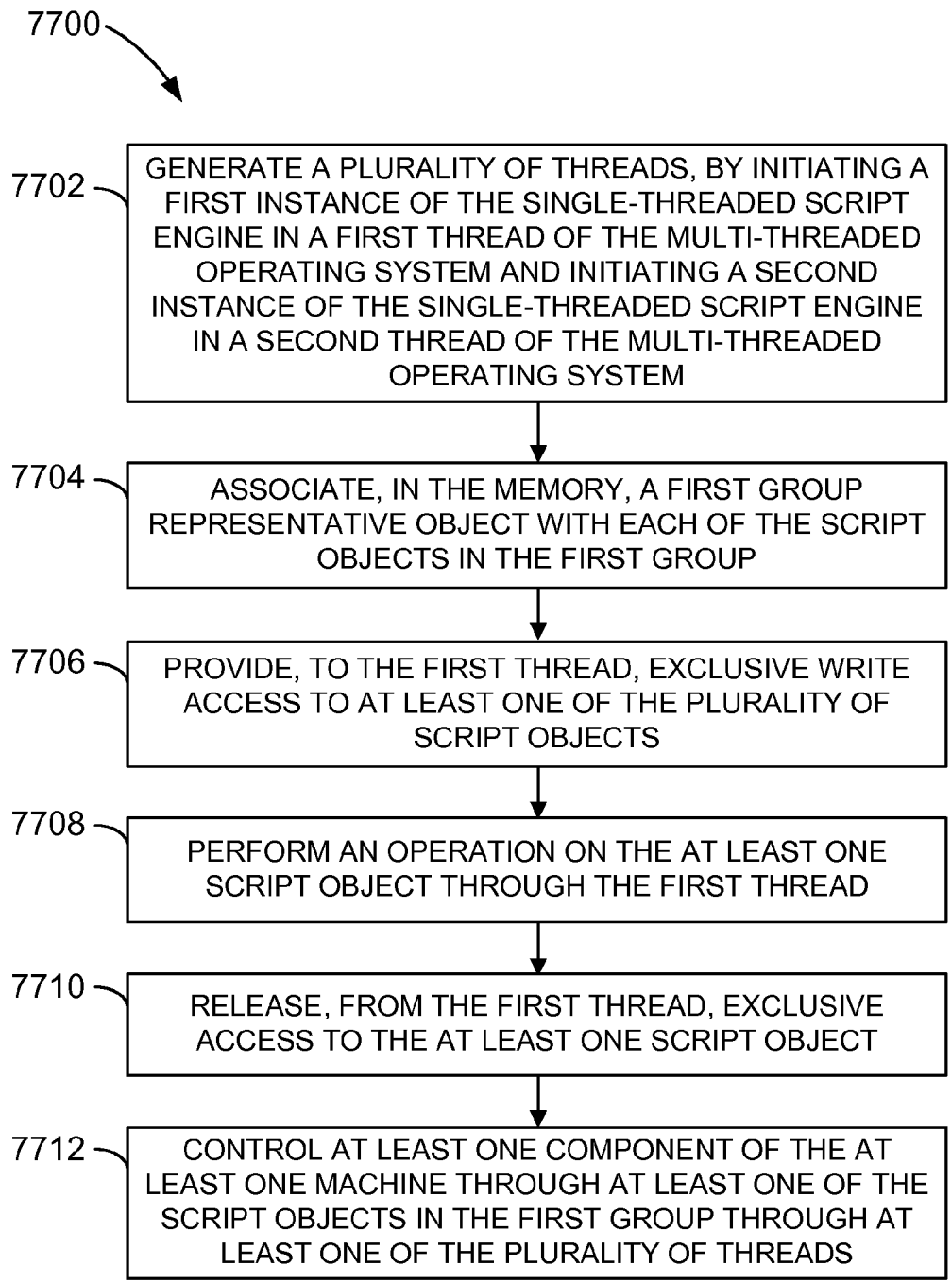
FIG. 77 is a flow chart of an example method that may be implemented by a control server.

FIG. 77 is a flow chart of an example method 7700 that may be implemented by a control server, for example control server 350, in accordance with the present disclosure. At step 7702, control server 350 generates a plurality of threads, by initiating a first instance of the single-threaded script engine in a first thread of the multi-threaded operating system executing on control server 350 and initiating a second instance of the single-threaded script engine in a second thread of the multi-threaded operating system. The single-threaded script engine is a set of processor-executable instructions stored in memory 510 of control server 350. At step 7704, control server 350 associates, in memory 510, a first group representative object 4800 with each of the script objects (e.g. objects derived from RCSB objects 5000 wherein at least one of them represents and provides access to at least one component of at least one machine) in a first group. At step 7706, control server 350 provides, to the first thread, exclusive write access to at least one of the plurality of the script objects. For example, control server 350 may execute the write lock function 2422 of WRTLock object 2400.

At step, 7708, control server 350 performs an operation, for example the group join function 3228, on the at least one script object through the first thread. At step 7710, control server 350 releases, from the first thread, exclusive access to the at least one script object. For example, control server 350 executes the unlock function 2418 of the WRTLock object 2400. At step 7712, control server 350 controls at least one component of the at least one machine through at least one of the script objects in the first group through at least one of the plurality of threads. For example, the script object (again, an object derived from RCSB object 5000) may be similar in functionality of control object 606 (FIG. 6) and may be used to raise or lower susceptor shaft 205 (FIG. 2) as discussed above.

Figure 78:
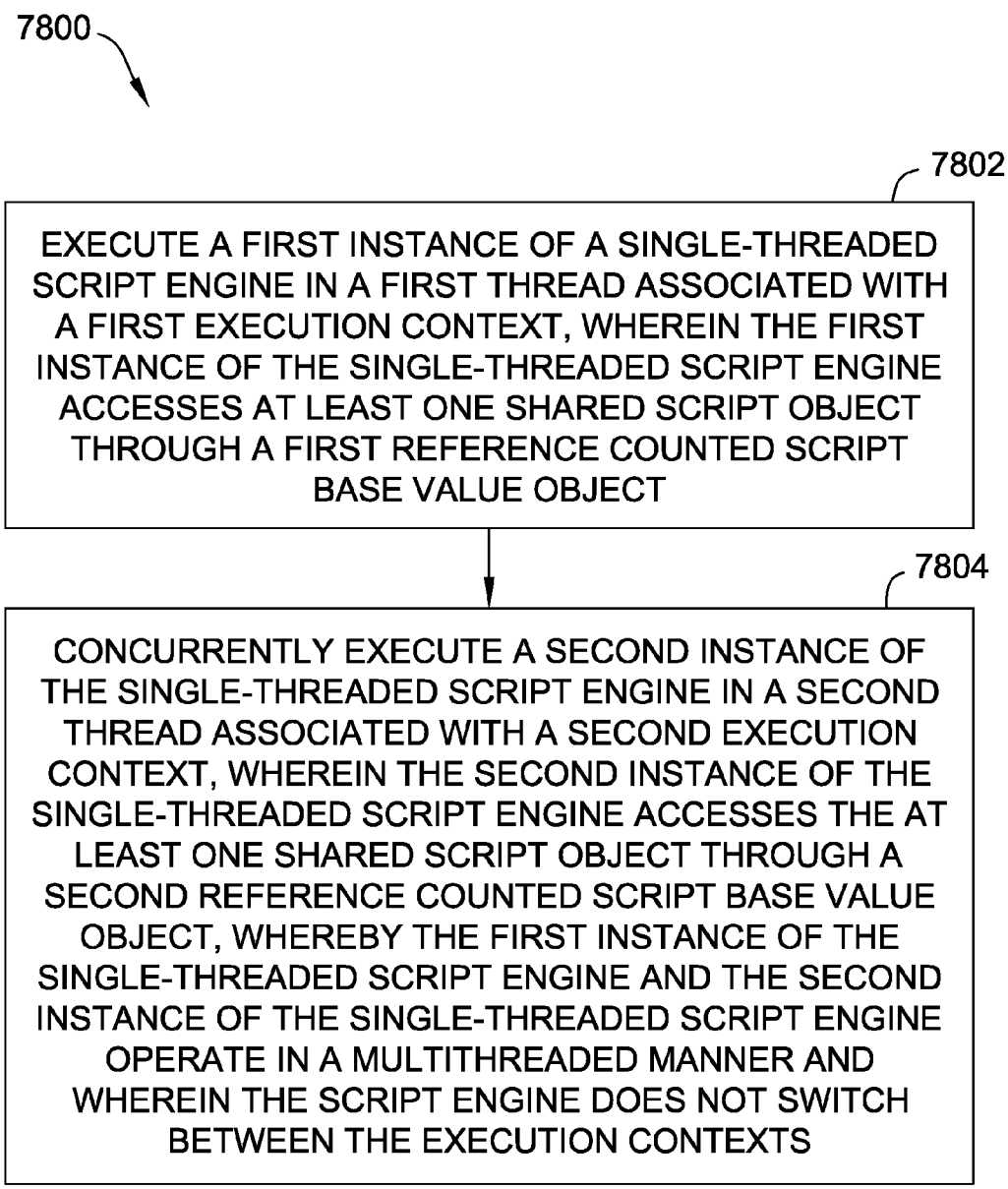
FIG. 78 is a flow chart of an example method that may be implemented by a control server.

FIG. 78 is a flow chart of an example method 7800 that may be implemented by a control server, for example control server 350, in accordance with the present disclosure. At step 7802, control server 350 executes a first instance of a single-threaded script engine in a first thread associated with a first execution context, wherein the first instance of the single-threaded script engine accesses at least one shared script object through a first reference counted script base value object. At step 7804, control server 350 concurrently executes a second instance of the single-threaded script engine in a second thread associated with a second execution context, wherein the second instance of the single-threaded script engine accesses the at least one shared script object through a second reference counted script base value object, whereby the first instance of the single-threaded script engine and the second instance of the single-threaded script engine operate in a multithreaded manner and wherein the script engine does not switch between the execution contexts.

In some implementations, the at least one shared script object includes a reference counted script base object having at least one property and at least one thread-safe method for accessing the at least one property. In some implementations, the at least one shared script object is a reference counted script base object having a first property and a first thread-safe set method for setting a value of the first property, and control server 350 is configured to set the value of the first property by executing the first thread-safe set method using at least one of the first instance of the single-threaded script engine and the second instance of the single-threaded script engine. In some implementations, the at least one shared script object is a reference counted script base object having a first property and a first thread-safe get method for getting a value of the first property, and control server 350 is configured to get the value of the first property by executing the first get method using at least one of the first instance of the single-threaded script engine within the first execution context and the second instance of the single-threaded script engine within the second execution context.

In some implementations, control server 350 is coupled to a memory device and control server 350 is further configured to determine a number of outside references to the at least one shared script object and release the at least one shared script object from the memory device if the number of outside references to the at least one shared script object is zero. In some implementations, properties of the at least one shared script object reference a plurality of shared script objects and control server 350 is configured to detect a reference loop among the plurality of shared script objects. In some implementations, control server 350 is coupled to at least one component of at least one machine and control server 350 is configured to control the at least one component with the first instance of the script engine and the second instance of the script engine using the at least one shared script object.

A technical effect of systems and methods described herein includes at least one of: (a) executing a first instance of a single-threaded script engine in a first thread associated with a first execution context, wherein the first instance of the single-threaded script engine accesses at least one shared script object through a first reference counted script base value object; and (b) concurrently execute a second instance of the single-threaded script engine in a second thread associated with a second execution context, wherein the second instance of the single-threaded script engine accesses the at least one shared script object through a second reference counted script base value object, wherein the script engine does not switch between the execution contexts.

Locking Groups of Control Objects—Aspects

In a first aspect, a method for managing access to at least one control object in a memory of a computing device configured to control at least one machine is provided. The at least one control object is organized in a first group and each control object provides access to a component of the at least one machine. The method includes associating, in the memory, a first group representative object with each control object in the first group. The first group representative object has an exclusive access indicator. The method further includes providing exclusive access to every control object in the first group and changing the exclusive access indicator of the first group representative object to indicate that exclusive access is being provided. The method further includes controlling, using the computing device, at least one component of the at least one machine through the at least one control object in the first group.

In a second aspect, the method of the first aspect is provided, further comprising determining, using the computing device, whether exclusive access to the at least one control object in the first group is permitted by determining whether the exclusive access indicator of the first group representative object indicates that exclusive access is being provided, wherein if the exclusive access indicator indicates that exclusive access is being provided, exclusive access to the at least one control object in the first group is not permitted and if the exclusive access indicator indicates that exclusive access is not being provided, exclusive access to the at least one control object in the first group is permitted.

In a third aspect, the method of the first aspect is provided, further comprising releasing exclusive access to every control object in the first group and changing the exclusive access indicator of the first group representative object to indicate that exclusive access is not being provided.

In a fourth aspect, the method of the first aspect is provided, further comprising: maintaining, in the memory, a reference count of the number of control objects in the first group; adding an additional control object to the first group; and incrementing the reference count.

In a fifth aspect, the method of the first aspect is provided, further comprising moving at least one control object from a second group to the first group by: associating, in the memory, the first group representative object with the at least one control object from the second group; and disassociating, in the memory, a second group representative object from the at least one control object from the second group.

In a sixth aspect, the method of the fifth aspect is provided, wherein the second group representative object has an exclusive access indicator and the method further comprises, before the associating and disassociating steps: changing the exclusive access indicator of the first group representative object to indicate that exclusive access is being provided to the first group; and changing the exclusive access indicator of the second group representative object to indicate that exclusive access is being provided to the second group.

In a seventh aspect, the method of the method of the first aspect is provided, further comprising moving at least one control object from a second group to the first group by changing the exclusive access indicator of the first group representative object to indicate that exclusive access is being provided to the first group; changing an exclusive access indicator of a second group representative object to indicate that exclusive access is being provided to the second group; moving at least one control object from the second group to the first group; changing the exclusive access indicator of the second group representative object to indicate that exclusive access is not being provided to the second group; and changing the exclusive access indicator of the first group representative object to indicate that exclusive access is not being provided to the first group, wherein the first group representative object has a first numeric address in the memory, the second group representative object has a second numeric address in the memory, and the first address is less than the second address.

In an eighth aspect, the method of the first aspect is provided, further comprising maintaining, in the memory, a reference count of the number of control objects in the first group; and removing the first group representative object from the memory if the reference count equals zero.

In a ninth aspect the method of the first aspect is provided, wherein providing exclusive access to all of the control objects in the first group comprises providing exclusive access to a first thread of a plurality of threads being executed by the computing device.

In tenth aspect, a system for managing access to at least one control object in a memory of a computing device configured to control at least one machine is provided. The at least one control object is organized in a first group and each control object provides access to a component of the at least one machine. The system includes the computing device, which includes the memory and a processor coupled to the memory. The memory contains processor-executable instructions that, when executed by the processor, cause the computing device to perform the steps of associating, in the memory, a first group representative object with each of the control object in the first group, the first group representative object having an exclusive access indicator and providing exclusive access to every control object in the first group and changing the exclusive access indicator of the first group representative object to indicate that exclusive access is being provided. The processor-executable instructions further cause the computing device to perform the step of controlling at least one component of the at least one machine through the at least one control object in the first group.

In an eleventh aspect, the system of the tenth aspect is provided, wherein the processor-executable instructions further cause said computing device to perform the step of: determining whether exclusive access to the at least one control object in the first group is permitted by determining whether the exclusive access indicator of the first group representative object indicates that exclusive access is being provided, wherein if the exclusive access indicator indicates that exclusive access is being provided, exclusive access to the at least one control object in the first group is not permitted and if the exclusive access indicator indicates that exclusive access is not being provided, exclusive access to the at least one control object in the first group is permitted.

In a twelfth aspect, the system of the tenth aspect is provided, wherein the processor-executable instructions further cause said computing device to perform the steps of: releasing exclusive access to every control object in the first group and changing the exclusive access indicator of the first group representative object to indicate that exclusive access is not being provided.

In a thirteenth aspect, the system of the tenth aspect is provided, wherein the processor-executable instructions further cause said computing device to perform the steps of: maintaining, in the memory, a reference count of the number of control objects in the first group; adding an additional control object to the first group; and incrementing the reference count.

In a fourteenth aspect, the system of the tenth aspect is provided, wherein the processor-executable instructions further cause said computing device to perform the steps of moving at least one control object from a second group to the first group by: associating, in said memory, the first group representative object with the at least one control object from the second group; and disassociating, in said memory, a second group representative object from the at least one control object from the second group.

In a fifteenth aspect, the system of the fourteenth aspect is provided, wherein said memory further contains processor-executable instructions such that the second group representative object has an exclusive access indicator and the processor-executable instructions further cause the computing device to, before the associating and disassociating steps, perform the steps of: changing the exclusive access indicator of the first group representative object to indicate that exclusive access is being provided to the first group; and changing the exclusive access indicator of the second group representative object to indicate that exclusive access is being provided to the second group.

In a sixteenth aspect, the system of the tenth aspect is provided, wherein the processor-executable instructions further cause said computing device to move at least one control object from a second group to the first group by: changing the exclusive access indicator of the first group representative object to indicate that exclusive access is being provided to the first group; changing an exclusive access indicator of a second group representative object to indicate that exclusive access is being provided to the second group; moving at least one control object from the second group to the first group; changing the exclusive access indicator of the second group representative object to indicate that exclusive access is not being provided to the second group; and changing the exclusive access indicator of the first group representative object to indicate that exclusive access is not being provided to the first group, wherein the first group representative object has a first numeric address in said memory, the second group representative object has a second numeric address in said memory, and the first address is less than the second address.

In a seventeenth aspect, the system of the tenth aspect is provided, wherein the processor-executable instructions further cause said computing device to perform the step of: maintaining, in said memory, a reference count of the number of control objects in the first group; and removing the first group representative object from said memory if the reference count equals zero.

In an eighteenth aspect, the system of the tenth aspect is provided, wherein said memory further comprises processor-executable instructions such that providing exclusive access to every control object in the first group comprises providing exclusive access to a first thread of a plurality of threads being executed by said computing device.

In a nineteenth aspect, a computer-readable storage device is provided. The computer-readable storage device has processor-executable instructions embodied thereon for managing access to at least one control object in a memory of a computing device configured to control at least one machine. The at least one control object is organized in a first group and each control object provides access to a component of the at least one machine. When executed by at least one processor coupled to the memory in the computing device, the processor-executable instructions cause the computing device to perform the steps of associating, in the memory, a first group representative object with each control object in the first group, the first group representative object having an exclusive access indicator and providing exclusive access to every control object in the first group and changing the exclusive access indicator of the first group representative object to indicate that exclusive access is being provided. The processor-executable instructions further cause the computing device to perform the step of controlling at least one component of the at least one machine through the at least one control object in the first group.

In a twentieth aspect, the computer-readable storage device of the nineteenth aspect is provided, wherein the processor-executable instructions further cause the computing device to perform the step of determining whether exclusive access to the at least one control object in the first group is permitted by determining whether the exclusive access indicator of the first group representative object indicates that exclusive access is being provided, wherein if the exclusive access indicator indicates that exclusive access is being provided, exclusive access to the at least one control object in the first group is not permitted and if the exclusive access indicator indicates that exclusive access is not being provided, exclusive access to the at least one control object in the first group is permitted.

Managing read and write access to shared resources—Aspects

In a first aspect, a method for managing access among a plurality of threads to at least one control object is provided. The plurality of threads are executed by a processor in a computing device configured to control at least one machine. The at least one control object is included in a memory coupled to the processor of the computing device and allows at least one thread of the plurality of threads to interact with at least one component of the at least one machine. The method includes providing to a first thread of the plurality of threads exclusive write access to the at least one control object and issuing an instruction from the first thread to the at least one control object. The method further includes controlling, by the computing device, the at least one component of the at least one machine as a result of the instruction issued by the first thread. The method further includes transitioning the exclusive write access to read access such that no other thread of the plurality of threads may obtain exclusive write access to the at least one control object during the transition.

In a second aspect, the method of the first aspect is provided, further comprising storing, in the memory, a count of threads in the plurality of threads requesting read access to the at least one control object.

In a third aspect, the method of the first aspect is provided, further comprising storing, in the memory, a count of threads in the plurality of threads requesting exclusive write access to the at least one control object.

In a fourth aspect, the method of the first aspect is provided, further comprising: determining if no thread in the plurality of threads has exclusive write access to the at least one control object; and upon determining that no thread in the plurality of threads has exclusive write access to the at least one control object, providing to at least one thread of the plurality of threads read access to the at least one control object.

In a fifth aspect, the method of the fourth aspect is provided, further comprising storing, in the memory, a count of how many threads in the plurality threads are being provided with read access to the at least one control object.

In a sixth aspect, the method of the first aspect is provided, further comprising reading data from the at least one control object by the first thread and at least one other thread of the plurality of threads after transitioning the exclusive write access to read access.

In a seventh aspect, the method of the first aspect is provided, wherein issuing an instruction from the first thread to the at least one control object comprises issuing an instruction from the first thread to control a component of an epitaxial reactor or a crystal puller.

In an eighth aspect, a system for managing access among a plurality of threads to at least one control object is provided. The plurality of threads are executed by a processor in a computing device configured to control at least one machine. The at least one control object is included in a memory of the computing device and allows at least one thread of the plurality of threads to interact with at least one component of the at least one machine. The system includes the computing device, including the memory and the processor. The processor is coupled to the memory. The memory includes processor-executable instructions that, when executed by the processor, cause the computing device to perform the steps of providing to a first thread of the plurality of threads, exclusive write access to the at least one control object and issuing an instruction from the first thread to the at least one control object. The processor-executable instructions further cause the computing device to perform the steps of controlling the at least one component of the at least one machine as a result of the instruction issued by the first thread and transitioning the exclusive write access to read access such that no other thread of the plurality of threads may obtain exclusive write access to the at least one control object during the transition.

In a ninth aspect, the system of the eighth aspect is provided, wherein the processor-executable instructions further cause said computing device to perform the step of storing, in said memory, a count of threads in the plurality of threads requesting read access to the at least one control object.

In a tenth aspect, the system of the eighth aspect is provided, wherein the processor-executable instructions further cause said computing device to perform the step of storing, in said memory, a count of threads in the plurality of threads requesting exclusive write access to the at least one control object.

In an eleventh aspect, the system of the eighth aspect is provided, wherein the processor-executable instructions further cause said computing device to perform the steps of: determining if no thread in the plurality of threads has exclusive write access to the at least one control object; and upon determining that no thread in the plurality of threads has exclusive write access to the at least one control object, providing to at least one thread of the plurality of threads read access to the at least one control object.

In a twelfth aspect, the system of the eleventh aspect is provided, wherein the processor-executable instructions further cause said computing device to perform the step of storing, in said memory, a count of how many threads in the plurality threads are being provided with read access to the at least one control object.

In a thirteenth aspect, the system of the eighth aspect is provided, wherein the processor-executable instructions further cause said computing device to perform the step of reading data from the at least one control object by the first thread and at least one other thread of the plurality of threads after transitioning the exclusive write access to read access.

In a fourteenth aspect, the system of the eighth aspect is provided, wherein said memory further includes processor-executable instructions such that issuing an instruction from the first thread to the at least one control object comprises issuing an instruction from the first thread to control a component of an epitaxial reactor or a crystal puller.

In a fifteenth aspect, a computer-readable storage device having processor-executable instructions embodied thereon for managing access among a plurality of threads to at least one control object is provided. The plurality of threads are executed by a processor in a computing device configured to control at least one machine. The at least one control object is included in a memory coupled to the processor of the computing device and allows at least one thread of the plurality of threads to interact with at least one component of the at least one machine. When executed by the processor, the processor-executable instructions cause the computing device to perform the steps of providing to a first thread of the plurality of threads, exclusive write access to the at least one control object and issuing an instruction from the first thread to the at least one control object. The processor-executable instructions further cause the computing device to perform the steps of controlling the at least one component of the at least one machine as a result of the instruction issued by the first thread and transitioning the exclusive write access to read access such that no other thread of the plurality of threads may obtain exclusive write access to the at least one control object during the transition.

In a sixteenth aspect, the computer-readable storage device of the fifteenth aspect is provided, wherein the processor-executable instructions further cause the computing device to perform the step of storing, in the memory, a count of threads in the plurality of threads requesting read access to the at least one control object.

In a seventeenth aspect, the computer-readable storage device of the sixteenth aspect is provided, wherein the processor-executable instructions further cause the computing device to perform the step of storing, in the memory, a count of threads in the plurality of threads requesting exclusive write access to the at least one control object.

In an eighteenth aspect, the computer-readable storage device of the sixteenth aspect is provided, wherein the processor-executable instructions further cause the computing device to perform the steps of: determining if no thread in the plurality of threads has exclusive write access to the at least one control object; and upon determining that no thread in the plurality of threads has exclusive write access to the at least one control object, providing to at least one thread of the plurality of threads read access to the at least one control object.

In a nineteenth aspect, the computer-readable storage device of the eighteenth aspect is provided, wherein the processor-executable instructions further cause the computing device to perform the step of storing, in the memory, a count of how many threads in the plurality threads are being provided with read access to the at least one control object.

In a twentieth aspect, the computer-readable storage device of the eighteenth aspect is provided, wherein the processor-executable instructions further cause the computing device to perform the step of reading data from the at least one control object by the first thread and at least one other thread of the plurality of threads after transitioning the exclusive write access to read access.

Scalable and Deterministic Counting of Arbitrarily Interlinked Control Objects—Aspects In a first aspect, a method is provided. The method is for counting references to a plurality of control objects in a memory of a computing device that is executing a plurality of threads and is configured to control at least one component of at least one machine. Each control object provides access to a component of the at least one machine and each control object is configured to maintain a set of references to other control objects of the plurality of control objects. The method includes: for a first control object of the plurality of control objects: providing a first thread of the plurality of threads exclusive write access to the set of references maintained by the first control object; adding a reference to a second control object to the set of references maintained by the first control object; while continuing to provide access to the first thread, changing from exclusive write access to read access; determining the number of reference loops within the set of references maintained by the first control object; and controlling, by the computing device, at least one component of the at least one machine through at least one control object of the plurality of control objects.

In a second aspect, the method of the first aspect is provided, wherein determining the number of reference loops, if any, within the set of references maintained by the first control object further comprises performing a depth-first search of the set of references maintained by the first control object.

In a third aspect, the method of the first aspect is provided, further comprising: associating, in the memory, the first control object with a group representative object; and maintaining, as a property of the group representative object, an outside reference count, wherein the outside reference count represents a total number of references to control objects, of the plurality of control objects, that are associated with the group representative object.

In a fourth aspect, the method of the first aspect is provided, further comprising storing as property of the first control object, a reference count of how many other control objects of the plurality of control objects or threads of the plurality of threads reference the first control object.

In a fifth aspect, the method of the first aspect is provided, further comprising: storing, in the memory, a total reference count for the first control object as a property of the first control object, wherein the total reference count represents how many other control objects of the plurality of control objects and threads of the plurality of threads reference the first control object; and storing, in the memory, an in-loop reference count for the first control object, wherein the in-loop reference count represents how many control objects associated with the group representative reference the first control object.

In a sixth aspect, the method of the third aspect is provided, wherein determining the number of reference loops within the set of references maintained by the first control object further comprises updating the outside reference count on the group representative object.

In a seventh aspect, the method of the third aspect is provided, further comprising: updating the outside reference count; and when the outside reference count is zero, removing, from the memory, the group representative object and every control object associated with the group representative object.

In an eighth aspect, a system is provided. The system is for counting references to a plurality of control objects in a memory of a computing device that is executing a plurality of threads and is configured to control at least one component of at least one machine. Each control object provides access to a component of the at least one machine and each control object is configured to maintain a set of references to other control objects of the plurality of control objects. The system includes the computing device, including the memory and a processor coupled to the memory. The memory contains processor-executable instructions that, when executed by the processor, cause the computing device to perform the steps of: for a first control object of the plurality of control objects: providing a first thread of the plurality of threads exclusive write access to the set of references maintained by the first control object; adding a reference to a second control object to the set of references maintained by the first control object; while continuing to provide the access to the first thread, changing from exclusive write access to read access; determining the number of reference loops within the set of references maintained by the first control object; and controlling, by the computing device, at least one component of the at least one machine through at least one control object of the plurality of control objects.

In a ninth aspect, the system of the eighth aspect is provided, wherein said memory further contains processor-executable instructions such that determining the number of reference loops within the set of references maintained by the first control object further comprises performing a depth-first search of the set of references maintained by the first control object.

In a tenth aspect, the system of the eighth aspect is provided, wherein the processor-executable instructions further cause said computing device to perform the steps of: associating, in the memory, the first control object with a group representative object; and maintaining, as a property of the group representative object, an outside reference count, wherein the outside reference count represents a total number of references to control objects, of the plurality of control objects, that are associated with the group representative object.

In an eleventh aspect, the system of the eighth aspect is provided, wherein the processor-executable instructions further cause said computing device to perform the step of storing as a property of the first object, a reference count of how many other control objects of the plurality of control objects or threads of the plurality of threads reference the first control object.

In a twelfth aspect, the system of the eighth aspect is provided, wherein the processor-executable instructions further cause said computing device to perform the step of: storing, in the memory, an in-loop reference count for the first control object, wherein the in-loop reference count represents how many control objects associated with the group representative are referenced by the first control object.

In a thirteenth aspect, the system of the tenth aspect is provided, wherein the memory further contains processor-executable instructions such that determining the number of reference loops within the set of references maintained by the first control object further comprises updating the outside reference count on the group representative object.

In a fourteenth aspect, the system of the tenth aspect is provided, wherein the processor-executable instructions further cause said computing device to perform the steps of: updating the outside reference count; and when the outside reference count is zero: removing, from the memory, the group representative object and every control object associated with the group representative object.

In a fifteenth aspect, a computer-readable storage device is provided. The computer-readable storage device includes processor-executable instructions embodied thereon for counting references to a plurality of control objects in a memory of a computing device that is executing a plurality of threads and is configured to control at least one component of at least one machine. Each control object provides access to a component of the at least one machine and each control object is configured to maintain a set of references to other control objects of the plurality of control objects. When executed by at least one processor coupled to the memory in the computing device, the processor-executable instructions cause the computing device to perform the steps of: for a first control object of the plurality of control objects: providing a first thread of the plurality of threads exclusive write access to the set of references maintained by the first control object; adding a reference to a second control object to the set of references maintained by the first control object; while continuing to provide the access to the first thread, changing from exclusive write access to read access; determining the number of reference loops within the set of references maintained by the first control object; and controlling, by the computing device, at least one component of the at least one machine through at least one control object of the plurality of control objects.

In a sixteenth aspect, the computer-readable storage device of the fifteenth aspect is provided, further comprising processor-executable instructions such that determining the number of reference loops within the set of references maintained by the first control object further comprises performing a depth-first search of the set of references maintained by the first control object.

In a seventeenth aspect, the computer-readable storage device of the fifteenth aspect is provided, wherein the processor-executable instructions further cause the computing device to perform the steps of: associating, in the memory, the first control object with a group representative object; and maintaining, as a property of the group representative object, an outside reference count, wherein the outside reference count represents a total number of references to control objects of the plurality of control objects, that are associated with the group representative object.

In an eighteenth aspect, the computer-readable storage device of the fifteenth aspect is provided, wherein the processor-executable instructions further cause the computing device to perform the step of storing as a property of the first control object, a reference count of how many other control objects of the plurality of control objects or threads of the plurality of threads reference the first control object.

In a nineteenth aspect, the computer-readable storage device of the fifteenth aspect is provided, wherein the processor-executable instructions further cause the computing device to perform the step of: storing, in the memory, an in-loop reference count for the first control object, wherein the in-loop reference count represents how many control objects associated with the group representative reference the first control object.

In a twentieth aspect, the computer-readable storage device of the seventeenth aspect is provided, further comprising processor-executable instructions such that determining the number of reference loops within the set of references maintained by the first control object further comprises updating the outside reference count on the group representative object.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for enabling multiple instances of a single-threaded script engine to operate concurrently, the method comprising:
executing, by a computing device, a first instance of a single-threaded script engine in a first thread associated with a first execution context, wherein the first instance of the single-threaded script engine accesses at least one shared script object through a first reference counted script base value object; and
concurrently executing, by the computing device, a second instance of the single-threaded script engine in a second thread associated with a second execution context, wherein the second instance of the single-threaded script engine accesses the at least one shared script object through a second reference counted script base value object, wherein the script engine does not switch between the execution contexts.

2. The method of claim 1, wherein the at least one shared script object is a reference counted script base object having a first property and a first thread-safe set method for setting a value of the first property, and wherein said method further comprises setting the value of the first property by executing the first thread-safe set method using at least one of the first instance of the single-threaded script engine and the second instance of the single-threaded script engine.

3. The method of claim 1, wherein the at least one shared script object is a reference counted script base object having a first property and a first thread-safe get method for getting a value of the first property, and wherein said method further comprises getting the value of the first property by executing the first get method using at least one of the first instance of the single-threaded script engine within the first execution context and the second instance of the single-threaded script engine within the second execution context.

4. The method of claim 1, wherein the computing device is coupled to a memory device, and wherein said method further comprises determining a number of outside references to the at least one shared script object and releasing the at least one shared script object from the memory device if the number of outside references to the at least one shared script object is zero.

5. The method of claim 1, wherein properties of the at least one shared script object reference a plurality of shared script objects and wherein said method further comprises detecting a reference loop among the plurality of shared script objects.

6. The method of claim 1, wherein the computing device is coupled to at least one component of at least one machine and wherein said method further comprises controlling the at least one component with the first instance of the script engine and the second instance of the script engine using the at least one shared script object.

7. A non-transitory computer-readable storage device having processor-executable instructions embodied thereon wherein, when executed by a computing device having a processor, the computer-executable instructions cause the computing device to:

execute a first instance of a single-threaded script engine in a first thread associated with a first execution context, wherein the first instance of the single-threaded script engine accesses at least one shared script object through a first reference counted script base value object; and concurrently execute a second instance of the single-threaded script engine in a second thread associated with a second execution context, wherein the second instance of the single-threaded script engine accesses the at least one shared script object through a second reference counted script base value object, wherein the script engine does not switch between the execution contexts.

8. The non-transitory computer-readable storage device of claim 7, further comprising computer-executable instructions such that the at least one shared script object is a reference counted script base object having at least one property and at least one thread-safe method for accessing the at least one property.

9. The non-transitory computer-readable storage device of claim 7, further comprising computer-executable instructions such that the at least one shared script object is a reference counted script base object having a first property and a first thread-safe set method for setting a value of the first property, and said computer-executable instructions further cause the computing device to set the value of the first property by executing the first thread-safe set method using at least one of the first instance of the single-threaded script engine and the second instance of the single-threaded script engine.

10. The non-transitory computer-readable storage device of claim 7, further comprising computer-executable instructions such that the at least one shared script object is a reference counted script base object having a first property and a first thread-safe get method for getting a value of the first property, and said computer-executable instructions further cause the computing device to get the value of the first property by executing the first get method using at least one of the first instance of the single-threaded script engine within the first execution context and the second instance of the single-threaded script engine within the second execution context.

11. The non-transitory computer-readable storage device of claim 7, wherein the computing device is coupled to a memory device and wherein said computer-executable instructions further cause the computing device to determine a number of outside references to the at least one shared script object and release the at least one shared script object from the memory device if the number of outside references to the at least one shared script object is zero.

12. The non-transitory computer-readable storage device of claim 7, further comprising computer-executable instructions such that properties of the at least one shared script object reference a plurality of shared script objects and wherein said computer-readable instructions further cause the computing device to detect a reference loop among the plurality of shared script objects.

13. The non-transitory computer-readable storage device of claim 7, wherein the computing device is coupled to at least one component of at least one machine and wherein said computer-executable instructions further cause the computing device to control the at least one component with the first instance of the script engine and the second instance of the script engine using the at least one shared script object.

14. A computing device having executable instructions stored in a memory configured to:

execute a first instance of a single-threaded script engine in a first thread associated with a first execution context, wherein the first instance of the single-threaded script engine accesses at least one shared script object through a first reference counted script base value object; and concurrently execute a second instance of the single-threaded script engine in a second thread associated with a second execution context, wherein the second instance of the single-threaded script engine accesses the at least one shared script object through a second reference counted script base value object, wherein the script engine does not switch between the execution contexts.

15. The computing device of claim 14, wherein the at least one shared script object includes a reference counted script base object having at least one property and at least one thread-safe method for accessing the at least one property.

16. The computing device of claim 14, wherein the at least one shared script object is a reference counted script base object having a first property and a first thread-safe set method for setting a value of the first property, wherein said computing device is configured to set the value of the first property by executing the first thread-safe set method using at least one of the first instance of the single-threaded script engine and the second instance of the single-threaded script engine.

17. The computing device of claim 14, wherein the at least one shared script object is a reference counted script base object having a first property and a first thread-safe get method for getting a value of the first property, wherein said computing device is configured to get the value of the first property by executing the first get method using at least one of the first instance of the single-threaded script engine within the first execution context and the second instance of the single-threaded script engine within the second execution context.

18. The computing device of claim 14, wherein said computing device is coupled to a memory device and wherein the computing device is further configured to determine a number of outside references to the at least one shared script object and release the at least one shared script object from the memory device if the number of outside references to the at least one shared script object is zero.

19. The computing device of claim 14, wherein properties of the at least one shared script object reference a plurality of shared script objects and wherein said computing device is configured to detect a reference loop among the plurality of shared script objects.

20. The computing device of claim 14, wherein said computing device is coupled to at least one component of at least one machine and wherein said computing device is configured to control the at least one component with the first instance of the script engine and the second instance of the script engine using the at least one shared script object.

* * * * *